United States Patent

Hara et al.

[11] Patent Number: 5,819,194
[45] Date of Patent: Oct. 6, 1998

[54] SYSTEM FOR CONTROLLING FOUR-WHEEL DRIVE FOR MOTOR VEHICLE

[75] Inventors: Tomoyuki Hara, Isehara; Toshiharu Takasaki, Sagamihara, both of Japan

[73] Assignee: Nissan Motor Co., Ltd., Yokohama, Japan

[21] Appl. No.: 529,611

[22] Filed: Sep. 18, 1995

[30] Foreign Application Priority Data

Sep. 21, 1994 [JP] Japan ..................................... 6-226471
Sep. 21, 1994 [JP] Japan ..................................... 6-226473
Sep. 21, 1994 [JP] Japan ..................................... 6-226477

[51] Int. Cl.$^6$ .............................. G06G 7/76; B60K 17/34
[52] U.S. Cl. ................................. 701/89; 701/69; 701/88; 180/247; 180/248; 180/249; 180/233; 475/295; 475/86; 475/221; 192/3.57; 192/103 F
[58] Field of Search ...................... 364/434.098, 426.01, 364/426.03, 424.051, 424.094, 424.095, 426.016, 426.026, 426.035, 423.98; 303/143, 169, 190; 180/248, 233, 247, 249, 197, 76, 24, 415; 74/473 R, 467, 650, 665 G; 475/86, 89, 250, 280, 295, 119; 477/125, 908, 36; 701/69, 70, 88, 89; 192/3.57, 60, 103 F

[56] References Cited

U.S. PATENT DOCUMENTS

| | | | |
|---|---|---|---|
| 4,298,085 | 11/1981 | Moroto et al. | 180/247 |
| 4,586,583 | 5/1986 | Yamakawa et al. | 180/247 |
| 4,602,696 | 7/1986 | Taga et al. | 180/247 |
| 4,630,704 | 12/1986 | Yamakawa et al. | 180/247 |
| 4,664,216 | 5/1987 | Kodama et al. | 364/424.098 |
| 4,715,466 | 12/1987 | Ishii et al. | 364/424.098 |
| 4,771,852 | 9/1988 | Nishikawa et al. | 180/247 |
| 4,781,266 | 11/1988 | Hotta et al. | 180/248 |
| 4,823,648 | 4/1989 | Hayakawa et al. | 477/36 |
| 4,836,322 | 6/1989 | Sakakiyama | 180/247 |
| 4,846,016 | 7/1989 | Takeuchi et al. | 180/247 |
| 4,862,768 | 9/1989 | Iwatsuki et al. | 180/249 |
| 4,890,509 | 1/1990 | Hara | 475/86 |
| 4,911,260 | 3/1990 | Miura et al. | 180/249 |
| 5,024,309 | 6/1991 | Takemura et al. | 192/60 |
| 5,137,130 | 8/1992 | Niikura et al. | 192/60 |
| 5,193,639 | 3/1993 | Hara et al. | 180/248 |
| 5,199,325 | 4/1993 | Reuter et al. | 74/335 |
| 5,226,860 | 7/1993 | Baxter, Jr. et al. | 475/206 |
| 5,275,252 | 1/1994 | Sperduti et al. | 180/197 |
| 5,522,776 | 6/1996 | Alvey | 477/35 |
| 5,562,192 | 10/1996 | Dick | 192/84.1 |

OTHER PUBLICATIONS

Service Manual No. 629(R32–2), "Introduction of Four-Wheel Drive Motor Vehicles of Nissan Skyline R32 Type", (Aug., 1989).

*Primary Examiner*—Jacques H. Louis-Jacques
*Attorney, Agent, or Firm*—Foley & Lardner

[57] ABSTRACT

A system for controlling a four-wheel drive for a motor vehicle comprises a drive mode switch for detecting a drive mode of the motor vehicle selectable between a two-wheel drive mode and a four-wheel drive mode. The four-wheel drive mode is selectable between a direct-coupled four-wheel drive mode. A an auto four-wheel drive mode, a controller controls the distribution of traction between main and secondary driving wheels. A traction transmission train distributes traction between the main and secondary driving wheels. The traction transmission train has an oil pressure supply system having a friction clutch and a solenoid.

34 Claims, 35 Drawing Sheets

REVOLUTION DIFFERENCE
$\Delta N = N_R - N_F$

CLUTCH PRESSURE Pc

SYSTEM FOR CONTROLLING FOUR-WHEEL DRIVE FOR MOTOR VEHICLE

BACKGROUND OF THE INVENTION

The present invention relates to a system for controlling a four-wheel drive for a motor vehicle.

A conventional four-wheel drive motor vehicle is shown in a Service Manual No. 629(R32-2), entitled "Introduction of Four-Wheel Drive Motor Vehicles of Nissan Skyline R32 Type", published in August, 1989. This four-wheel drive motor vehicle is constructed so that a distribution of traction between front and rear wheels corresponding to main and secondary driving wheels is changed continuously and automatically between the two-wheel drive state and the direct-coupled four-wheel drive state according to a revolution or rotating speed difference between the front and rear wheels.

Another conventional four-wheel drive motor vehicle is known which is operative in the two-wheel drive mode, auto four-wheel drive mode, and direct-coupled four-wheel drive mode which can be switched/selected stepwise. With this four-wheel drive motor vehicle, when selecting the two-wheel drive mode, a distribution of traction to the secondary driving wheels is 0%, whereas a distribution of traction to the main driving wheels is 100%, enabling cruising in the two-wheel drive state. Further, when selecting the direct-coupled four-wheel drive mode, a distribution of traction to the secondary driving wheels is 50%, and a distribution of traction to the main driving wheels is also 50%, enabling cruising in the direct-coupled four-wheel drive state. Furthermore, when selecting the auto four-wheel drive mode, a distribution of traction between the front and rear wheels corresponding to the main and secondary driving wheels is changed continuously and automatically between the two-wheel drive state and the direct-coupled four-wheel drive state according to the revolution difference between the front and rear wheels.

There is known, as a device which can change stepwise or continuously a distribution of traction between the front and rear wheels corresponding to the main and secondary driving wheels of such known four-wheel drive motor vehicles, a variable-torque clutch arranged to a traction transmission train between the front and rear wheels, which can variably control transmission torque based on variable control of an engaging force.

The variable-torque clutch currently in use is mainly of the fluid type and the electromagnetic type. In order to variably control a frictional contact force between clutch plates to obtain a controlled engaging force, the fluid variable-torque clutch carries out control of a fluid pressure to a clutch piston, whereas the electromagnetic variable-torque clutch carries out control of a current value of a proportional electromagnetic solenoid. Specifically, when selecting the two-wheel drive mode, the clutch plates are disengaged with each other; when selecting the auto four-wheel drive mode, the clutch plates come in frictional contact, producing each other with slippage and; when selecting the direct-coupled four-wheel drive mode, the clutch plates are engaged with each other without producing slippage.

However, the known four-wheel drive motor vehicles include a lever or a switch which enables switching/selecting from the two-wheel drive mode, auto four-wheel drive mode, or direct-coupled four-wheel drive mode to any one of the two. Thus, upon switching/selecting, this lever or switch provides a shock to the motor vehicle, resulting in a possible deterioration of the cruising stability thereof.

Specifically, when the motor vehicle cruising in the direct-coupled four-wheel drive mode makes a turn, the revolution difference is produced between the front and rear wheels, so that "unliberated torque" occurs in the variable-torque clutch in which the clutch plates are engaged with each other without producing slippage. And, when carrying out switching/selecting from the direct-coupled four-wheel drive mode to the two-wheel drive mode, the multiple-disc friction clutch is disengaged, so that the above "unliberated torque" accumulated in the variable-torque clutch is released suddenly, providing a shock to the motor vehicle.

It is, therefore, an object of the present invention to provide a system for controlling a four-wheel drive for a motor vehicle which contributes to an improvement of the cruising stability of the motor vehicle.

SUMMARY OF THE INVENTION

According to one aspect of the present invention, there is provided a system for controlling a four-wheel drive for a motor vehicle provide with main and secondary driving wheels, comprising:

means for detecting a drive mode of the motor vehicle, said drive mode being selected between a two-wheel drive mode and a four-wheel drive mode, said four-wheel drive mode being selectable between a direct-coupled four-wheel drive mode with distribution of traction between the main and secondary driving wheels being in a ratio of 1:1, and an auto four-wheel drive mode wherein a state of the motor vehicle is automatically continuously changed between said two-wheel drive mode and said direct-coupled four-wheel drive mode;

means, in response to said drive mode detecting means, for controlling distribution of traction between the main and secondary driving wheels; and means, in response to said distribution controlling means, for distributing traction between the main and secondary driving wheels, said traction distributing means including a friction clutch and a solenoid.

According to another aspect of the present invention, there is provided, in a motor vehicle:

main and secondary driving wheels;

means for detecting a drive mode of the motor vehicle, said drive mode being selectable between a two-wheel drive mode and a four-wheel drive mode, said four-wheel drive mode being selectable between a direct-coupled four-wheel drive mode with distribution of traction between said main and secondary driving wheels being in a ratio 1:1, and an auto four-wheel drive mode wherein a state of the motor vehicle is automatically continuously changed between said two-wheel drive mode and said direct-coupled four-wheel drive mode;

means, in response to said drive mode detecting means, for controlling distribution of traction between said main and secondary driving wheels; and means, in response to said distribution controlling means, for distributing traction between said main and secondary driving wheels, said traction distributing means including a friction clutch and a solenoid.

DETAILED DESCRIPTION OF THE INVENTION

Figure 1:
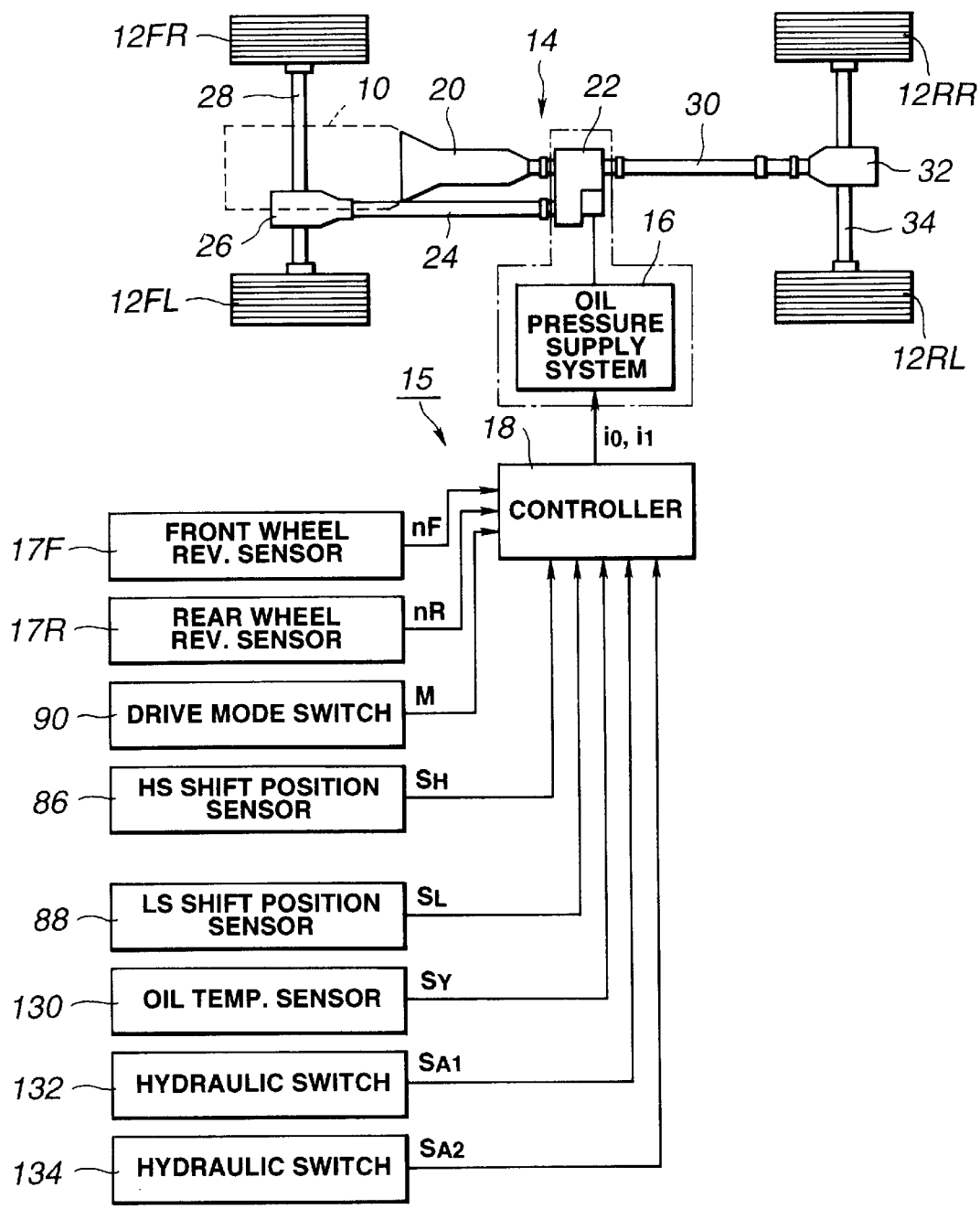
FIG. 1 is a block diagram showing a first preferred embodiment of a system for controlling a four-wheel drive for a motor vehicle according to the present invention.

Referring to the drawings, a description will be made with regard to preferred embodiments of a four-wheel drive control system for a motor vehicle according to the present invention.

FIGS. 1 to 13 show a first embodiment of the present invention. Referring first to FIG. 1, the four-wheel drive motor vehicle is designed to cruise basically in the front-engine rear-drive (FR) mode. With this four-wheel drive motor vehicle, the following drive modes can be selected by operation of a changeover switch 87 (see FIG. 2): the two-wheel drive mode in which a distribution of traction between main driving wheels or rear wheels to secondary driving wheels or front wheels is fixed to be in the ratio 100%:0%; the auto four-wheel drive mode in which a distribution of traction between the main and secondary driving wheels is automatically set to a value according to a revolution or rotating speed difference between the two, and; the direct-coupled four-wheel drive mode in which a distribution of traction between the main and secondary driving wheels is fixed to be in the ratio 50%:50%. This embodiment also adopts an auxiliary transmission, the shift position of which being selectable by operation of a lever, not shown.

Figure 2:
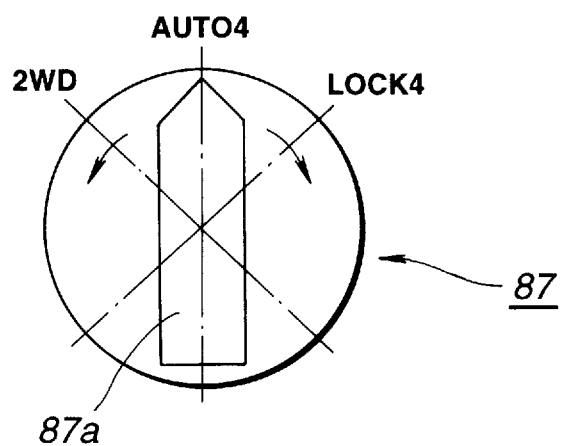
FIG. 2 is a front view showing a drive mode changeover switch.

Referring to FIG. 2, the changeover switch 87 is of the rotary type, and comprises a knob 87a. Moreover, the changeover switch 87 has contacts of the two-wheel drive mode (2WD), auto four-wheel drive mode (AUTO4), and direct-coupled four-wheel drive mode (LOCK4) arranged in this order as viewed clockwise. Switching from the direct-coupled four-wheel drive mode to the two-wheel drive mode is carried out after switching from the direct-coupled four-wheel drive mode to the auto four-wheel drive mode.

Referring again to FIG. 1, the four-wheel control system for a motor vehicle is provided with an engine 10 as a drive source, front and rear wheels 12FL-12RR, a traction transmission train 14 which can change the ratio of a traction distribution between the wheels 12FL-12RR, and a traction distribution control device 15 which serves to control a distribution of traction by the traction transmission train 14.

The traction transmission train 14 includes a transmission 20 for shifting traction out of the engine 10 according to the gear ratio selected, and a transfer 22 for dividing traction out of the transmission 20 between the front wheels 12FL, 12FR and the rear wheels or regular driving wheels 12RL, 12RR. The traction transmission train 14 is constructed so that front wheel traction divided by the transfer 22 is transmitted to the front wheels 12FL, 12FR through a front wheel output shaft 24, a front differential gear 26 and a front wheel drive shaft 28, whereas rear wheel traction is transmitted to the rear wheels 12RL, 12RR through a propeller shaft or rear wheel output shaft 30, a rear differential gear 32 and a rear wheel drive shaft 34.

Figure 3:
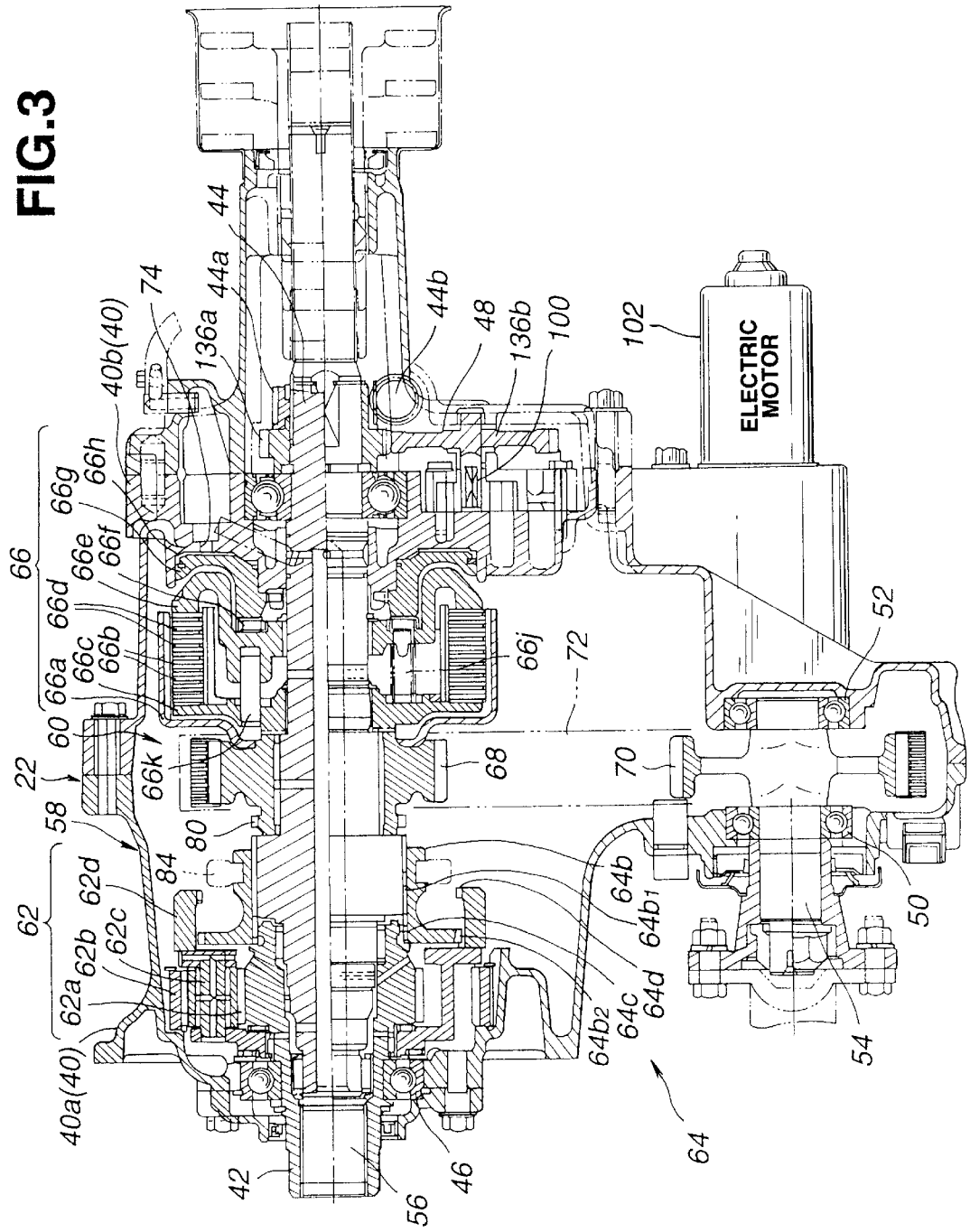
FIG. 3 is a longitudinal section showing a transfer.

Referring to FIG. 3, the transfer 22 includes in a transfer casing 40 an input shaft 42 and a first output shaft 44 disposed coaxially to butt at each other. The input shaft 42 is rotatably supported to a front casing 40a through a radial bearing 46, whereas the first output shaft 44 is rotatably supported to a rear casing 40b through a radial bearing 48, so that the two shafts 42, 44 enables relative rotation. A second output shaft 54 is rotatably supported in parallel to the input shaft 42 and the first output shaft 44 through bearings 50, 52 disposed to the front and rear casings 40a, 40b, respectively. The input shaft 42 is coupled with an output shaft 56 of the transmission 20, and the first output shaft 44 is coupled with the rear wheel output shaft 30, and the second output shaft 54 is coupled with the front wheel output shaft 24.

An auxiliary transmission unit 58 and a two-wheel/four-wheel drive changeover device 60 are arranged to the input shaft 42 and the first output shaft 44.

The auxiliary transmission unit 58 comprises a planetary gear 62, and a dog-clutch-type high/low speed changeover device 64 disposed coaxially to the planetary gear 62.

The planetary gear 62 comprises a sun gear 62a formed on the outer periphery of the input shaft 42, an internal gear 62b fixed inside the front casing 40a, a pinion gear 62c engaged with the sun gear 62a and the internal gear 62b, and a pinion carrier 62d for rotatably supporting the pinion gear 62c.

The high/low speed changeover device 64 comprises a shift sleeve 64b arranged axially slidably by spline coupling of a plurality of key grooves formed on the outer periphery of the first output shaft 44 with an internal teeth $64b_1$ and having an external teeth $64b_2$ arranged on the outer periphery thereof, a high-speed shift gear 64c formed on the outer periphery of the input shaft 42 which is engageable with the internal teeth $64b_1$ of the shift sleeve 64b, and a low-speed shift gear 64d formed on the inner periphery of the pinion carrier 62d which is engageable with the external teeth $64b_2$ of the shift sleeve 64b.

Figure 4:
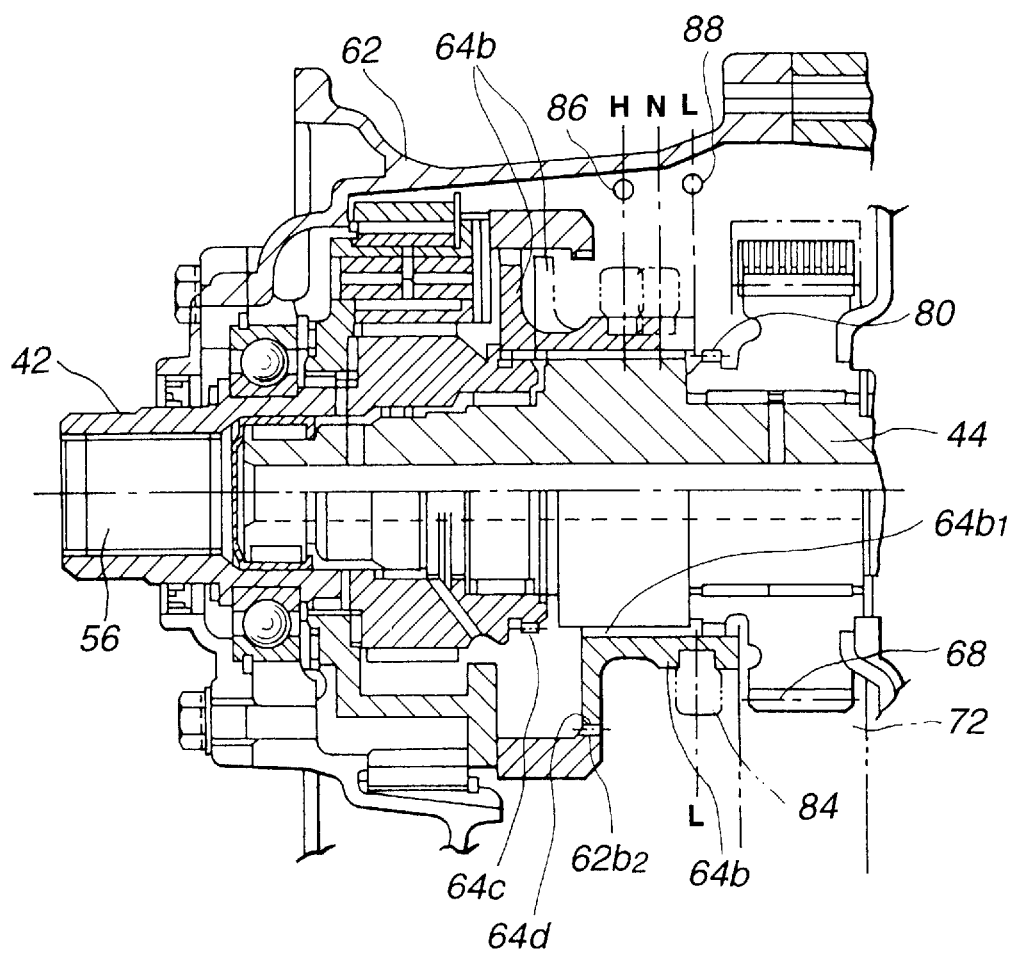
FIG. 4 is a view similar to FIG. 3, showing a high/low speed changeover device switched in the high-speed shift position.

Referring to FIG. 4, when the shift sleeve 64b is slidingly moved up to a high-speed shift position H as seen in the upper disposition of the shift sleeve 64b as indicated by a fully-drawn line, the high-speed shift gear 64c and the internal teeth $64b_1$ are engaged with each other. Further, when the shift sleeve 64b is slidingly moved up to a low-speed shift position L as seen in the lower disposition of the shift sleeve 64b as indicated by a fully-drawn line in FIG. 4, the low-speed shift gear 64d and the external teeth $64b_2$ are engaged with each other. Furthermore, when the shift sleeve 64b is slidingly moved up to a neutral position N as seen in the lower disposition of the shift sleeve 64b as indicated by a two-dot chain line in FIG. 4, the internal teeth $64b_1$ and the external teeth $64b_2$ are not engaged with any of the other gears of the high/low speed changeover device 64.

Returning to FIG. 3, the two-wheel/four-wheel drive changeover device 60 comprises a wet multiple-disc friction clutch (hereafter refer to as "friction clutch") 66 for changing the ratio of a traction distribution between the front and rear wheels, a first sprocket 68 disposed rotatably to the first output shaft 44, a second sprocket 70 coupled coaxially with the second output shaft 54, and a chain 72 arranged to allow connection between the first and second sprockets 60, 70.

The friction clutch 66 comprises a clutch drum 66a coupled with the first sprocket 68, friction plates 66b spline-coupled with the clutch drum 66a, a clutch hub 66c spline-coupled with the outer periphery of the first input shaft 44, friction discs 66d coupled integrally with the clutch hub 66c, each being disposed between the friction plates 66b, a rotary member 66e disposed on the outer periphery of the first output shaft 44 and moving axially toward the clutch drum 66a to bring the friction plates 66b into contact with the friction discs 66d, a pin 66k coupled integrally with the clutch hub 66c and for engaging the clutch hub 66c with the rotary member 66e, a clutch piston 66g mounted to an inner wall of the rear casing 40b and being movable axially, a thrust bearing 66f for transmitting axial movement of the clutch piston 66g to the rotary member 66e, a cylinder chamber 66h formed between the inner walls of the clutch piston 66g and the rear casing 40b, and a return spring 66j for providing to the rotary member 66e a biasing force in the direction of the clutch piston 66g.

When an oil pressure supply system 16 provides a clutch pressure $P_C$ to an input port 74 formed through the rear casing 40b which communicates with the cylinder chamber 66h, a pressing force is generated in the cylinder chamber 66h, so that the clutch piston 66g is moved leftward as viewed in FIG. 3, which is transmitted to the rotary member 66e through the thrust bearing 66f. The friction plates 66b and friction discs 66d separated from each other come in contact with each other by movement of the friction discs 66d, producing an engaging force corresponding to the clutch pressure $P_C$ due to a frictional force. Thus, a driving force of the first output shaft 44 is transmitted, according to a predetermined ratio of a torque distribution corresponding to an engaging force of the friction clutch 66, to the second output shaft 54 through the first sprocket 68, the chain 72, and the second sprocket 70.

On the other hand, when the clutch pressure $P_C$ as supplied is decreased, and the rotary member 66e and the clutch piston 66g are moved rightward as viewed in FIG. 3 by a biasing force of the return spring 66j so that the friction plates 66b and the friction discs 66d are separated from each other, a driving force of the first output shaft 44 is not transmitted to the second output shaft 54.

A four-wheel drive gear 80 is arranged to the first sprocket 68 on the outer periphery thereof on the side of the shift sleeve 64b. When the shift sleeve 64b is moved up to the low-speed shift position L as described above in connection with FIG. 4, the external teeth $64b_2$ are engaged with the low-speed shift gear 64d, and also the four-wheel drive gear 80 is engaged with the internal teeth $64b_1$. Thus, the shift sleeve 64b and the four-wheel drive gear 80 constitute a dog clutch for forcibly coupling the first output shaft 44 and the second output shaft 54 together in the low-speed shift position L.

By manual operation of an auxiliary lever, not shown, the shift sleeve 64*b* of the high/low speed changeover device 64 which is of the dog clutch type is slidingly moved up to the high-speed shift position H, the neutral position N, or the low-speed shift position L through a fork having a pointed end 84 as shown in FIG. 3. Referring to FIG. 4, disposed inside the front casing 40*a* are a high-speed shift position sensor 86 for sensing that the shift sleeve 64*b* is slidingly moved up to the high-speed shift position H, and a low-speed shift position sensor 88 for sensing that the shift sleeve 64*b* is slidingly moved up to the low-speed shift position L. A detection signal $S_H$ of the high-speed shift position sensor 86 and a detection signal $S_L$ of the low-speed shift position sensor 88 are always input to a controller 18 as will be described later.

Figure 5:
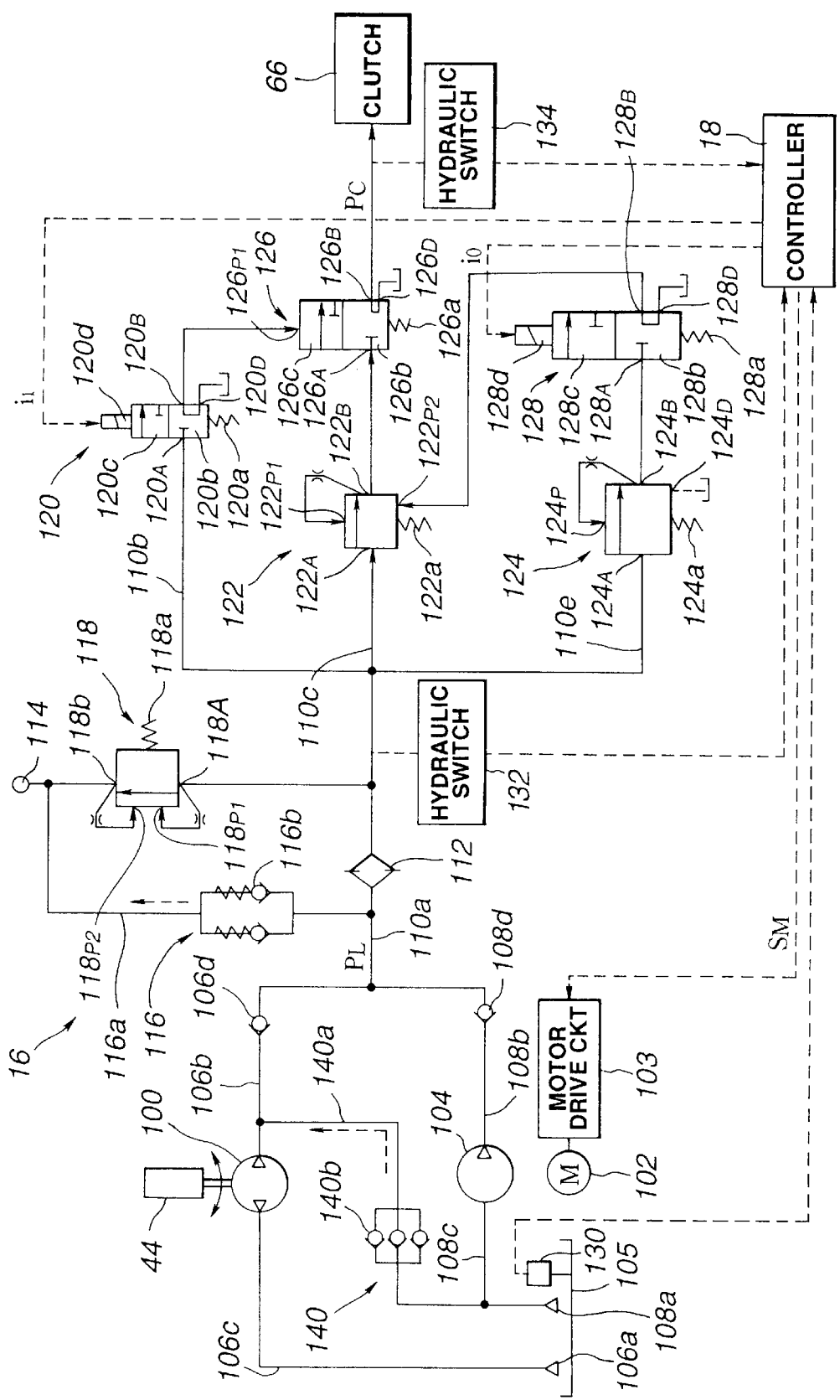
FIG. 5 is a circuit diagram showing an oil pressure supply system.

Referring to FIG. 5, the oil pressure supply system 16 has a circuit structure as shown in FIG. 5, and provides a predetermined clutch pressure $P_C$ to the input port 74 of the transfer 22.

The oil pressure supply system 16 has as an oil pressure source a main pump 100 of the normal/reverse rotation type connected directly to and driven by the first output shaft 44, and a sub-pump 104 of the normal rotation type disposed in parallel with the main pump 100 and driven by an electric motor or sub-motor 102 as a power source. The main pump 100 and the sub-pump 104 inhale hydraulic fluid within an oil tank 105 through strainers 106*a*, 108*a*, and discharge it into ducts 106*b*, 108*b* on the discharge side. Connected to a convergent duct 110*a* which converges the ducts 106*b*, 108*b* is an oil element 112 to which a relief passage 116 is connected on the upstream side thereof, i.e. on the side of the main pump 100 and the sub-pump 104, the relief passage 116 having the other end connected to a lubricating system 114. Moreover, a line-pressure regulating valve 118 is connected to the oil element 112 on the downstream side thereof. Connected to ducts 110*b*, 110*c*, 110*e* which branch off from the convergent duct 110*a* are an electromagnetic selector valve 120, a clutch-pressure regulating valve 122, and a pressure reducing valve 124 on the input side thereof, respectively. Moreover, connected to the clutch-pressure regulating valve 122 on the output side thereof is a pilot selector valve 126 on the input side thereof, which supplies the clutch pressure $P_C$ to the transfer 22 when receiving a pilot pressure out of the electromagnetic selector valve 120, whereas connected to the pressure reducing valve 124 on the output side thereof is a duty-control solenoid valve 128 on the input side thereof. Arranged in the oil tank 105 are a temperature sensor 130 for sensing the temperature of hydraulic fluid, a hydraulic switch 132 for detecting a pressure reduced by the line-pressure regulating valve 118, and a pressure switch 134 for detecting the clutch pressure $P_C$ output from the pilot selector valve 126, detection signals thereof being output to the controller 18. As for the actual motor vehicles, the oil pressure supply system 16 is arranged inside the transfer 22. The main pump 100 for inhaling hydraulic fluid out of the oil tank 105 is coupled with the first output shaft 44 through first and second gears 136*a*, 136*b* as shown in FIG. 3, whereas the sub-pump 104 is coupled with the electric motor 102 mounted to the rear casing 40*b* on the outside thereof.

Next, referring to FIG. 5, component parts of the oil pressure supply system 16 will be described in detail.

The main pump 100 rotating in the normal direction inhales hydraulic fluid out of the oil tank 105 through the strainer 106*a* connected to a suction duct 106*c* at an end thereof, and the sub-pump 104 also inhales hydraulic fluid out of the oil tank 105 through the strainer 108*a* connected to a suction duct 108*c* at an end thereof. Check valves 106*d*, 108*d* are arranged in the discharge ducts 106*b*, 108*b* of the main pump 100 and the sub-pump 104, respectively, and a bypass passage 140 is arranged to allow communication between the discharge duct 106*b* of the main pump 100 and the discharge duct 108*c* of the sub-pump 104. The bypass passage 140 comprises a bypass duct 140*a* and a triple check valve 140*b* arranged therein, and is constructed so that when the discharge duct 106*b* becomes in the negative pressure state, the check valve 140*b* opens to form a communication passage for allowing passage of hydraulic fluid in the direction of a dotted arrow as shown in FIG. 3.

The relief passage 116 connected to the convergent duct 110*a* on the upstream side of the oil element 112 comprises a relief duct 116*a* having the other end connected to the lubricating system 114, and a double spring check valve 116*b* arranged therein. When an oil pressure on the upstream side of the oil element 112 becomes greater than a predetermined value due to clogging produced in a filter of the oil element 112, the check valve 116*b* opens to form a communication passage for allowing passage of hydraulic fluid in the direction of a dotted arrow as shown in FIG. 3.

The line-pressure regulating valve 118 comprises a pressure regulating valve of the inner pilot and spring type, including a spool arranged slidably in a cylindrical valve housing having an input port $118_A$ connected to the convergent duct 110*a*, an output port $118_B$ connected to the lubricating system 114 and inner pilot ports $118_{P1}$, $118_{P2}$ receiving primary and secondary pressures through stationary orifices, and a return spring 118*a* for biasing the spool on the one end side. A supply pressure $P_L$ increased through the main pump 100 or the sub-pump 104 is decreased to a predetermined value by the line-pressure regulating valve 118, which is provided to the electromagnetic selector valve 120, the clutch-pressure regulating valve 122, and the pressure reducing valve 124. Hydraulic fluid flowing out of the output port $118_B$ upon decreasing is returned to the lubricating system 114.

The clutch-pressure regulating valve 122 comprises a pressure regulating valve of the inner and outer pilot and spring type, including a spool arranged slidably in a cylindrical valve housing having an input port $122_A$ connected to the duct 110*c*, an output port $122_B$ connected to the pilot selector valve 126, an inner pilot port $122_{P1}$ receiving as a pilot pressure the secondary pressure through a stationary orifice and an outer pilot port $122_{P2}$ receiving a control pressure out of the duty-control solenoid valve 128, and a return spring 122*a* for biasing the spool on the one end side. The clutch-pressure regulating valve 122 is constructed so that when receiving no pilot control pressure out of the duty-control solenoid valve 128, a communication passage between the input port $122_A$ and the output port $122_B$ is closed so as not to output the secondary pressure, whereas when receiving the pilot control pressure out of the duty-control solenoid valve 128, the spool is moved to output from the output port $122_B$, as the clutch pressure $P_C$, the secondary pressure corresponding to the pilot control pressure.

The pressure reducing valve 124 comprises a pressure reducing valve of the inner pilot and spring type and with a constant secondary pressure, including a spool arranged slidably in a cylindrical valve housing having an input port $124_A$ connected to the duct 110*e*, an output port $124_B$ connected to the duty-control solenoid valve 128, an inner pilot port $124_P$ receiving as a pilot pressure the secondary pressure out of the output port $124_B$ through a stationary orifice and a drain port $124_H$, and a return spring 124*a* for biasing the spool on the one end side. When the spool is moved to a predetermined position by the pilot pressure supplied to the inner pilot port $124_P$, the primary pressure out of the input port $124_A$ is supplied, as a control pressure having a predetermined reduced value, to the duty-control solenoid valve 128.

The duty-control solenoid valve 128 has three ports and two positions. This valve includes an input port $128_A$ connected to the pressure reducing valve 124, a drain port $128_R$ connected to a drain, an output port $128_B$ connected to an outer pilot port $122_{P2}$ of the clutch-pressure regulating valve 122, and a return spring 127a. The duty-control solenoid valve 128 is movable between a normal position 128b wherein a spool arranged in the valve allows communication between the output port $128_B$ and the drain port $128_R$, and an operating position 128c wherein the spool allows communication between the input port $128_A$ and the output port $128_B$. When the controller 18 provides to a solenoid 128d an exciting current $i_0$ with a predetermined duty ratio, the spool is moved from the normal position 128b to the operating position 128c against the return spring 128a during a period of time that the current $i_0$ is turned on, outputting to the clutch-pressure regulating valve 122 the pilot control pressure corresponding to the duty ratio. Therefore, when the duty-control solenoid valve 128 supplies the control pressure to the outer pilot port $122_{P2}$, the clutch-pressure regulating valve 122 provides the clutch pressure $P_C$ corresponding to the pilot control pressure, so that an engaging force of the friction clutch 66 is controlled according to this, obtaining a distribution of drive torque to the front wheels in accordance with the clutch pressure $P_C$.

The electromagnetic selector valve 120 is of the spring-offset type, and has three ports and two positions. This valve includes an input port $120_A$ receiving a line pressure, an output port $120_B$ connected to an outer pilot port $126_{P1}$ of the pilot selector valve 126, and a drain port $120_D$. The electromagnetic selector valve 120 is movable between a normal position 120b wherein a spool arranged in the valve closes the input port $120_A$ and allows communication of the output port $120_B$ with the drain port $120_D$, and an operating position 120c wherein the spool allows communication between the input port $120_A$ and the output port $120_B$ and closes the drain port $120_D$. When the controller 18 provides to a solenoid 120d an exciting current $i_1$, the spool is moved to the operating position 120c against the return spring 120a during a period of time that the current $i_1$ is turned on, providing the pilot control pressure to the outer pilot port $126_{P1}$, of the pilot selector valve 126. On the other hand, when the exciting current $i_1$ out of the controller 18 is turned off, the spool is returned to the normal position 120b by a pressing force of the return spring 120a, so that the pilot control pressure being supplied to the outer pilot port $126_{P1}$, is removed through the drain port $120_D$.

Figure 6:
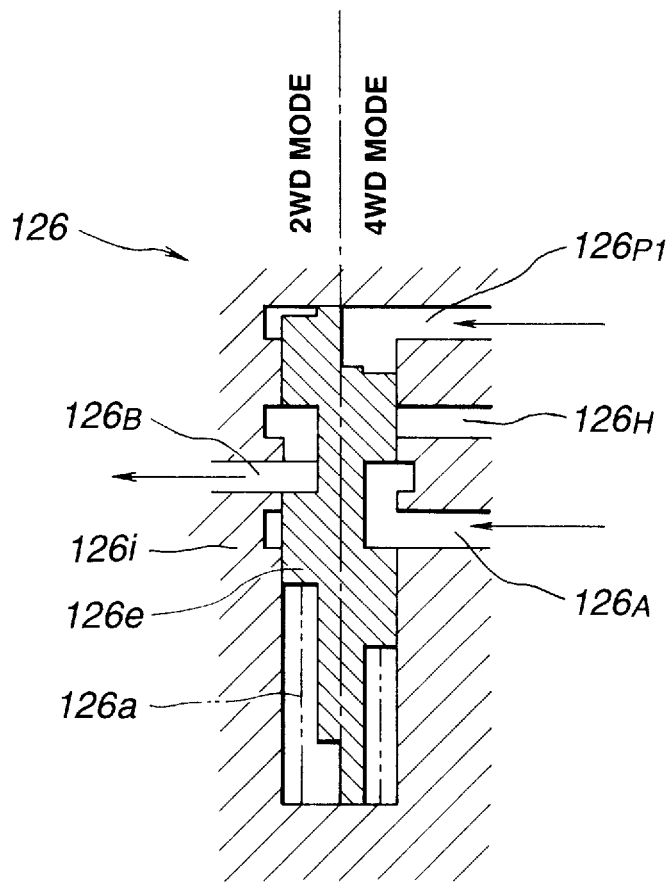
FIG. 6 is a sectional view showing a pilot selector valve used in the oil pressure supply system.

Referring also to FIG. 6, the pilot selector valve 126 includes a spool 126e arranged slidably in a cylindrical housing 126i having an input port $126_A$ receiving the secondary pressure out of the clutch-pressure regulating valve 122, an output port $126_B$ providing the secondary pressure to the transfer 22, an outer pilot port $126_{P1}$ receiving the pilot control pressure when the solenoid 120d of the electromagnetic selector valve 120 is turned on and a drain port $126_H$, and a return spring 126a for biasing the spool 126e on the one end side.

When supplying no pilot control pressure to the outer pilot port $126_{P1}$, the spool 126e of the pilot selector valve 126 is moved to a two-wheel drive (2WD) mode position 126b wherein the input and output ports $126_A$, $126_B$ are closed, and the output port $126_B$ is in communication with the drain port $126_D$ as seen in a left half in FIG. 6. On the other hand, when the solenoid 120d of the electromagnetic selector valve 120 is turned on, the spool of the electromagnetic selector valve 120 is moved to a four-wheel drive (4WD) mode position 126c wherein the spool is placed in the operating position 120c to supply the pilot control pressure to the outer pilot port $126_{P1}$, and the input port $126_A$ is in communication with the output port $126_B$ as seen in a right half in FIG. 6.

In such a way, the pilot selector valve 126 is driven by the pilot control pressure out of the electromagnetic selector valve 120, i.e. the spool 126e is driven by the pilot control pressure having a high value, so that even when the spool 126e has a great slide resistance due to dust, chips, etc. attached to a slide passage thereof, sliding of the spool 120e can be ensured.

Figure 7:
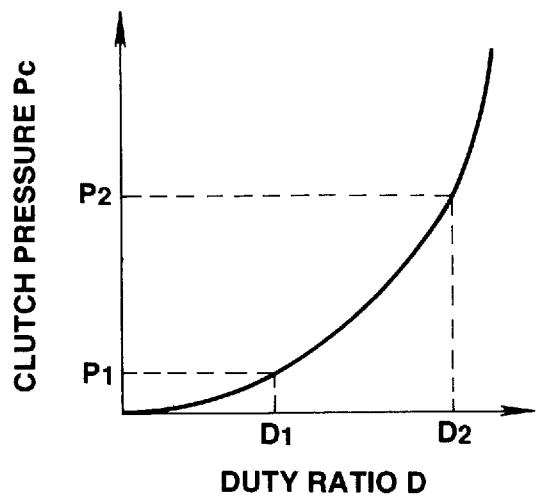
FIG. 7 is a graph illustrating a characteristic of clutch pressure vs. duty ratio.
Figure 8:
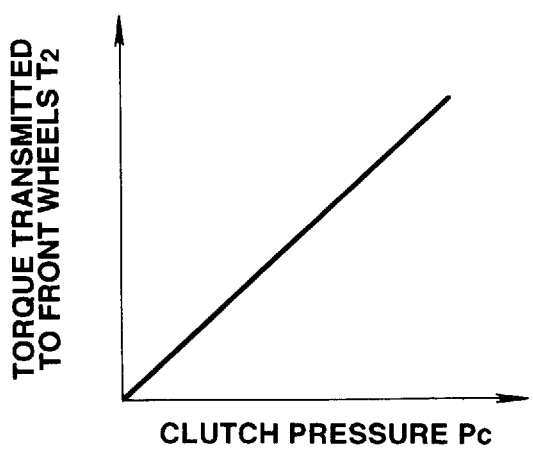
FIG. 8 is a view similar to FIG. 7, illustrating a characteristic of front wheel transmission torque vs. clutch pressure.

Referring to FIG. 7, a characteristic view shows a correlation between the clutch pressure $P_C$ of the clutch-pressure regulating valve 122 and a duty ratio D of the exciting current $i_0$ supplied to the solenoid 128d of the duty-control solenoid valve 128, the clutch pressure $P_C$ being nonlinearly parabolically increased in accordance with an increase in the duty ratio D. According to the clutch pressure $P_C$ which the oil pressure supply system 16 supplies to the friction clutch 66, a predetermined frictional force is produced between the friction plate 66b and the friction disc 66d, which causes an engaging force of the friction clutch 66. According to this, drive torque is dividedly transmitted to the front and rear wheels. Referring to FIG. 8, a characteristic view shows a correlation between the pressure $P_C$ supplied to the friction clutch 66 and a torque $T_2$ transmitted to the front wheels. As seen from FIG. 8, the torque $T_2$ transmitted to the front wheels is linearly varied in accordance with the pressure $P_C$ supplied to the friction clutch 66. That is, with the transfer 22, the ratio of a torque distribution between the front and rear wheels can be changed in accordance with the duty ratio D of the exciting current $i_0$ continuously, i.e. in the range from 0%:100% to 50%:50%. Concretely, the ratio is 0% to 100% when a value of the exciting current $i_0$ is zero, or the exciting current $i_0$ itself is not supplied, and it is 50% to 50% when the duty ratio D of the exciting current $i_0$ is equal to the maximum set value.

Returning to FIG. 1, the traction distribution control device 15 comprises front and rear wheel revolution sensors 17F, 17R, the above high-speed and low-speed shift position sensors 86, 88, a drive mode switch 90 for detecting the drive mode selected by the changeover switch 87, and serves to output the exciting currents $i_0$, $i_1$ to the oil pressure supply system 16 in accordance with detection signals of these sensors. In the first embodiment, the controller 18 is constructed to also carry out control for enabling the oil pressure supply system 16 to keep a predetermined oil pressure, and it is thus provided with the above oil temperature sensor 130 and hydraulic switches 132, 134, and outputs a motor control signal $S_M$ to the oil pressure supply system 16 in accordance with the detection signals of these sensors.

The front and rear wheel revolution sensors 17F, 17R are arranged to the front wheel output shaft 24 and the rear wheel propeller shaft 30 in predetermined positions thereof, respectively, and are constructed to detect revolutions of the shafts optically or electromagnetically so as to output to the controller 18 circumferential speeds of the wheel or wheel speeds as front and rear wheel revolution detection values nF, nR in the form of a pulse signal or a sine wave signal, respectively. The front and rear wheel revolution sensors 17F, 17R may be of the type as disclosed in JP-A 1-195126.

The drive mode switch 90 serves to output a drive mode M selected by the rotary changeover switch 87. The drive mode switch 90 outputs a signal indicative of M=2 when the drive mode as selected corresponds to the two-wheel drive mode, a signal indicative of M=AUTO4 when the drive mode as selected corresponds to the auto four-wheel drive mode or full-time four-wheel mode, and a signal indicative of M=LOCK4 when the drive mode as selected corresponds to the direct-coupled four-wheel drive mode.

Figure 9:
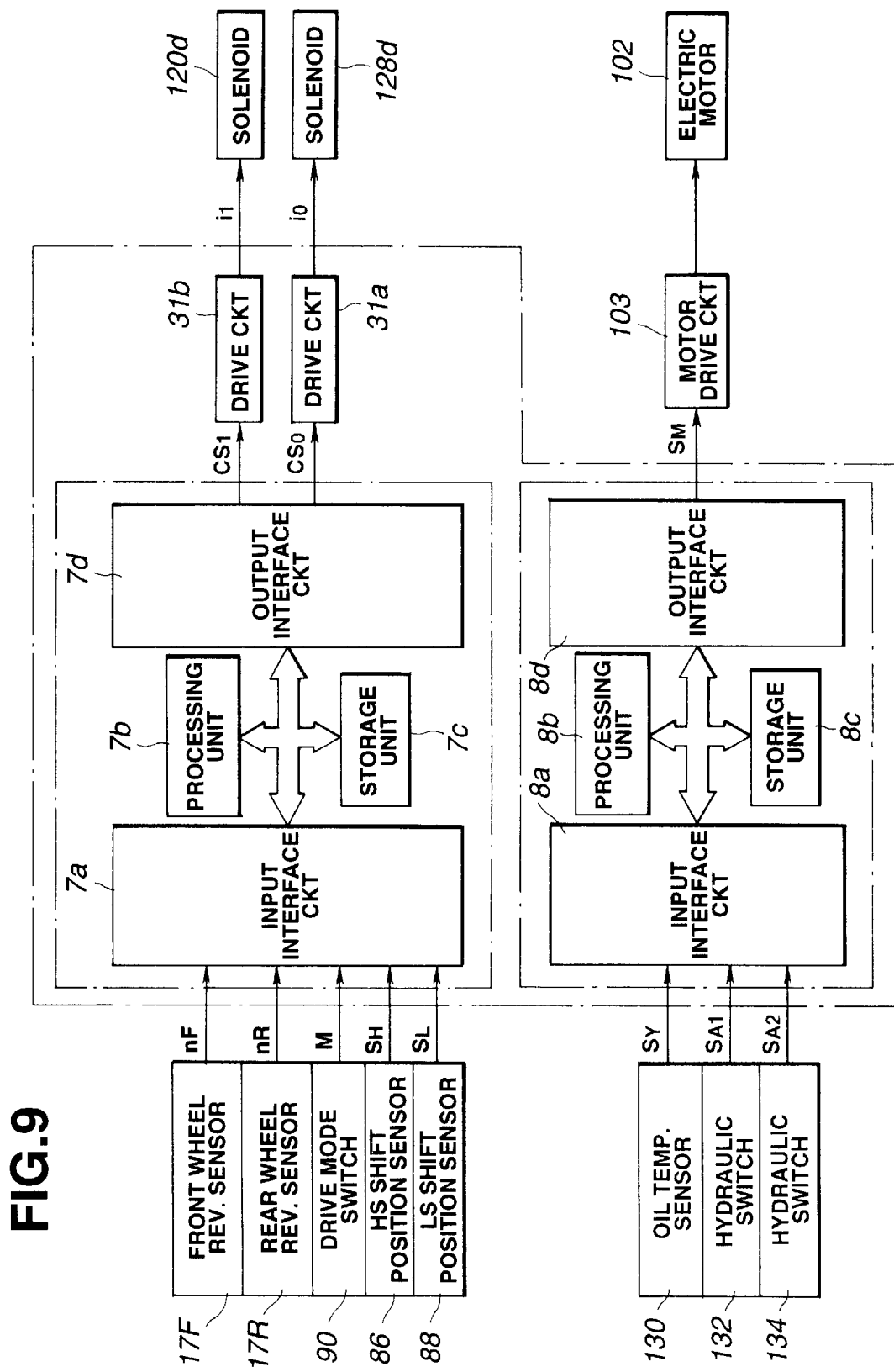
FIG. 9 is a view similar to FIG. 1, showing a controller.

Referring to FIG. 9, the controller 18 is provided with a microcomputer 7 for carrying out traction distribution control, a microcomputer 8 for carrying out the above control of keeping a predetermined oil pressure, a drive circuit 31a for supplying in accordance with a control signal $CS_0$ out of the microcomputer 7 the exciting current $i_0$ having a predetermined duty ratio to the solenoid 128d of the duty-control solenoid valve 128 in the oil pressure supply system 16, a drive circuit 31b for supplying the exciting current $i_1$ which is turned on and off in accordance with a control signal $CS_1$ out of the microcomputer 7 to the solenoid 120d of the electromagnetic selector valve 120 in the oil pressure supply system 16, and a motor drive circuit 103 for carrying out chopper control of the electric motor 102 in accordance with the motor control signal $S_M$ out of the microcomputer 8 so as to obtain a revolution or rotating speed in accordance therewith.

The microcomputer 7 is provided with an input interface circuit 7a having the analog to digital (A/D) conversion function for reading as detection values the detection signals of the sensors 86, 88, 90, 17F, 17R, a processing unit 7b for carrying out computing/processing for traction distribution control according to a predetermined program (see FIG. 11), a storage unit 7c such as a read-only memory (ROM), a random access memory (RAM) or the like, and an output interface circuit 7d for outputting the control signal $CS_0$ of the duty ratio D for commanding the clutch pressure $P_C$ which determines a distribution of torque to the front wheels obtained by the processing unit 7b, and the control signal $CS_1$ for determining whether to output the clutch pressure $P_C$ or not. On the other hand, the microcomputer 8 is provided with an input interface circuit 8a having the A/D conversion function for reading as detection values the detection signals of the sensors 130, 132, 134, a processing unit 8b, a storage unit 8c such as a ROM, a RAM or the like, and an output interface circuit 8d having the digital to analog (D/A) conversion function for outputting, as the analog voltage signal $S_M$, for example, a sub-motor revolution command value obtained by the processing unit 8b.

Figure 11:
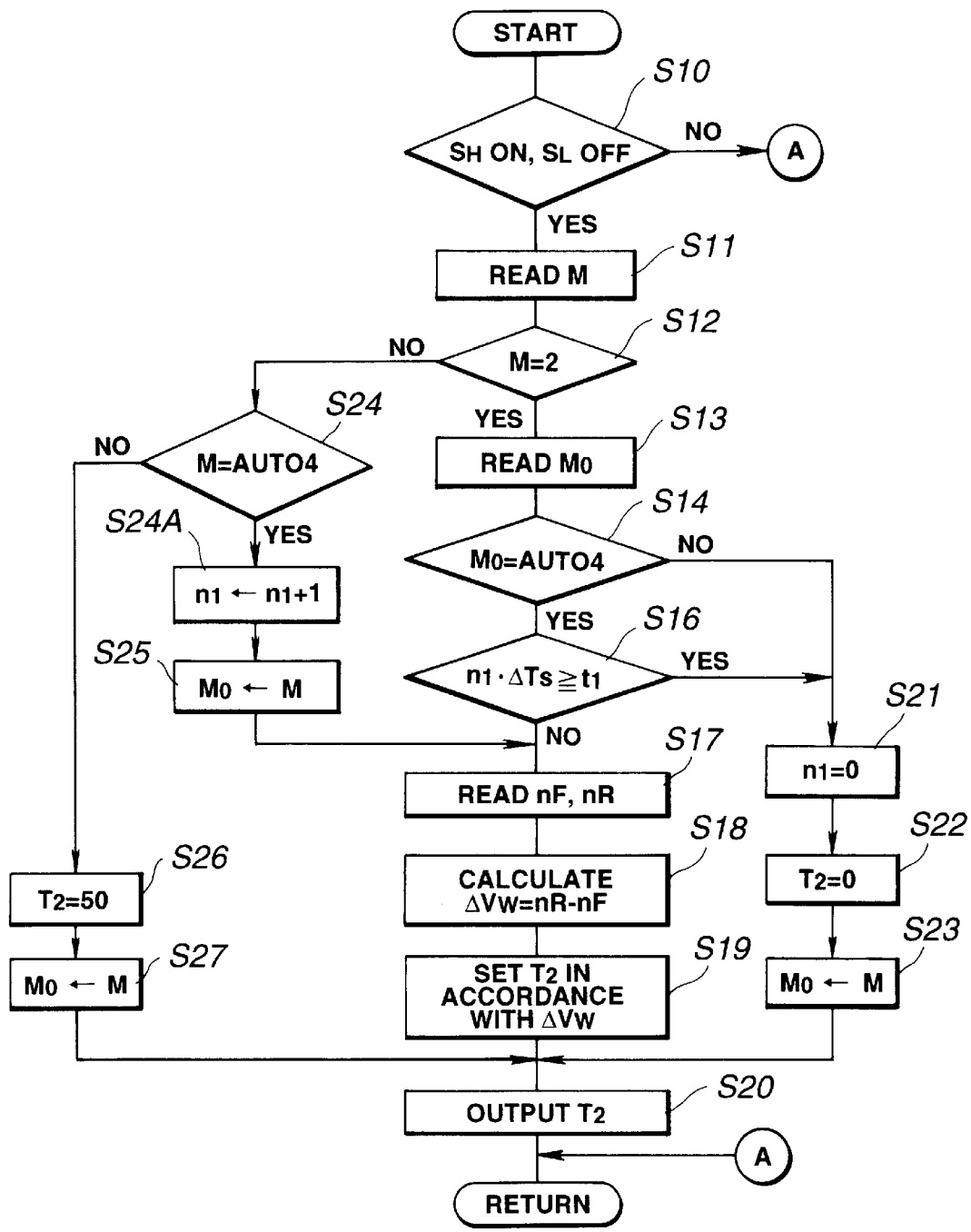
FIG. 11 is flowchart showing operation of the first preferred embodiment of the present invention.

Referring to FIG. 11, in accordance with the mode signal M out of the drive mode switch 90, the high-speed shift position detection signal $S_H$ out of the high-speed shift position sensor 86, the low-speed shift position detection signal $S_L$ out of the low-speed shift position sensor 88, the front wheel revolution detection value nF out of the front wheel revolution sensor 17F, and the rear wheel revolution detection value nR out of the rear wheel revolution sensor 17R, the microcomputer 7 determines the front wheel torque distribution command value $T_2$, and calculates the duty ratio D for determining the clutch pressure $P_C$ corresponding to the command value $T_2$, producing the control signal $CS_0$ having a command value corresponding to the duty ratio D. The microcomputer 7 also controls the control signal $CS_1$, in the on or off state. These control signals $CS_0$, $CS_1$ are output to the drive circuits 31a, 31b, respectively.

The drive circuit 31a is provided with a pulse duration modulation circuit, for example, for outputting an exciting current of the duty ratio D in accordance with a command value of the control signal $CS_0$ which is in the form of an analog voltage signal output from the microcomputer 7, and serves to output to the solenoid 128d of the duty-control solenoid valve 128 the exciting current $i_0$ of the duty ratio D in accordance with the command value of the control signal $CS_0$.

The drive circuit 31b serves to convert the control signal $CS_1$ out of the microcomputer 7 into the exciting current $i_1$ having an enough value to excite the solenoid 120d of the electromagnetic selector valve 120, which is output to the solenoid 120d of the electromagnetic selector valve 120.

Moreover, in the first embodiment, the controller 18 carries out processing, i.e. control for enabling the oil pressure supply system 16 to supply a predetermined oil pressure, as follows. When the hydraulic switch 132 detects, for example, that the line pressure $P_L$ downstream of the oil element 112 of the convergent duct 110a is lower than a set value in accordance with a control program, not shown, the control signal $S_M$ indicative of a revolution command value determined in accordance with the oil temperature detection value $S_Y$ of the oil temperature sensor 130 is calculated to control a discharge pressure or discharged oil amount of the sub-pump 104, which is provided to the motor drive circuit 103 to control a revolution or rotating speed of the sub-motor 104, thus maintaining the line pressure $P_L$ out of the oil pressure supply system 16 at a predetermined value.

Next, a description will be made with regard to processing executed by the microcomputer 7 of the controller 18, i.e. a fundamental principle on traction distribution control.

In the first embodiment, as described above, the changeover switch 87 ensures switching among the three drive modes: the two-wheel drive mode, the auto four-wheel drive mode, and the direct-coupled four-wheel drive mode. When selecting the two-wheel drive mode, a distribution of traction between the rear and front wheels is fixed to be in the ratio 100%:0%. When selecting the auto four-wheel drive mode, it is automatically set to a value according to the revolution or rotating speed difference between the two wheels. And, when selecting the direct-coupled four-wheel drive mode, it is fixed to be in the ratio 50%:50%.

Concretely, when selecting the auto four-wheel drive mode, a revolution or rotating speed difference $\Delta V_W$ between the front and rear wheels is calculated in accordance with the following formula:

$$\Delta V_W = nR - nF \tag{1}$$

Figure 10:
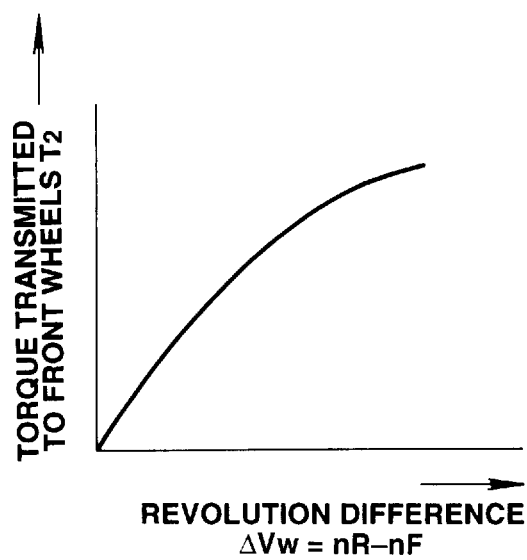
FIG. 10 is view similar to FIG. 8, illustrating a characteristic of front wheel transmission torque vs. revolution difference between front and rear wheels.

That is, the revolution difference $\Delta V_W$ is obtained by subtracting an average front wheel speed or front wheel revolution detection value nF obtained out of an average revolution of the secondary or front driving wheels 12FL, 12FR from an average rear wheel speed or rear wheel revolution detection value nR obtained out of an average revolution of the main or rear driving wheels 12RL, 12RR. In accordance with the revolution difference $\Delta V_W$ as calculated, the front wheel torque distribution command value $T_2$ is determined by using a characteristic as shown in FIG. 10.

Moreover, as described above, the changeover switch 87 has the contact of the auto four-wheel drive mode positioned between the contacts of the two-wheel drive mode and the direct-coupled four-wheel drive mode. Switching between the two-wheel drive mode and the direct-coupled four-wheel drive mode is carried out after putting a distribution of traction in the auto four-wheel drive state. If the revolution difference is produced between the front and rear wheels due to turning of the motor vehicle in the direct-coupled four-wheel drive state, and "unliberated torque" occurs in the two-wheel/four-wheel drive changeover device 60, switching of the changeover switch 87 from the direct-coupled four-wheel drive mode to the two-wheel drive mode in a short time causes sudden release of "unliberated torque" accumulated in the two-wheel/four-wheel drive changeover device 60, resulting in a possible occurrence of a shock in the motor vehicle. Thus, according to traction distribution control of the present invention, it is determined whether or not switching for the direct-coupled four-wheel drive mode to the two-wheel drive mode is carried out in a short time. If switching is carried out in a short time, a distribution of traction in the auto four-wheel drive state is carried out without shifting to the two-wheel drive mode until a predetermined time $t_2$ elapses. The predetermined time $t_1$ corresponds to a switching determination time $t_1$ used in determination of traction distribution control. The friction plate 66b and the friction disc 66d come in frictional contact with each other with slippage produced during the switching determination time $t_1$, absorbing the revolution difference between the front and rear wheels.

Referring next to FIG. 11, a description will be made with regard to processing of four-wheel drive control based on the above fundamental principle. This processing is a timer interrupt processing executed every predetermined period $\Delta T_S$, e.g. 10 msec. In this processing, a timer, which virtually comprises a counter having a count value $n_1$, serves to measure the switching determination time $t_1$. A time calculated by $n_1 \cdot \Delta T_S$ is compared with the switching determination time $t_1$.

At a step S10, it is determined that the high-speed shift position detection signal $S_H$ is output from the high-speed shift position sensor 86, and the low-speed shift position detection signal $S_L$ is not output from the low-speed shift position sensor 88. If the high-speed shift position detection signal $S_H$ is on, and the low-speed shift position detection signal $S_L$ is off, control proceeds to a step S11, whereas if not, i.e. the high-speed shift position detection signal $S_H$ is off, and the low-speed shift position detection signal $S_L$ is on, control returns to a main program.

At the step S11, the drive mode detection value M is read out of the drive mode switch 90. At a subsequent step S12, it is determined whether or not the drive mode detection value M read at the step S11 corresponds to 2 indicative of the two-wheel drive mode. If M=2, control proceeds to a step S13, whereas if not, control proceeds to a step S24.

At the step S13, the latest previous drive mode value $M_0$ is read, which is stored in the RAM of the storage unit 7c, then, control proceeds to a step S14. At the step S14, it is determined whether or not the previous value $M_0$ of the latest drive mode read at the step S13 corresponds to AUTO4 indicative of the auto four-wheel drive mode. If $M_0$=AUTO4, control proceeds to a step 16, whereas if not, control proceeds to a step S21.

At the step S16 an elapsed time during switching of the changeover switch 87 from the direct-coupled four-wheel mode to the two-wheel drive mode is calculated by multiplying the count value $n_1$ of the counter by the sampling time $\Delta T_S$. And, it is determined whether or not the elapsed time as calculated is greater than a predetermined value or switching determination time. If $t_1$. If $n_1 \cdot \Delta T_S \geq t_1$, control proceeds to a step S21, whereas if not, control proceeds to a step S17.

At the step S17, the front and rear wheel revolution detection values nF, nR are read out of the front and rear wheel revolution sensors 17F, 17R, respectively. At a subsequent step S18, using the front and rear wheel revolution detection values nF, nR read at the step S17, the revolution difference $\Delta V_W$ between the front and rear wheels is calculated according to the formula (1). At a subsequent step S19, the front wheel torque distribution command value $T_2$ is set in accordance with the revolution difference $\Delta V_W$ between the front and rear wheels calculated at the step S18, and the characteristic as shown in FIG. 10, then, control proceeds to a step S20.

At the step S21, the counter is reset to zero. At a subsequent step S22, the front wheel torque distribution command value $T_2$ is set to zero, then, control proceeds to a step S23. At the step S23, the drive mode detection value M read at the step S11 is stored as the latest previous drive mode value $M_0$ in the RAM of the storage unit 7c, then, control proceeds to the step S20.

At the step S24, it is determined whether or not the drive mode detection value M read at the step S12 corresponds to AUTO4 indicative of the auto four-wheel drive mode. If M=AUTO4, control proceeds to a step S24A, whereas if not, control proceeds to a step S26.

At the step S24A, 1 (one) is added to the count value $n_1$ of the counter, then, control proceeds to a step S25. At the step S25, the drive mode detection value M read at the step S11 is stored as the previous drive mode value $M_0$ in the RAM of the storage unit 7c, then, control proceeds to the step S17.

At the step S26, the front wheel torque distribution command value $T_2$ is set to 50. At a subsequent step S27, the drive mode detection value M read at the step S11 is stored as the previous drive mode value $M_0$ in the RAM of the storage unit 7c, then, control proceeds to the step S20.

At the step S20, the front wheel torque distribution command value $T_2$ set at any of the steps S19, S22, S26 is output, then, control returns to the main program.

It is noted that the steps S16, S24A correspond to time determining means, and the steps S16 to S19 correspond to auto four-wheel drive mode continuing means.

The front wheel torque distribution command value $T_2$ set in such a way is subjected to D/A conversion in the output interface circuit 7d of the microcomputer 7. Thus, the control signals $CS_0$, $CS_1$ having analog voltage values are input to the drive circuits 31a, 31b. The drive circuit 31a outputs the exciting current of the duty ratio D to the solenoid 128d of the duty-control solenoid valve 128 in the oil pressure supply system 16 in accordance with a command value of the control signal $CS_0$, whereas the drive circuit 31b outputs the exciting current of the duty ratio D to the solenoid 120d of the electromagnetic selector valve 120 in the oil pressure supply system 16 in accordance with a command value of the control signal $CS_1$.

As a result, when $T_2 \neq 0$, the electromagnetic selector valve 120 is such that the input port 120$_A$ is in communication with the output port 120$_B$, so that the pilot selector valve 126 becomes in the state as shown in the right half in FIG. 6 wherein a pressure regulated by the clutch-pressure regulating valve 122 is supplied to the outer pilot port 126$_{P1}$ of the pilot selector valve 126, and can be thus supplied to the friction clutch 66. In that case, with the duty-control solenoid valve 128, the spool is moved from the first or normal position 128b to the second or operating position 128c against the return spring 128a so as to output the exciting current $i_0$ of a predetermined duty ratio to the pilot port 122$_{P2}$ of the clutch-pressure regulating valve 122, so that the pressure regulated by the clutch-pressure regulating valve 122, i.e. the pressure $P_C$ supplied to the clutch in accordance with the front wheel torque distribution command value $T_2$, is controlled to a predetermined value, which is supplied to the friction clutch 66 through the pilot selector valve 126. The clutch pressure $P_C$ is supplied to the input port 74 of the transfer 22 from the oil pressure supply system 16. In accordance with the clutch pressure $P_C$ as supplied, the friction plate 66b and the friction disc 66d come in frictional contact with each other. A driving force corresponding to this frictional contact force serves to drive the clutch hub 66c of the friction clutch 66, which is transmitted to the front wheel output shaft 24 through the chain 72, and further to the front wheels 12FL, 12FR through the traction transmission train 14. Thus, traction transmitted to the rear wheels 12RL, 12RR is reduced by a part corresponding to this, achieving the auto four-wheel drive state or the direct-coupled four-wheel drive state, each having a predetermined distribution of traction set by processing as shown in FIG. 11.

On the other hand, when $T_2=0$, the control signal $CS_1$ is not output, so that the electromagnetic selector valve 120 is such that the input port $120_A$ is not in communication with the output port $120_B$. The pilot selector valve 120 becomes in the state as shown in the left half in FIG. 6 wherein the pressure regulated by the clutch-pressure regulating valve 122 is not supplied to the outer pilot port $126_{P1}$ of the pilot selector valve 126, and cannot be thus supplied to the friction clutch 66. In that case, since the control signal corresponding to the exciting current $i_0$ (=0) is input to the duty-control solenoid valve 128, the spool is stopped in the first position 128b, or moved from the second position 128c to the first position 128b, having zero control pressure. Thus, the pressure regulated by the clutch-pressure regulating valve 122 also is not controlled to a value corresponding to the front wheel torque distribution command value $T_2$. In that case, the clutch pressure $P_C$ is zero. Therefore, an oil pressure is not supplied to the input port 74 of the transfer 22 from the oil pressure supply system 16, so that the friction plate 66b and the friction disc 66d do not come in frictional contact with each other. Traction is not thus transmitted to the front wheel output shaft 24, obtaining the two-wheel drive state.

Next, operation of this embodiment in connection with FIG. 11 will be described.

Suppose a case that when the four-wheel drive motor vehicle cruising in the direct-coupled four-wheel drive mode makes a turn, and produces the revolution difference between the front and rear wheels, a driver switches the changeover switch 87 to the auto four-wheel drive mode, then to the two-wheel drive mode. In that case, suppose that the elapsed time $n_1 \cdot \Delta T_S$ during switching from the auto four-wheel mode to the two-wheel drive mode is greater than the switching determination time $t_1$.

First, when switching the changeover switch 87 from the direct-coupled four-wheel drive mode to the auto four-wheel drive mode, at the step S10, the high-speed shift position detection signal $S_H$ is output from the high-speed shift position sensor 86, whereas the low-speed shift position detection signal $S_L$ is not output from the low-speed shift position sensor 88, so that control proceeds to the step S11 where the drive mode detection value M is read out of the drive mode switch 90. At the step S12, due to the drive mode detection value M=AUTO4 (auto four-wheel drive mode), control proceeds to the step S24. At the step S24, due to the drive mode detection value M=AUTO4, control proceeds to the step S24A where 1 (one) is added to the count value $n_1$ of the counter. At the subsequent step S25, the current drive mode detection value M (=AUTO4) is stored as the previous drive mode value $M_0$ in the RAM of the storage unit 7c, then, control proceeds to the step S17. At the step S17, the front and rear wheel revolution detection values nF, nR from the front and rear wheel revolution sensors 17F, 17R, respectively, and at the subsequent step S18, the revolution difference $\Delta V_W$ between the front and rear wheels is calculated using the front and rear wheel revolution detection values nF, nR. Then, at the step S19, the front wheel torque distribution command value $T_2$ is set in accordance with the revolution difference $\Delta V_W$ between the front and rear wheels calculated at the step S18, and the characteristic as shown in FIG. 10, then, control proceeds to the step S20 where the front wheel torque distribution command value $T_2$ is output.

Second, when switching the changeover switch 87 from the auto four-wheel drive mode to the two-wheel drive mode, control proceeds from the step S10 to the step S11 where the drive mode detection value M is read out of the drive mode switch 90. At the step S12, due to the drive mode detection value M=2 (two-wheel drive mode), control proceeds to the step S14. At the step S14, due to the previous drive mode value $M_2$=AUTO4, control proceeds to the step S16. At the step S16, since the elapsed time $n_1 \cdot \Delta T_S$ during switching from the auto four-wheel mode to the two-wheel drive mode is greater than the switching determination time $t_1$, the condition of $n_1 \cdot \Delta T_S \geqq t_1$ is satisfied, so that control proceeds to the step S21. At the step S21, the count value $n_1$ of the counter is reset to zero, and at the subsequent step S22, the front wheel torque distribution command value $T_2$ is set to zero. At the step S23, the current drive mode detection value M (=2) is stored as the previous drive mode value $M_0$ in the RAM of the storage unit 7c, then, control proceeds to the step S20 where the front wheel torque distribution command value $T_2$ (=0) is output.

Figure 12:
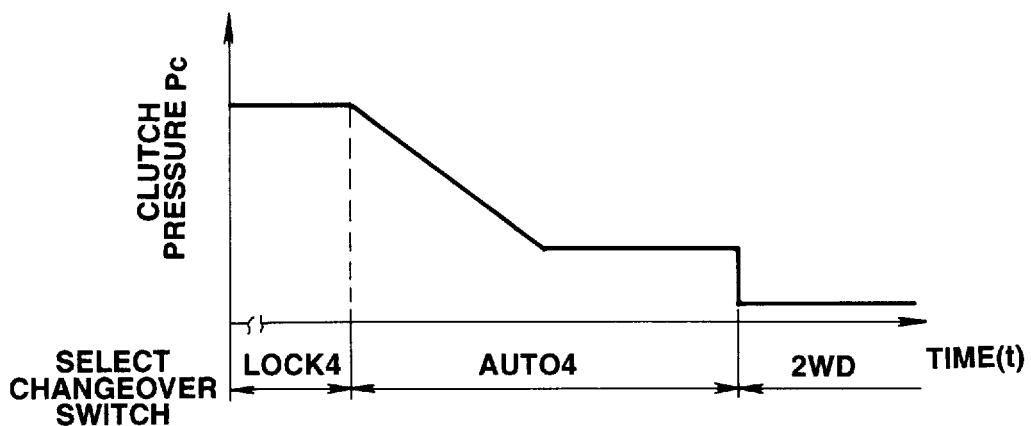
FIG. 12 is a view similar to FIG. 10, illustrating a variation in clutch pressure with the drive mode selected by the drive mode changeover switch.

As a result, when carrying out switching from the direct-coupled four-wheel drive mode (LOCK4) to the auto four-wheel drive mode (AUTO4), a variation in the clutch pressure $P_C$ is decreased gradually as shown in FIG. 12 due to a response lag of the friction clutch 66 and a filtering of command torque, and the clutch pressure $P_C$ comes to the front wheel torque distribution command value $T_2$ in accordance with the revolution difference $\Delta V_W$ between the front and rear wheels calculated at the step S18. The clutch pressure $P_C$ is lowered gradually in such a way, so that even if the revolution difference between the front and rear wheels is produced by making a turn in the direct-coupled four-wheel drive mode, and "unliberated torque" occurs in the two-wheel/four-wheel drive changeover device 60, the friction plate 66b and the friction disc 66d cooperate with each other with slippage produced to absorb the revolution difference between the front and rear wheels. This reduces "unliberated torque" accumulated in the two-wheel/four-wheel drive changeover device 60, resulting in no occurrence of a shock in the motor vehicle even upon switching from the direct-coupled four-wheel drive mode to the auto four-wheel drive mode.

Third, when carrying out switching from the auto four-wheel drive mode (AUTO4) to the two-wheel drive mode (2WD), a variation in the clutch pressure $P_C$ is small as shown in FIG. 12, so that even if "unliberated torque" is accumulated in the two-wheel/four-wheel drive changeover device 60, no shock occurs during mode switching.

Next, suppose a case that when the four-wheel drive motor vehicle cruising in the direct-coupled four-wheel drive mode makes a turn, and produces the revolution difference between the front and rear wheels, the driver switches in a short time the changeover switch 87 from the direct-coupled four-wheel drive mode to the two-wheel drive mode. It is noted that switching in a short time means an operation that the elapsed time $n_1 \cdot \Delta V_W$ during switching from the direct-coupled four-wheel drive mode to the two-wheel drive mode is largely smaller than the switching time $t_1$.

First, the auto four-wheel drive mode is achieved in the middle of switching in a short time from the direct-coupled four-wheel drive mode to the two-wheel drive mode, so that when control proceeds from the step S10 to the step S11, the drive mode detection value M (=AUTO4) is read out of the drive mode switch 90. At the step S12, due to the drive mode detection value M=AUTO4, control proceeds to the step S24. At the step S24, due to the drive mode detection value M=AUTO4, control proceeds to the step S24A where 1 (one) is added to the count value $n_1$ of the counter. At the subsequent step S25, the current drive mode detection value M (=AUTO4) is stored as the previous drive mode value $M_0$ in the RAM of the storage unit 7c, then, control proceeds to the step S17. At the step S17, the front and rear wheel revolution detection values nF, nR are read out of the front and rear wheel revolution sensors 17F, 17R, respectively, and at the subsequent step S18, the revolution difference $\Delta V_W$ between the front and rear wheels is calculated using the front and rear wheel revolution detection values nF, nR. Then, at the step S19, the front wheel torque distribution command value $T_2$ is set in accordance with the revolution difference $\Delta V_W$ between the front and rear wheels calculated at the step S18, and the characteristic as shown in FIG. 10, then, control proceeds to the step S20 where the front wheel torque distribution command value $T_2$ is output.

Second, switching is possible from the auto four-wheel drive mode to the two-wheel drive mode in a short time, so that when control proceeds from the step S10 to the step S11, the drive mode detection value M (=2) is read out of the drive mode switch 90. At the step S12, due to the drive mode detection value M=2, control proceeds to the step S14. At the step S14, due to the previous drive mode value $M_0$=AUTO4, control proceeds to the step S16.

At the step S16, since the elapsed time $n_1 \cdot \Delta T_S$ during switching from the auto four-wheel mode to the two-wheel drive mode is not greater than the switching determination time $t_1$, control is continuously executed from the steps S17 to S20, then returns to the main program. And, if the condition at the step S16 is satisfied, i.e. the elapsed time $n_1 \cdot \Delta T_S$ is not greater than the switching determination time $t_1$, control from the steps S17 to S20 is repeatedly executed, obtaining the auto four-wheel drive state.

On the other hand, if the elapsed time $n_1 \Delta T_S$ is equal to or greater than the switching determination time $t_1$ at the step S16, the front wheel torque distribution command value $T_2$ is set to zero at the step S22. Then, at the step S20, the front wheel torque distribution command value $T_2$ is output.

Figure 13:
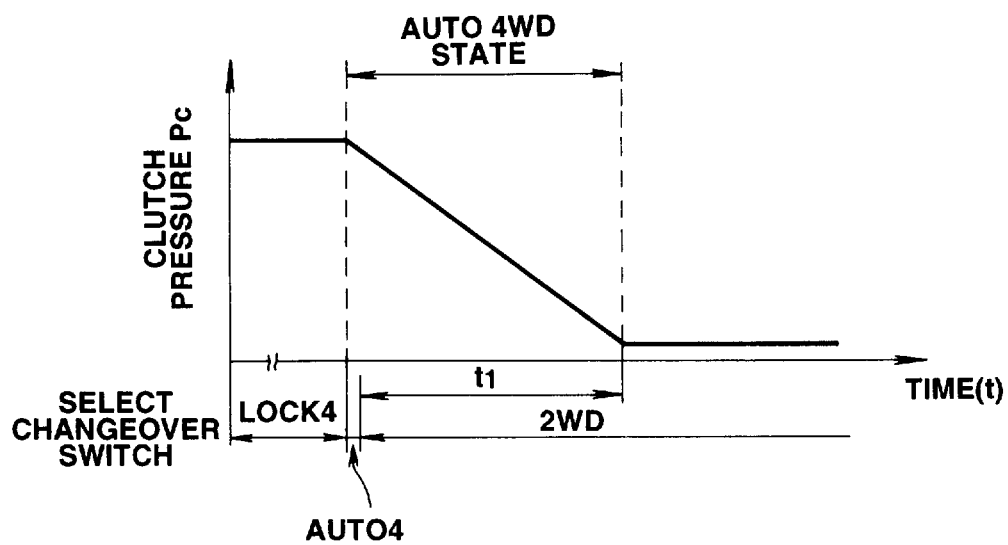
FIG. 13 is a view similar to FIG. 12, illustrating a variation in clutch pressure with the drive mode selected by the drive mode changeover switch in a short time.

As a result, when carrying out switching from the direct-coupled four-wheel drive mode (LOCK4) to the two-wheel drive mode (2WD) in a short time, the two-wheel drive mode is selected by operation of the changeover switch 87 with the auto four-wheel drive state being continued during a predetermined period of time or the switching determination time $t_1$. Thus, referring to FIG. 13, a variation in the clutch pressure $P_C$ is decreased gradually as shown in FIG. 13 due to the front wheel torque distribution command value $T_2$ set in accordance with the revolution difference $\Delta V_W$ between the front and rear wheels by repeated control from the steps S17 to S20. The clutch pressure $P_C$ is lowered gradually in such a way, so that even if the revolution difference between the front and rear wheels is produced by making a turn in the direct-coupled four-wheel drive mode, and even if "unliberated torque" occurs in the two-wheel/four-wheel drive changeover device 60, the friction plate 66b and the friction disc 66d cooperate with each other with slippage to absorb the revolution difference between the front and rear wheels. This reduces "unliberated torque" accumulated in the two-wheel/four-wheel drive changeover device 60, resulting in no occurrence of a shock in the motor vehicle even upon switching from the direct-coupled four-wheel drive mode to the two-wheel drive mode in a short time.

In the first embodiment, the changeover switch 87 is of the rotary type, alternatively, it may be of the lever type on condition that a contact of the auto four-wheel drive mode is positioned between contacts of the two-wheel drive mode and the direct-coupled four-wheel drive mode.

Figure 14:
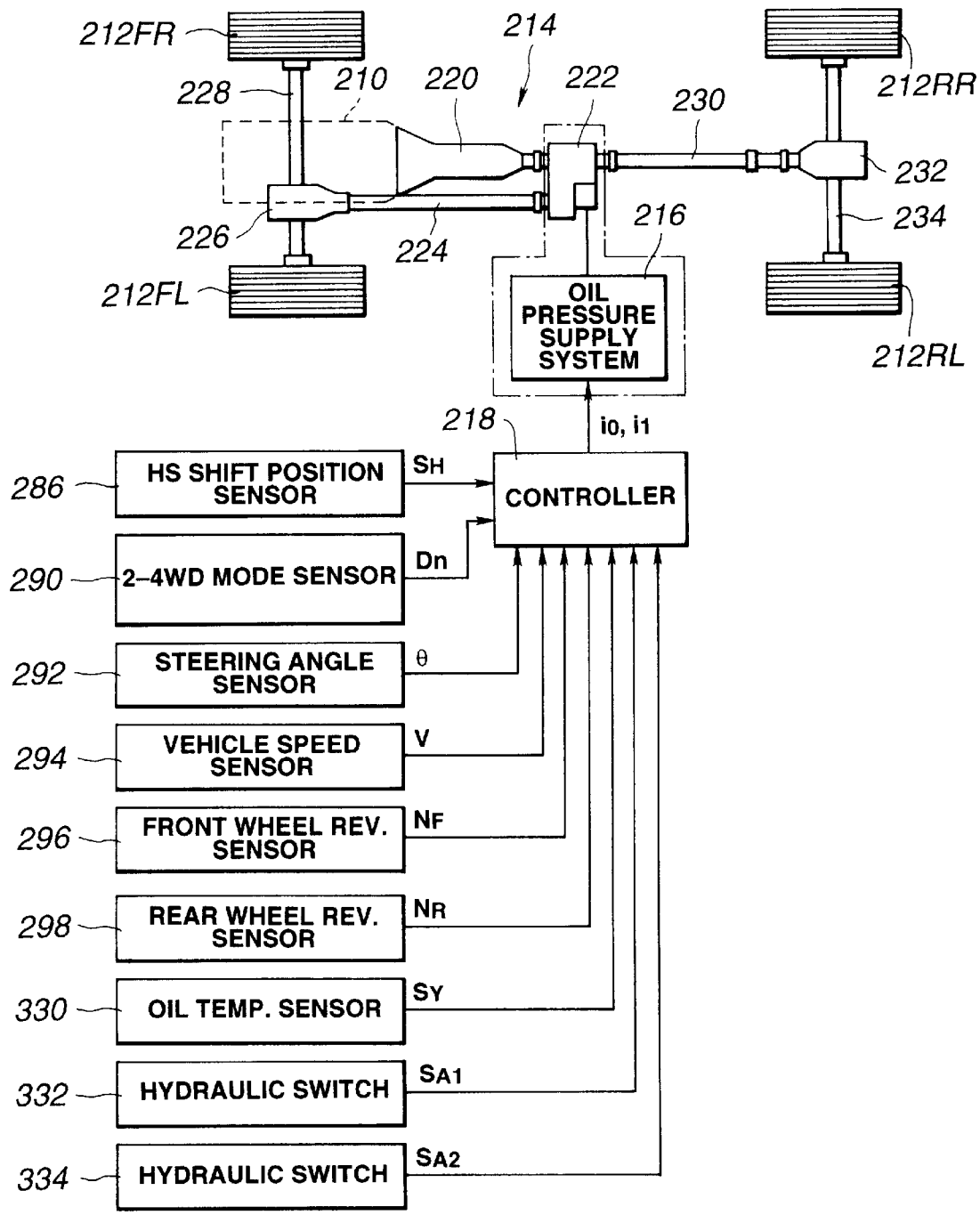
FIG. 14 is a view similar to FIG. 9, showing a second preferred embodiment of the present invention.

FIGS. 14 to 24 show a second embodiment of the present invention. Referring to FIG. 14, the part-time four-wheel drive motor vehicle is designed to cruise basically in the front-engine rear-drive (FR) mode, and is provided with an engine 210 as a drive source, front and rear wheels 212FL-212RR, a traction transmission train 214 which can change the ratio of a traction distribution between the wheels 212FL-212RR, an oil pressure supply system 216 which serves to supply an oil pressure for controlling a distribution of traction by the traction transmission train 214, and a controller 218 which serves to control the oil pressure supply system 16.

The traction transmission train 214 includes an automatic transmission 220 for shifting traction out of the engine 210 according to the gear ratio selected, and a transfer 222 for dividing traction out of the automatic transmission 220 between the front wheels 212FL, 212FR and the rear wheels or regular driving wheels 212RL, 212RR. The traction transmission train 214 is constructed so that front wheel traction divided by the transfer 222 is transmitted to the front wheels 212FL, 212FR through a front wheel output shaft 224, a front differential gear 226 and a front wheel drive shaft 228, whereas rear wheel traction is transmitted to the rear wheels 212RL, 212RR through a propeller shaft or rear wheel output shaft 230, a rear differential gear 232 and a rear wheel drive shaft 234.

Figure 15:
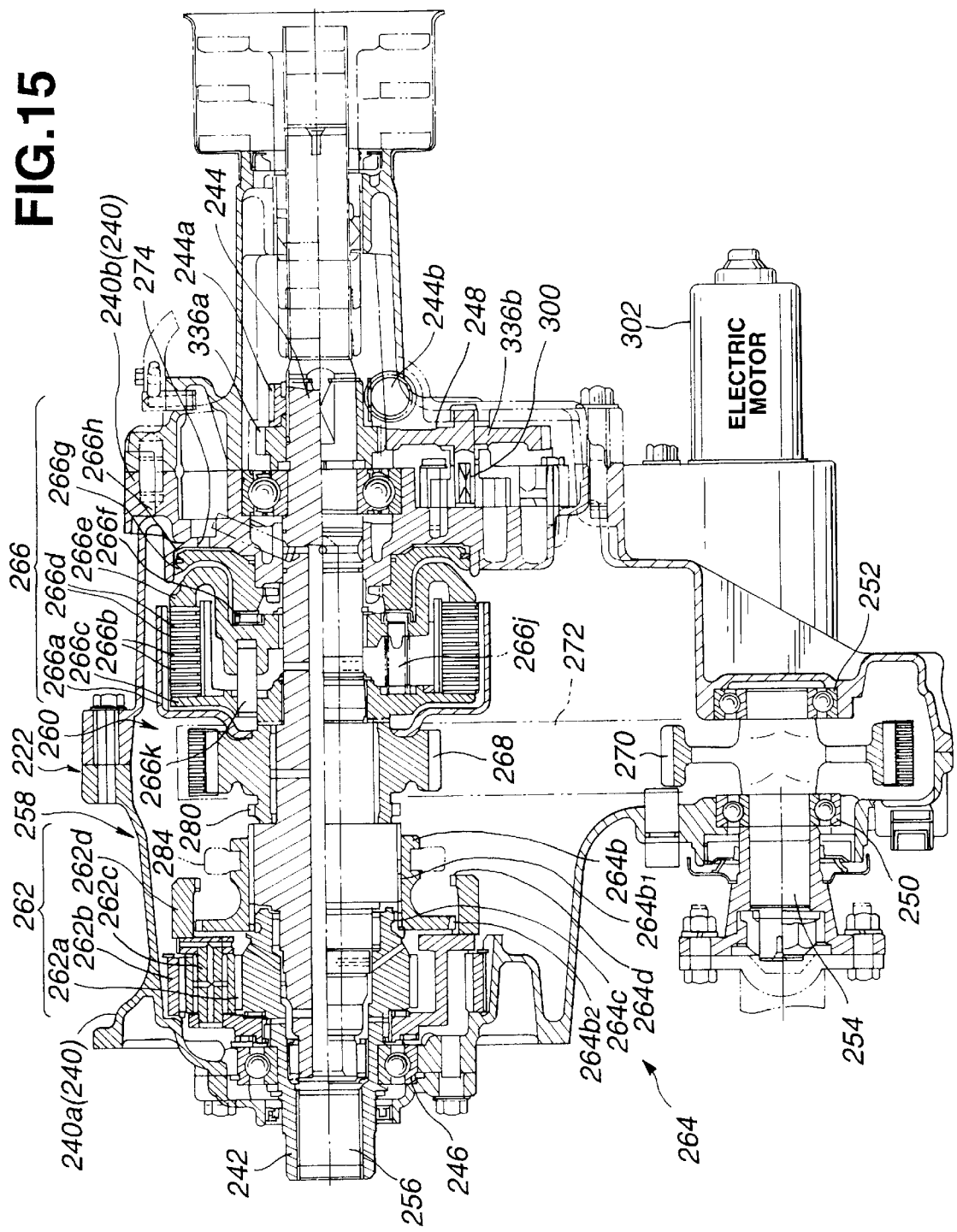
FIG. 15 is a view similar to FIG. 4, showing the transfer in FIG. 14.

Referring to FIG. 15, the transfer 222 includes in a transfer casing 240 an input shaft 242 and a first output shaft 244 disposed coaxially to butt at each other. The input shaft 242 is rotatably supported to a front casing 240a through a radial bearing 246, whereas the first output shaft 244 is rotatably supported to a rear casing 240b through a radial bearing 248, so that the two shafts 242, 244 enables relative rotation.

Moreover, a second output shaft 254 is rotatably supported to the front and rear casings 240a, 240b in lower portions thereof in parallel to the input shaft 242 and the first output shaft 244 through bearings 250, 252 disposed to the front and rear casings 240a, 240b, respectively. The input shaft 242 is coupled with an output shaft 256 of the automatic transmission 220, and the first output shaft 244 is coupled with the rear wheel output shaft 230, and the second output shaft 254 is coupled with the front wheel output shaft 224.

An auxiliary transmission unit 258 is interposed between the input shaft 242 and the first output shaft 244, whereas and a two-wheel/four-wheel drive changeover device 260 is interposed between the first output shaft 244 and the second output shaft 254.

The auxiliary transmission unit 258 comprises a planetary gear 262, and a dog-clutch-type high/low speed changeover device 264 disposed coaxially to the planetary gear 262.

The planetary gear 262 comprises a sun gear 262a formed on the outer periphery of the input shaft 242, an internal gear 262b fixed inside the front casing 240a, a pinion gear 262c engaged with the sun gear 262a and the internal gear 262b, and a pinion carrier 262d for rotatably supporting the pinion gear 262c.

The high/low speed changeover device 264 comprises a shift sleeve 264b including a cylindrical portion 264a1 having a spline hole 264b, engaged with a spline shank formed on the outer periphery of the first output shaft 244 and a flange portion $264a_2$ integrated with the cylindrical portion $264a_1$ at a left end thereof and having an external teeth $264b_2$ on the outer peripheral face thereof, a high-speed shift gear 264c formed on the outer periphery of the input shaft 242 which is engageable with the spline hole 264b, of the shift sleeve 264b, and a low-speed shift gear 264d formed on the inner periphery of the pinion carrier 262d which is engageable with the external teeth $264b_2$ of the shift sleeve 264b.

Figure 16:
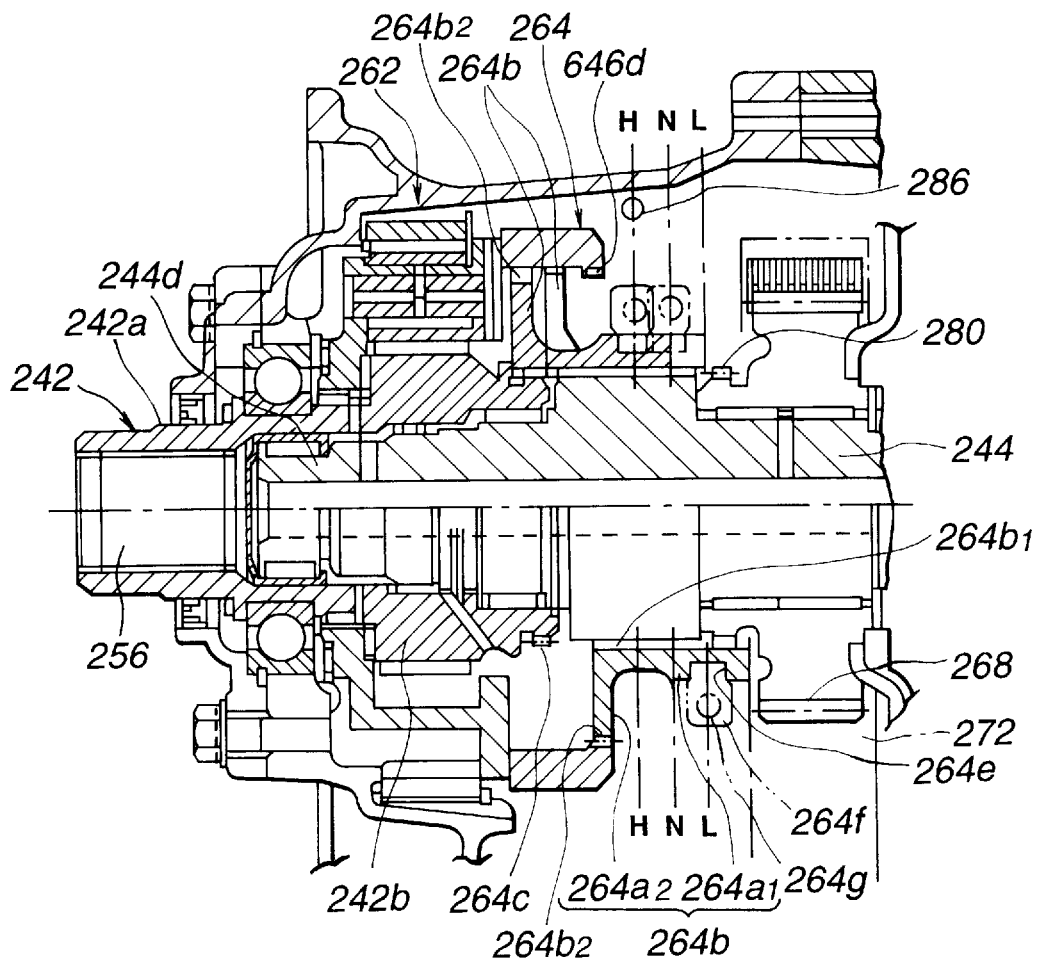
FIG. 16 is a view similar to FIG. 15, showing an auxiliary transmission unit with shift sleeve moved.

Referring to FIG. 16, the shift sleeve 264 is constructed so that a fork 264g integrated with a fork rod 264f disposed slidably in the longitudinal direction is engaged with a peripheral groove 264e formed on the outer peripheral face of a right end of the cylindrical portion $264a_1$, the fork rod 264f being coupled with an auxiliary transmission lever which enables, through a linkage, not shown, linear selection of the two-rear-wheel drive high-speed (2H) range, the four-wheel drive high-speed range (4H), the neutral (N) range, and the four-wheel drive low-speed (4L) range arranged in the vicinity of a driver's seat. When selecting the 2H range and the 4H range by the auxiliary transmission lever, the spline hole $264b_1$ is engaged with the high-speed shift gear 24c, and moved to a high-speed shift position H wherein traction transmitted to the input shaft 242 is directly transmitted to the first output shaft 244. In this state, when selecting the N range by the auxiliary transmission lever, the spline hole $264b_1$ is separated from both of the high-speed shift gear 264c and a four-wheel drive gear 280, and moved to a neutral position N wherein coupling of the input shaft 242 with the first output shaft 244 is released. Moreover, when selecting the 4L range by the auxiliary transmission lever, engagement of the spline hole 264b, with the high-speed shift gear 264c is released as seen in the lower disposition of the shift sleeve 264b in FIG. 16, and the external teeth $264b_2$ is engaged with the low-speed shift gear 264d, the spline hole $264b_1$ being moved to a low-speed shift position L wherein the spline hole $264b_1$ is engaged with the four-wheel drive gear 280 formed to a first sprocket 268 as will be described later.

Returning to FIG. 15, the two-wheel/four-wheel drive changeover device 260 comprises a wet multiple-disc friction clutch (hereafter refer to as "friction clutch") 266 for changing the ratio of a traction distribution between the front and rear wheels, the above first sprocket 268 disposed rotatably to the first output shaft 244, a second sprocket 270 coupled coaxially with the second output shaft 254, and a chain 272 arranged to allow connection between the first and second sprockets 260, 270.

The friction clutch 266 comprises a clutch drum 266a coupled with the first sprocket 268, friction plates 266b spline-coupled with the clutch drum 266a, a clutch hub 266c spline-coupled with the outer periphery of the first input shaft 244, friction discs 266d coupled integrally with the clutch hub 266c, each being disposed between the friction plates 266b, a rotary member 266e rotating together with the first output shaft 244 and moving axially toward the clutch drum 266a to bring the friction plates 266b into contact with the friction discs 266d, a pin 266k coupled integrally with the clutch hub 266c and for engaging the clutch hub 266c with the rotary member 266e, a clutch piston 266g mounted to an inner wall of the rear casing 240b and being movable axially, a thrust bearing 266f for transmitting axial movement of the clutch piston 266g to the rotary member 266e, a cylinder chamber 266h formed between the inner walls of the clutch piston 266g and the rear casing 240b, and a return spring 266j for providing to the rotary member 266e a biasing force in the direction of the clutch piston 266g.

When the oil pressure supply system 216 provides a clutch pressure $P_C$ to an input port 274 formed through the rear casing 240b which communicates with the cylinder chamber 266h, a pressing force is generated in the cylinder chamber 266h, so that the clutch piston 266g is moved leftward as viewed in FIG. 15, which is transmitted to the rotary member 266e through the thrust bearing 266f. The friction plates 266b and friction discs 266d separated from each other come in contact with each other by movement of the friction discs 266d, producing a clutch engaging force corresponding to the clutch pressure $P_C$ due to a frictional force. Thus, a driving force of the first output shaft 244 is transmitted, according to a predetermined ratio of a torque distribution corresponding to a clutch engaging force of the friction clutch 266, to the second output shaft 254 through the first sprocket 268, the chain 272, and the second sprocket 270.

On the other hand, when the clutch pressure $P_C$ as supplied is decreased, and the rotary member 266e and the clutch piston 266g are moved rightward as viewed in FIG. 15 by a biasing force of the return spring 266j so that the friction plates 266b and the friction discs 266d are separated from each other, a driving force of the first output shaft 244 is not transmitted to the second output shaft 254.

A four-wheel drive gear 280 is arranged to the first sprocket 268 on the outer periphery thereof on the side of the shift sleeve 264b. When moving the shift sleeve 264b to the low-speed shift position L as described above, the spline hole 264b 1 and the four-wheel drive gear 280 are engaged with each other to forcibly couple the first output shaft 244 with the second output shaft 254. Thus, the shift sleeve 264b and the four-wheel drive gear 280 constitute a dog clutch for forcibly forming the four-wheel drive state.

Referring to FIG. 16, disposed inside the front casing 240a are a high-speed shift position sensor 286 for sensing that the shift sleeve 264b is slidingly moved up to the high-speed shift position H. A detection signal $S_H$ of the high-speed shift position sensor 286 is input to the controller 218.

Figure 17:
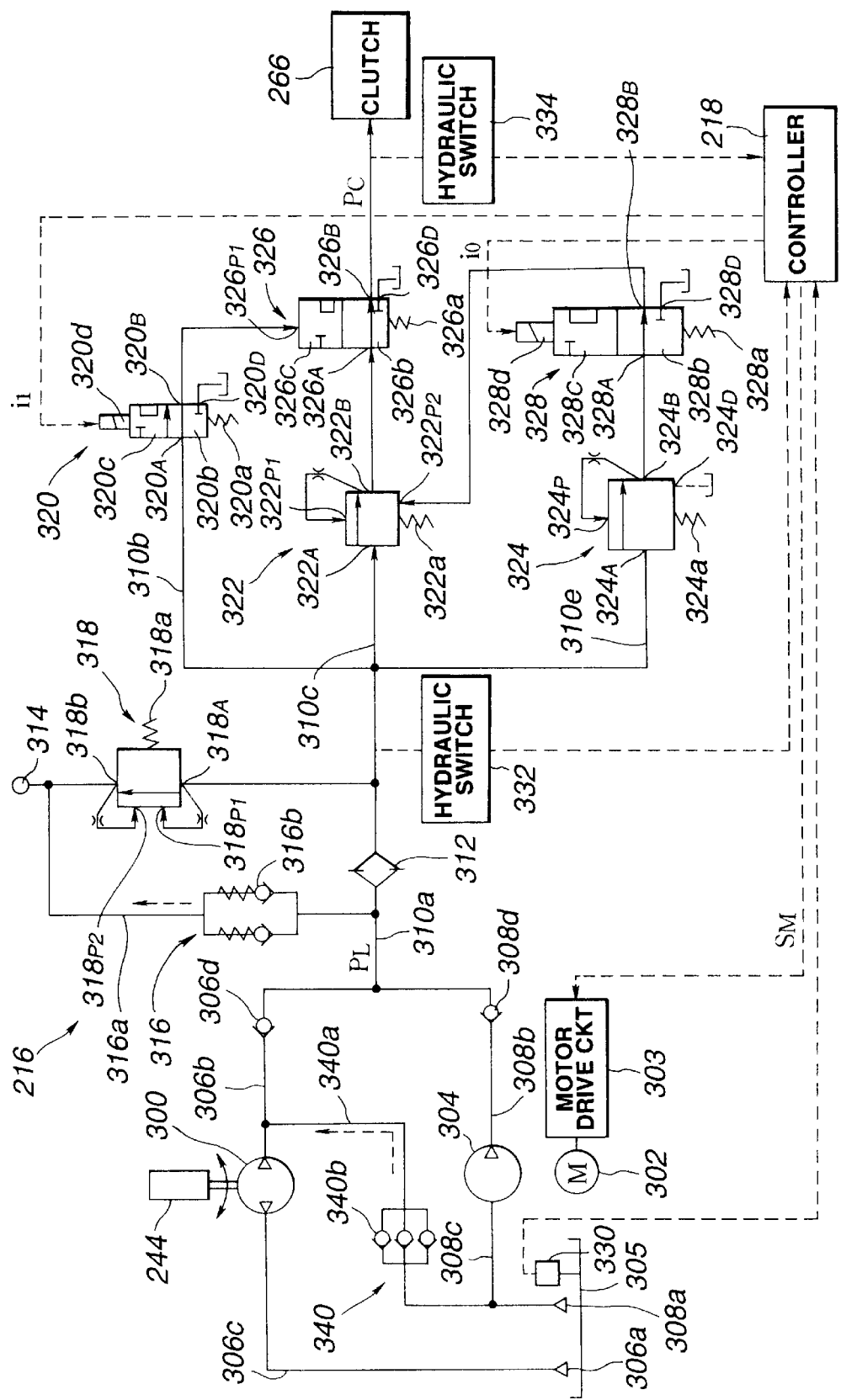
FIG. 17 is a view similar to FIG. 5, showing the oil pressure supply system in FIG. 14.

Referring to FIG. 17, the oil pressure supply system 16 has a circuit structure as shown in FIG. 17, and provides a predetermined clutch pressure $P_C$ to the input port 274 of the transfer 222.

The oil pressure supply system 216 has as an oil pressure source a main pump 300 of the normal/reverse rotation type connected directly to and driven by the first output shaft 244, and a sub-pump 304 of the normal rotation type disposed in parallel with the main pump 300 and driven by an electric motor 302 as a power source. The main pump 300 and the sub-pump 304 inhale hydraulic fluid within an oil tank 305 arranged in lower portions of the front and rear casings 240a, 240b through strainers 306a, 308a, and discharge it into ducts 306b, 308b on the discharge side. Connected to a convergent duct 310a which converges the ducts 306b, 308b is an oil element 312 to which a relief passage 316 is connected on the upstream side thereof, i.e. on the side of the main pump 300 and the sub-pump 304, the relief passage 316 having the other end connected to a lubricating system 314. Moreover, a line-pressure regulating valve 318 is connected to the oil element 312 on the downstream side thereof. Connected to ducts 310b, 310c, 310e which branch off from the convergent duct 310a are an electromagnetic selector valve 320, a clutch-pressure regulating valve 322, and a pressure reducing valve 324 on the input side thereof, respectively. Moreover, connected to the clutch-pressure regulating valve 322 on the output side thereof is a pilot selector valve 326 on the input side thereof, which supplies the clutch pressure $P_C$ to the transfer 222 when receiving a pilot pressure out of the electromagnetic selector valve 320, whereas connected to the pressure reducing valve 324 on the output side thereof is a duty-control solenoid valve 328 on the input side thereof. Arranged in the oil tank 305 are a temperature sensor 330 for sensing the temperature of hydraulic fluid, a hydraulic switch 332 for detecting a pressure reduced by the line-pressure regulating valve 318, and a pressure switch 334 for detecting the clutch pressure $P_C$ output from the pilot selector valve 326, detection signals thereof being output to the controller 18. As for the actual motor vehicles, the oil pressure supply system 216 is arranged inside the transfer 222. The main pump 300 for inhaling hydraulic fluid out of the oil tank 305 is coupled with the first output shaft 244 through first and second gears 336a, 336b as shown in FIG. 15, whereas the sub-pump 304 is coupled with the electric motor 302 mounted to the rear casing 240b on the outside thereof.

Next, referring to FIG. 17, component parts of the oil pressure supply system 216 will be described in detail.

The main pump 300 rotating in the normal direction inhales hydraulic fluid out of the oil tank 305 through the strainer 306a connected to a suction duct 306c at an end thereof, and the sub-pump 304 also inhales hydraulic fluid out of the oil tank 305 through the strainer 308a connected to a suction duct 308c at an end thereof. Check valves 306d, 308d are arranged in the discharge ducts 306b, 308b of the main pump 300 and the sub-pump 304, respectively, and a bypass passage 340 is arranged to allow communication between the discharge duct 306b of the main pump 300 and the discharge duct 308c of the sub-pump 304. The bypass passage 340 comprises a bypass duct 340a and a triple check valve 340b arranged therein, and is constructed so that when the discharge duct 306b becomes in the negative pressure state, the check valve 340b opens to form a communication passage for allowing passage of hydraulic fluid in the direction of a dotted arrow as shown in FIG. 17.

The relief passage 316 connected to the convergent duct 310a on the upstream side of the oil element 312 comprises a relief duct 316a having the other end connected to the lubricating system 314, and a double spring check valve 316b arranged therein. When an oil pressure on the upstream side of the oil element 312 becomes greater than a predetermined value due to clogging produced in a filter of the oil element 312, the check valve 316b opens to form a communication passage for allowing passage of hydraulic fluid in the direction of a dotted arrow as shown in FIG. 17.

The line-pressure regulating valve 318 comprises a pressure regulating valve of the inner pilot and spring type, including a spool arranged slidably in a cylindrical valve housing having an input port 318A connected to the convergent duct 310a, an output port $318_B$ connected to the lubricating system 314 and inner pilot ports $318_{P1}$, $318_{P2}$ receiving primary and secondary pressures through stationary orifices, and a return spring 318a for biasing the spool on the one end side. A line pressure $P_L$ increased through the main pump 300 or the sub-pump 304 is decreased to a predetermined value by the line-pressure regulating valve 318, which is provided to the electromagnetic selector valve 320, the clutch-pressure regulating valve 322, and the pressure reducing valve 324. Hydraulic fluid flowing out of the output port $318_B$ upon decreasing is supplied to the lubricating system 314.

The clutch-pressure regulating valve 322 comprises a pressure regulating valve of the inner and outer pilot and spring type, including a spool arranged slidably in a cylindrical valve housing having an input port $322_A$ connected to the duct 310c, an output port $322_B$ connected to the pilot selector valve 326, an inner pilot port $322_{P1}$ receiving as a pilot pressure the secondary pressure through a stationary orifice and an outer pilot port $322_{P2}$ receiving a control pressure out of the duty-control solenoid valve 328, and a return spring 322a for biasing the spool on the one end side. The clutch-pressure regulating valve 322 is constructed so that when receiving no pilot control pressure out of the duty-control solenoid valve 328, a communication passage between the input port $322_A$ and the output port $322_B$ is closed so as not to output the secondary pressure, whereas when receiving the pilot control pressure out of the duty-control solenoid valve 328, the spool is moved to output from the output port $322_B$, as the clutch pressure $P_C$, the secondary pressure corresponding to the pilot control pressure.

The pressure reducing valve 324 comprises a pressure reducing valve of the inner pilot and spring type and with a constant secondary pressure, including a spool arranged slidably in a cylindrical valve housing having an input port $324_A$ connected to the duct 310e, an output port $324_B$ connected to the duty-control solenoid valve 328, an inner pilot port $324_{P1}$ receiving as a pilot pressure the secondary pressure out of the output port $324_B$ through a stationary orifice and a drain port $324_H$, and a return spring 324a for biasing the spool on the one end side. When the spool is moved to a predetermined position by the pilot pressure supplied to the inner pilot port $324_P$, the primary pressure out of the input port $324_A$ is supplied, as a control pressure having a predetermined reduced value, to the duty-control solenoid valve 328.

The duty-control solenoid valve 328 has three ports and two positions. This valve includes an input port $328_A$ connected to the pressure reducing valve 324, a drain port $328_R$ connected to a drain, an output port $328_B$ connected to an outer pilot port $322_{P2}$ of the clutch-pressure regulating valve 322, and a return spring 327a. The duty-control solenoid valve 328 is movable between a normal position 328b wherein a spool arranged in the valve allows communication between the output port $328_B$ and the drain port $328_R$, and an operating position 328c wherein the spool allows communication between the input port $328_A$ and the output port $328_B$. When the controller 218 provides to a solenoid 328d an exciting current $i_0$ with a predetermined duty ratio, the spool is moved from the normal position 328b to the operating position 328c against the return spring 328a during a period of time that the current $i_0$ is turned on, outputting to the clutch-pressure regulating valve 322 the pilot control pressure corresponding to the duty ratio. Therefore, when the duty-control solenoid valve 328 supplies the control pressure to the outer pilot port $322_{P2}$, the clutch-pressure regulating valve 322 provides the clutch pressure $P_C$ corresponding to the pilot control pressure, so that a clutch engaging force of the friction clutch 266 is controlled according to this, obtaining a distribution of drive torque to the front wheels in accordance with the clutch pressure $P_C$.

The electromagnetic selector valve 320 is of the spring-offset type, and has three ports and two positions. This valve includes an input port $320_A$ receiving a line pressure, an output port $320_B$ connected to an outer pilot port $326_{P1}$ of the pilot selector valve 326, and a drain port $320_D$. The electromagnetic selector valve 320 is movable between a normal position $320b$ wherein a spool arranged in the valve closes the input port $320_A$ and allows communication of the output port $320_B$ with the drain port $320_D$, and an operating position $320c$ wherein the spool allows communication between the input port $320_A$ and the output port $320_B$ and closes the drain port $320_D$. When the controller 218 provides to a solenoid $320d$ an exciting current $i_1$, the spool is moved to the operating position $320c$ against the return spring $320a$ during a period of time that the current $i_1$ is turned on, providing the pilot control pressure to the outer pilot port $326_{P1}$ of the pilot selector valve 326. On the other hand, when the exciting current $i_1$ out of the controller 218 is turned off, the spool is returned to the normal position $320b$ by a pressing force of the return spring $320a$, so that the pilot control pressure being supplied to the outer pilot port $326_{P1}$ is removed through the drain port $320_D$.

Figure 18:
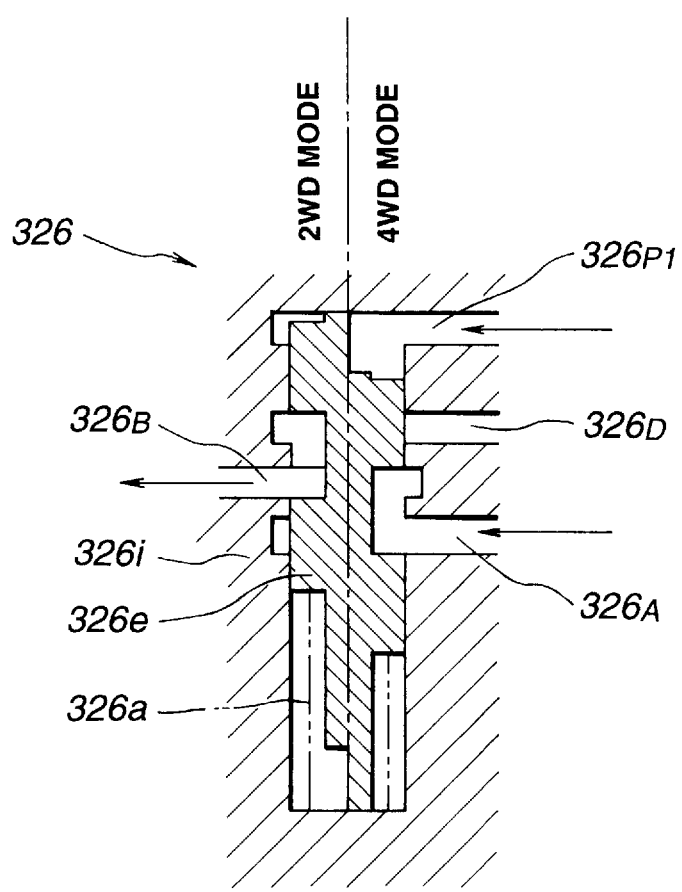
FIG. 18 is a view similar to FIG. 6, showing the pilot selector valve used in the oil pressure supply system in FIG. 14.

Referring also to FIG. 18, the pilot selector valve 326 includes a spool $326e$ arranged slidably in a cylindrical housing $326i$ having an input port $326_A$ receiving the secondary pressure out of the clutch-pressure regulating valve 322, an output port $326_B$ providing the secondary pressure to the transfer 222, an outer pilot port $326_{P1}$ receiving the control pressure when the solenoid $320d$ of the electromagnetic selector valve 320 is turned on and a drain port $326_H$, and a return spring $326a$ for biasing the spool $326e$ on the one end side.

When supplying no pilot control pressure to the outer pilot port $326_{P1}$ the spool $326e$ of the pilot selector valve 326 is moved to a two-wheel drive (2WD) mode position $326b$ wherein the input and output ports $326_A$, $326_B$ are closed, and the output port 326B is in communication with the drain port $326_D$ as seen in a left half in FIG. 18. On the other hand, when the solenoid $320d$ of the electromagnetic selector valve 320 is turned on, the spool of the electromagnetic selector valve 320 is moved to a four-wheel drive (4WD) mode position $326c$ wherein the spool is placed in the operating position $320c$ to supply the control pressure to the outer pilot port $326_{P1}$, and the input port $326_A$ is in communication with the output port $326_B$ as seen in a right half in FIG. 18.

In such a way, the pilot selector valve 326 is driven by the pilot control pressure out of the electromagnetic selector valve 320, i.e. the spool $326e$ is driven by the pilot control pressure having a high value, so that even when the spool $326e$ has a great slide resistance due to dust, chips, etc. attached to a slide passage thereof, sliding of the spool $320e$ can be ensured.

Returning to FIG. 14, the controller 218 serves to output the exciting currents $i_0$, $i_1$ to the oil pressure supply system 216 in accordance with detection signals out of the high-speed shift position sensor 286, a two-wheel/four-wheel drive mode sensor 290 disposed in the 2H range position of the auxiliary transmission lever and constructed to be turned on when selecting the 2H range, a steering angle sensor 292 for sensing a steering angle θ of a steering wheel of the motor vehicle and a vehicle speed sensor 294 as turning detecting means of the motor vehicle, a front wheel revolution sensor 296 for sensing a revolution of the front wheel output shaft 224, and a rear wheel revolution sensor 298 for sensing as a rear wheel revolution a revolution of the input shaft 242 coupled with the output shaft of the automatic transmission 220 as cruising state detecting means of the motor vehicle. In the second embodiment, the controller 218 is constructed to carry out control for enabling the oil pressure supply system 216 to keep a predetermined line pressure, and it is thus provided with the above oil temperature sensor 330 and hydraulic switches 332, 334, and outputs a motor control signal $S_M$ to the oil pressure supply system 216 in accordance with the detection signals of these sensors.

Figure 19:
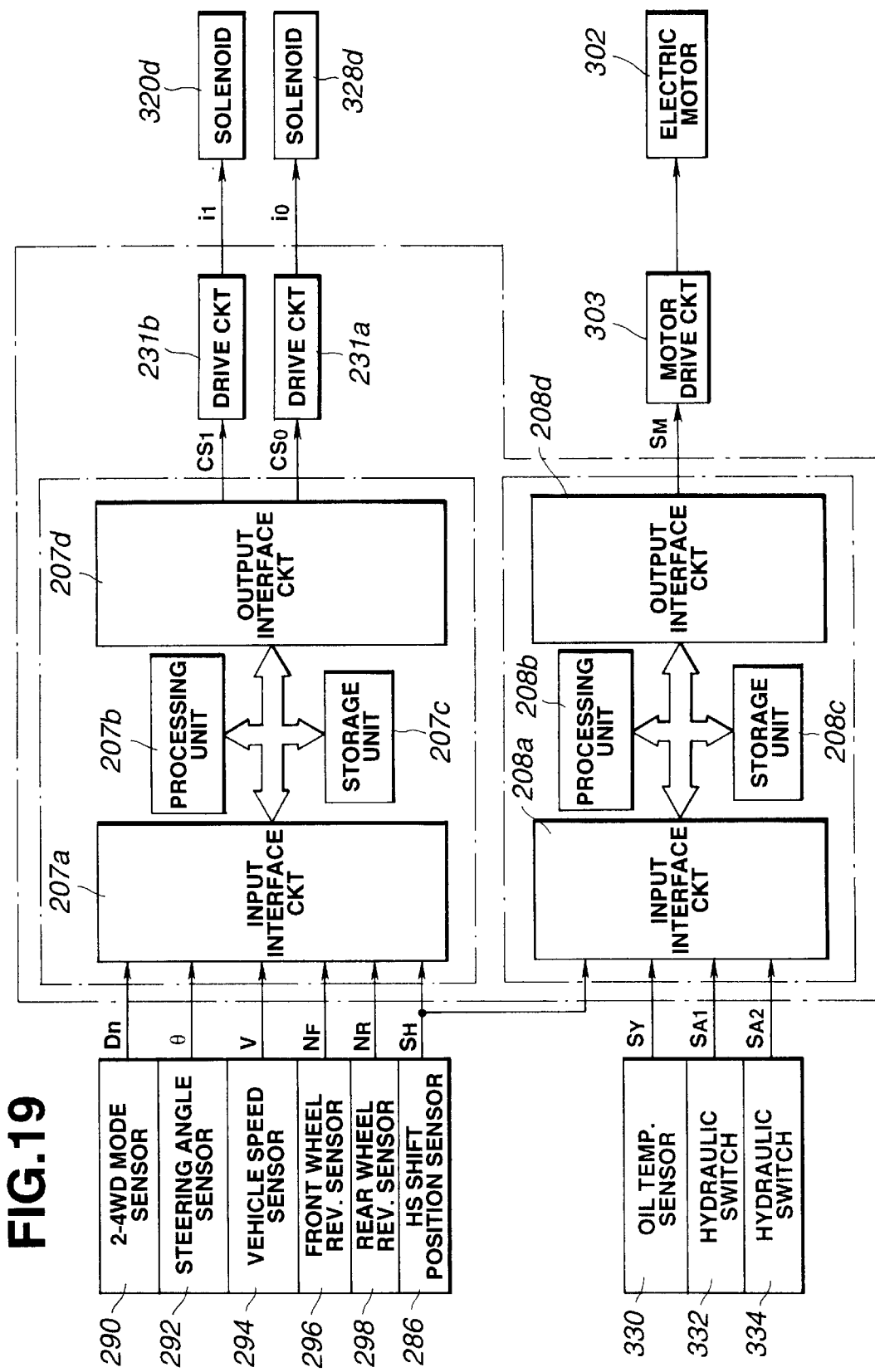
FIG. 19 is a view similar to FIG. 14, showing the controller in FIG. 14.

Referring to FIG. 19, the controller 218 is provided with a microcomputer 207 for carrying out traction distribution control, a microcomputer 208 for carrying out the above control of keeping a predetermined oil pressure, a drive circuit $231a$ for supplying in accordance with a control signal $CS_0$ out of the microcomputer 207 the exciting current $i_0$ having a predetermined duty ratio D to the solenoid $328d$ of the duty-control solenoid valve 328 in the oil pressure supply system 216, a drive circuit $231b$ for supplying the exciting current $i_1$ which is turned on and off in accordance with a control signal $CS_1$ out of the microcomputer 207 to the solenoid $320d$ of the electromagnetic selector valve 320 in the oil pressure supply system 216, and a motor drive circuit 303 for carrying out chopper control of the electric motor 302 in accordance with the motor control signal $S_M$ out of the microcomputer 208 so as to obtain a revolution or rotating speed in accordance therewith.

The microcomputer 207 is provided with an input interface circuit $207a$ having the A/D conversion function for reading as detection values the detection signals of the sensors 286, 290, 292, 294, 296, 298, a processing unit $207b$ for carrying out computing/processing for traction distribution control according to a predetermined program (see FIG. 24), a storage unit $207c$ such as a read-only memory (ROM), a random access memory (RAM) or the like, and an output interface circuit $207d$ for outputting the control signal $CS_0$ of the duty ratio D for commanding the clutch pressure $P_C$ which determines a distribution of torque to the front wheels obtained by the processing unit $207b$ and corresponding to a revolution difference AN between the front and rear wheels, and the control signal $CS_1$ for determining whether to output the clutch pressure $P_C$ or not. On the other hand, the microcomputer 208 is provided with an input interface circuit $208a$ having the A/D conversion function for reading as detection values the detection signals of the sensors 330, 332, 334, a processing unit $208b$, a storage unit $208c$ such as a ROM, a RAM or the like, and an output interface circuit $208d$ having the D/A conversion function for outputting, as the analog voltage signal $S_M$, for example, an electric motor revolution command value obtained by the processing unit $208b$.

Figure 24:
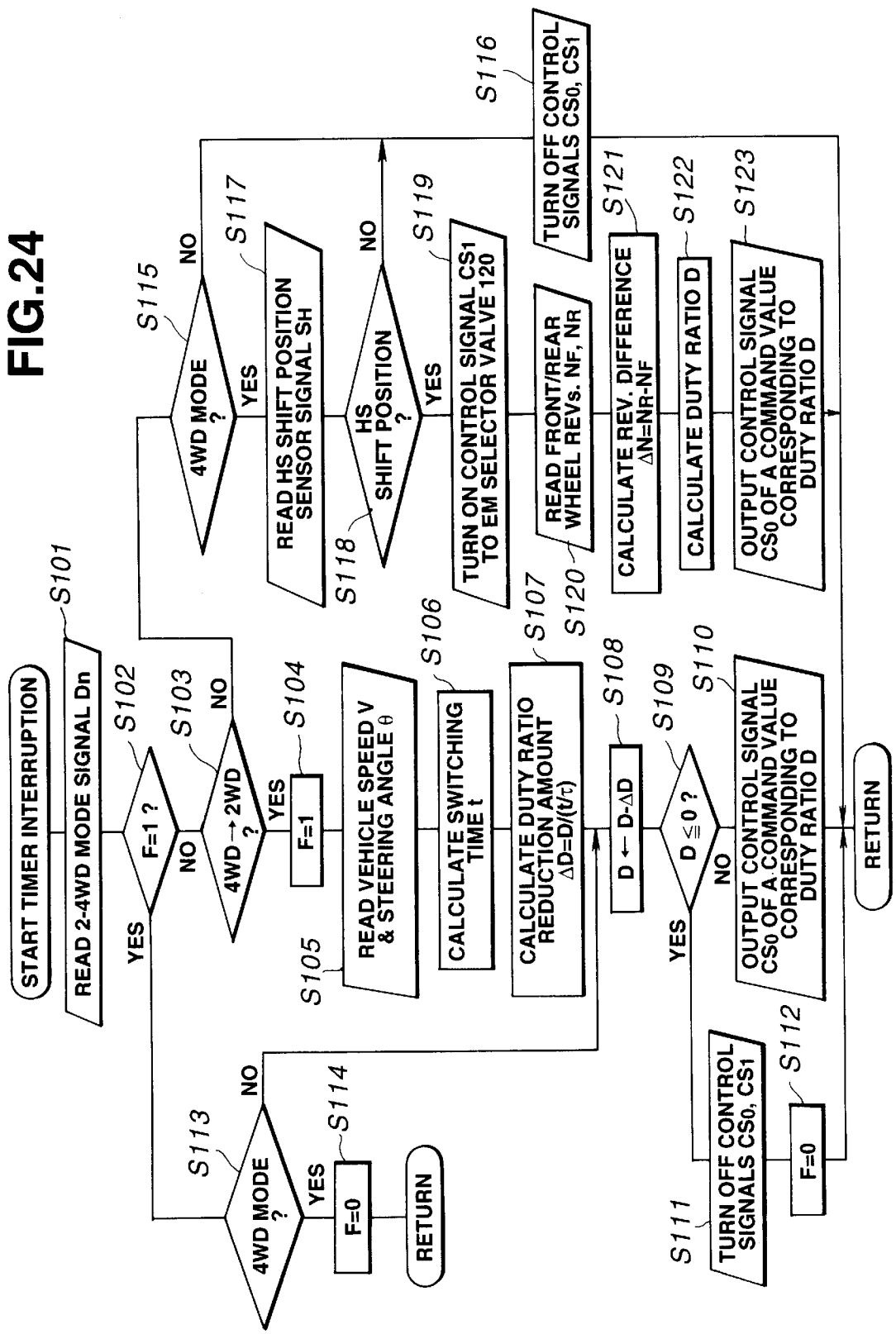
FIG. 24 is a view similar to FIG. 11, showing operation of the second preferred embodiment of the present invention.

Referring to FIG. 24, in accordance with the high-speed shift position detection signal $S_H$ out of the high-speed shift position sensor 286, a mode signal Dn out of the two-wheel/four-wheel drive mode sensor 290, the steering angle detection signal θ out of the steering angle sensor 292, a vehicle speed detection signal V out of the vehicle speed sensor 294, a revolution detection value $N_F$ out of the front wheel revolution sensor 296, and a revolution detection value $N_R$ out of the rear wheel revolution sensor 298, the microcomputer 207 determines a front wheel torque distribution command value $T_2$ when the high-speed position detection signal $S_H$ is turned on, and calculates the duty ratio D for determining the clutch pressure $P_C$ corresponding to the command value $T_2$, producing the control signal $CS_0$ having a command value corresponding to the duty ratio D. The microcomputer 207 also controls the control signal $CS_1$ in the on state. When the mode signal Dn is switched from the off state to the on state, i.e. selection is made from the four-wheel drive state to the two-wheel drive state, the microcomputer 207 calculates a switching time "t" in accordance with the steering angle detection signal θ of the steering angle sensor 292 and the vehicle speed detection signal V of the vehicle speed sensor 294, and carries out during the switching time "t" four-wheel/two-wheel drive switching processing for gradually decreasing the duty ratio D for commanding the clutch pressure $P_C$ so as to achieve gradual switching from the four-wheel drive state to the two-wheel drive state. When the mode signal Dn of the two-wheel/four-wheel drive mode sensor 290 is turned on, whereas the detection signal SH of the high-speed shift position sensor 286 is turned off, the microcomputer 207 turns the control signals $CS_0$, $CS_1$ off, which are output to the drive circuits 231a, 231b, respectively.

The drive circuit 231a is provided with a pulse duration modulation circuit, for example, for outputting an exciting current of the duty ratio D in accordance with a command value of the control signal $CS_0$ which is in the form of an analog voltage signal output from the microcomputer 207, and serves to output to the solenoid 328d of the duty-control solenoid valve 328 the exciting current $i_0$ of the duty ratio D in accordance with the command value of the control signal $CS_0$.

The drive circuit 231b serves to convert the control signal $CS_1$ out of the microcomputer 207 into the exciting current $i_1$ having an enough value to excite the solenoid 320d of the electromagnetic selector valve 320, which is output to the solenoid 320d of the electromagnetic selector valve 320.

Moreover, the controller 208 carries out processing, i.e. control for enabling the oil pressure supply system 216 to supply a predetermined oil pressure, as follows. When the hydraulic switch 332 detects, for example, that the line pressure $P_L$ downstream of the oil element 312 of the convergent duct 310a is lower than a set value in accordance with a control program, not shown, the control signal $S_M$ indicative of a revolution command value determined in accordance with the oil temperature detection value $S_Y$ of the oil temperature sensor 330 is calculated to control a discharge pressure or discharged oil amount of the sub-pump 304, which is provided to the motor drive circuit 303 to control a revolution of the electric motor 302, thus maintaining the line pressure $P_L$ out of the oil pressure supply system 216 at a predetermined value. When detecting that the detection signal $S_H$ of the high-speed shift position sensor 286 is turned on, and the clutch pressure $P_C$ out of the pilot selector valve 326 is zero, the microcomputer 208 determines that the pilot selector valve 326 is abnormal, and raises an alarm.

The storage unit 207c of the microcomputer 207 has previously stored program and fixed data necessary for execution of processing in the processing unit 208b, and can temporally store results of processing.

Figure 20:
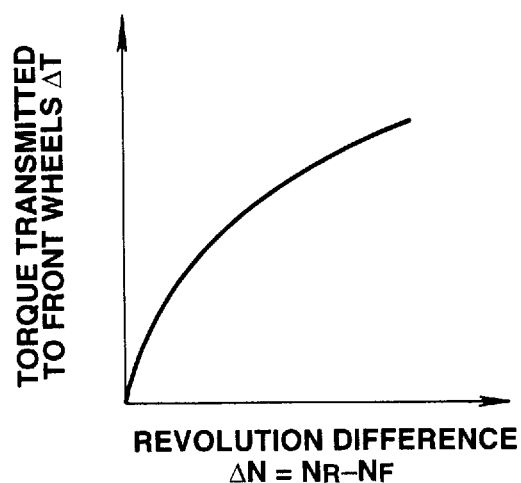
FIG. 20 is a view similar to FIG. 13, illustrating a characteristic of front wheel transmission torque vs. revolution difference between front and rear wheels according to the second preferred embodiment.
Figure 21:
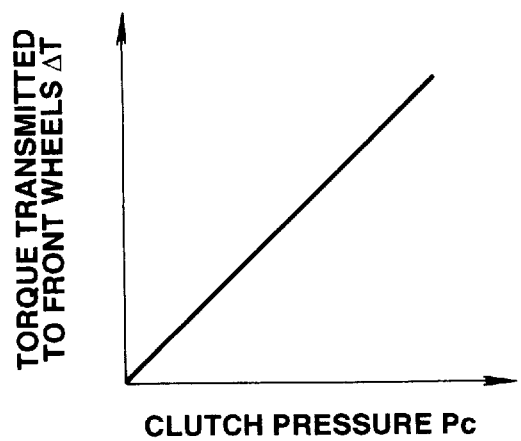
FIG. 21 is a view similar to FIG. 20, illustrating a characteristic of front wheel transmission torque vs. clutch pressure according to the second preferred embodiment.
Figure 22:
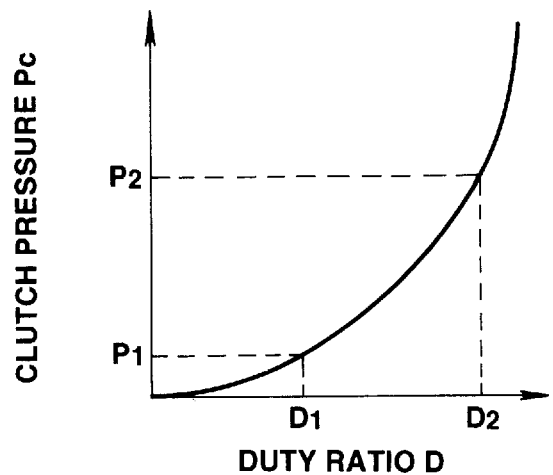
FIG. 22 is a view similar to FIG. 21, illustrating a characteristic of clutch pressure vs. duty ratio.
Figure 23:
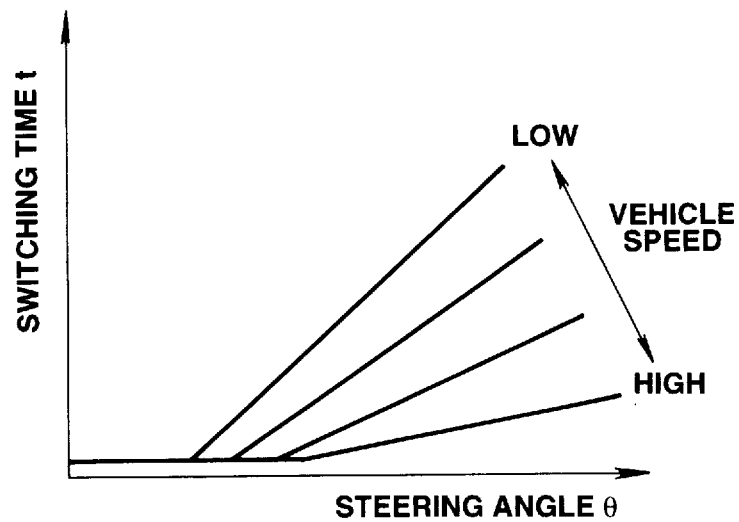
FIG. 23 is a view similar to FIG. 22, illustrating a characteristic of switching time vs. steering angle with vehicle speed as a parameter.

The fixed data include memory tables corresponding to control characteristics as shown in FIGS. 20 to 23, respectively. FIG. 20 shows a control characteristic of a front wheel transmission torque ΔT vs. the revolution difference ΔN between the front and rear wheels. As seen in FIG. 20, a traction distribution, i.e. the front wheel transmission torque ΔT, is nonlinearly increased in accordance with an increase in the revolution difference ΔN between the front and rear wheels. FIG. 21 shows a value of the front wheel transmission torque ΔT which is linearly increased in accordance with an increase in the clutch pressure $P_C$ of the pilot selector valve 326. FIG. 22 shows a value of the clutch pressure $P_C$ of the clutch-pressure regulating valve 322 which is nonlinearly parabolically increased in accordance with an increase in the duty ratio D of the exciting current $i_0$ supplied to the solenoid 328d of the duty-control solenoid valve 328. FIG. 23 shows a memory table indicative of the relationship between the steering angle θ and the switching time "t" required for selection from the four-wheel drive state to the two-wheel drive state with the vehicle speed V as a parameter. As seen from a characteristic curve in FIG. 23, when the vehicle speed V is low, increasing of the switching time "t" is started from the relatively small steering angle $\theta_{S1}$, and the rate of increasing thereof is greater, whereas with the vehicle speed V being higher, the steering angle θ at which increasing of the switching time "t" is started is greater, and the rate of increasing thereof is smaller.

When determining the front wheel transmission torque ΔT in accordance with the revolution difference ΔN between the front and rear wheels and in referring to the memory table corresponding to FIG. 20, the microcomputer 207 refers successively the memory tables corresponding to FIGS. 21 and 22 to calculate back a value of the duty ratio D to be output by the controller 218. Referring to FIG. 22, when the clutch pressure $P_C$ between $P_1$ and $P_2$ corresponding to the duty ratio D between $D_1$ and $D_2$ is supplied to the friction clutch 266, the ratio of a torque distribution between the front and rear wheels in accordance with an engaging force of the friction clutch 266 is changed continuously, i.e. in the range from 0%:100% to 50%:50%. When the duty ratio D is smaller than $D_1$, the clutch pressure $P_C$ is produced, so that the friction plate 266b and friction disc 266d of the friction clutch 266 come in press contact with each other, but with no transmission of traction. When the mode signal Dn of the two-wheel/four-wheel drive mode sensor 290 is switched from the off state to the on state so as to make selection from the four-wheel drive state to the two-wheel drive state, the duty ratio D is gradually decreased to achieve switching from the four-wheel drive state to the two-wheel drive state during the switching time "t" determined in referring to the memory table as shown in FIG. 23.

Referring to FIG. 24, the microcomputer 207 carries out oil pressure supply control in accordance with basic processing as shown in a flowchart in FIG. 24.

A brief description will be made with regard to the basic processing of oil pressure supply control. The basic processing is executed every predetermined period of time τ, e.g. 20 msec, by a timer interrupt. First, at a step S101, the mode signal Dn is read out of the two-wheel/four-wheel drive mode sensor 290, and at a subsequent step S102, it is determined whether or not a switching determination flag F is set to 1 (one), which is indicative that switching is being carried out from the four-wheel drive state to the two-wheel drive state. If the switching determination flag F is reset to zero, control proceeds to a step S103 where it is determined whether or not selection is made from the four-wheel drive mode to the two-wheel drive mode in accordance with the mode signal Dn. As for this determination, if the mode upon previous processing corresponds to the four-wheel drive mode, and the mode upon current processing corresponds to the two-wheel drive mode, it is determined that switching is made from the four-wheel drive mode to the two-wheel drive mode, and control proceeds to a step S104.

At the step S104, the switching determination flag F is set to 1 (one), and a subsequent step S105, the vehicle speed detection signal V and the steering angle detection signal θ are read in the RAM. Then, at a step S106, the switching time "t" is calculated in accordance with the vehicle speed detection signal V and the steering angle detection signal θ and in referring to the memory table as shown in FIG. 23.

At a subsequent step S107, the current duty ratio D is read out of a predetermined storage area in the storage unit 207c. Using the current duty ratio D, the processing period τ, and the switching time "t", calculation is carried out according to the following formula to obtain a reduction amount ΔD of the duty ratio D per processing:

$$\Delta D = D/(t/\tau) \tag{1}$$

At a subsequent step S108, a value obtained by subtracting the reduction amount ΔD of the duty ratio D from the current duty ratio D is set as a new duty ratio D, and stored in a predetermined storage area in the storage unit 207c. Then, at a step S109, it is determined whether or not the duty ratio D is zero or negative. When D>0, control proceeds to a step S110 where the duty ratio D is read out of a predetermined storage area in the storage unit 207c, and the control signal $CS_0$ for the duty-control solenoid valve 328 having a command value corresponding to this duty ratio D is output to the drive circuit 231a, finishing timer interrupt processing, returning to the predetermined main program. On the other hand, when D≦0, control proceeds to a step S111 where the control signal $CS_0$ for the duty-control solenoid valve 328 and the control signal $CS_1$ for the electromagnetic selector valve 320 are turned off, then, control proceeds to a step S112 where the switching determination flag F is reset to zero, finishing timer interrupt processing, returning to the predetermined main program.

At the step S102, if it is determined that the switching determination flag F is set to 1 (one), control proceeds to a step S113 where it is determined whether or not the mode of the mode signal Dn corresponds to that one other than the two-wheel drive mode. If the mode of the mode signal Dn corresponds to the two-wheel drive mode, control proceeds to the step S108 to continue switching to the two-wheel drive mode, whereas if the mode of the mode signal Dn does not correspond to the two-wheel drive mode, but the four-wheel drive mode, control proceeds to a step S114 where the switching determination flag F is reset to zero, finishing timer interrupt processing, returning to the predetermined main program.

At the step S103, if it is determined that switching is not made from the four-wheel drive mode to the two-wheel drive mode, control proceeds to a step S108 where it is determined whether or not the four-wheel drive mode is in operation. If the two-wheel drive mode is in operation, control proceeds to a step S116 where the control signals $CS_0$, $CS_1$ are turned off, finishing timer interrupt processing, returning to the predetermined main program. On the other hand, if the four-wheel drive mode is in operation, control proceeds to a step S117 where the detection signal $S_H$ is read out of the high-speed shift position sensor 286.

At a subsequent step S118, it is determined whether or not the shift sleeve 264b is moved to the high-speed shift position H. If it is determined that the shift sleeve 264b is not moved to the high-speed shift position H, control proceeds, in view of no need of controlling the friction clutch 266, to the step S116 where the control signals $CS_0$, $CS_1$ are turned off, returning to the predetermined main program. On the other hand, if it is determined that the shift sleeve 264b is moved to the high-speed shift position H, control proceeds to a step S119 where the control signal $CS_1$ for the electromagnetic selector valve 320 is turned on. At a subsequent step S120, the revolution detection values $N_F$, $N_R$ are read out of the front and rear wheel revolution sensors 286, 288. At a subsequent step S121, the revolution difference ΔN is obtained by subtracting the front wheel revolution $N_F$ from the rear wheel revolution NR, then, control proceeds to a step S122.

At the step S122, the front wheel distribution torque ΔT corresponding to the revolution difference ΔN is calculated in accordance with the revolution difference ΔN and in referring successively to the memory tables as shown in FIGS. 20 to 23 so as to obtain the clutch pressure $P_C$ of the friction clutch 266, and the duty ratio D in the range from D0 to $D_1$ corresponding to the clutch pressure $P_C$ is calculated, which is stored in a predetermined storage area in the storage unit 207c. At a subsequent step S123, the control signal $CS_0$ having a command value corresponding to the duty ratio D as determined is output to the drive circuit 231a, returning to the predetermined main program.

It is noted that in FIG. 24, processing at the steps S105, S106 correspond to time setting means, and processing at the steps S102 to S104, S107 to S113 correspond to engaging force reducing means.

Next, operation of this embodiment will be describe.

Suppose that the motor vehicle is now at a standstill with the shift lever of the automatic transmission 220 being in the parking range position, the auxiliary transmission lever being in the 2H range position, and the engine 210 being stopped. In that state, if an ignition switch is turned on to start the engine 210, the controller 218 is supplied with power, so that after carrying out a predetermined initialization processing, i.e. reset of the flag, clear of the duty ratio D to zero of the microcomputers 207, 208, the controller 218 starts a predetermined processing.

At that time, since the motor vehicle is at a standstill with the shift lever being in the parking range position, traction of the engine 210 is not transmitted to the output shaft 256 of the automatic transmission 220. Rotation of the input shaft 242 and first output shaft 244 of the transfer 222 coupled with the output shaft 256 is thus stopped, so that the main pump 300 of the oil pressure supply system 216 is not driven, having substantially zero line pressure $P_L$ in the convergent duct 310a. As a result, the hydraulic switch 332 is turned on to provide the switching signal $S_{A1}$ thereof to the microcomputer 208 which determines a revolution of the electric motor 302 in accordance with the oil temperature detection value $S_Y$ of the oil temperature sensor 330, and outputs the motor control signal $S_M$ to the motor drive circuit 303 in accordance with the revolution as determined. Thus, the electric motor 302 is driven by the motor drive circuit 303 at a revolution as determined, which causes driving of the sub-pump 304 to discharge hydraulic fluid having a predetermined pressure which is supplied to the convergent duct 310a through the check valve 308d, increasing the line pressure $P_L$. When the line pressure $P_L$ reaches a set value, the hydraulic switch 332 is turned off to stop driving of the electric motor 302.

On the other hand, the microcomputer 207 carries out processing as shown in FIG. 24. However, since the auxiliary transmission lever is in the 2H range position, the mode signal Dn of the two-wheel/four-wheel drive mode sensor 290 is turned on with the switching determination flag F being reset to zero. Thus, control proceeds via the steps S101 to S103 from the step S115 to the step S116 where the control signals $CS_0$, $CS_1$ are turned off. As a result, the exciting currents $i_0$, $i_1$ out of the drive circuits 231a, 231b are cut off. Thus, the duty-control solenoid valve 328 is maintained in the normal position 328b wherein the pilot control pressure thereof is equal to an atmospheric pressure, outputting no clutch pressure $P_C$ from the clutch-pressure regulating valve 322, whereas the electromagnetic selector valve 320 is maintained in the normal position 320b wherein the pilot control pressure thereof is equal to the atmospheric pressure, so that the pilot selector valve 326 is maintained in the normal position wherein the clutch pressure $P_C$ is equal to the atmospheric pressure, having no engagement of the friction clutch 266, obtaining the two-rear-wheel drive state that only the first output shaft 244 coupled with the rear wheels 212RL, 212RR is connected to the input shaft 242.

Thereafter, in case of cruising on a good road, for example, the D range is selected by the shift lever with the auxiliary transmission lever maintained in the 2H range, then, the brake is released, and the accelerator pedal is depressed, enabling the motor vehicle to start. At that time, upon execution of processing as shown in FIG. 24, the control signals $CS_0$, $CS_1$ are continuously in the off state, so that the friction clutch 266 is continuously in the disengaged state. On the other hand, due to the auxiliary transmission lever being in the 2H range, the high/low speed changeover device 264 of the auxiliary transmission unit 258 is continuously in the high-speed shift position H wherein the spline hole $264b_1$ of the shift sleeve 264b is engaged with the high-speed shift gear 264c arranged to the input shaft 242, so that traction transmitted from the automatic transmission 220 to the input shaft 242 of the transfer 222 is transmitted to the first output shaft 244 through the shift sleeve 264b without any change, which is then transmitted to the rear wheels 212RL, 212RR through the propeller shaft 230, the rear differential gear 232, and the drive shaft 234, obtaining rotation of the rear wheels 212RL, 212RR to enable forward cruising of the motor vehicle.

In such a way, with start of cruising of the motor vehicle, the first output shaft 244 is rotated, so that the main pump 300 coupled therewith mechanically is driven to discharge hydraulic fluid therefrom, which is supplied as the line pressure $P_L$ to the convergent duct 310a through the check valve 306d. When the line pressure $P_L$ is maintained at a set value by the discharge pressure of the main pump 300, the hydraulic switch 332 is turned off to stop driving of the electric motor 302 by the microcomputer 208.

On the other hand, in case of cruising on a low friction coefficient road such as an off road, a snow road or an icy road, the auxiliary transmission lever is switched from the 2H range to the 4H range. This switching of the auxiliary transmission lever from the 2H range to the 4H range can be made not only at a standstill of the motor vehicle, but during low-speed cruising thereof, e.g. cruising at 40 km/h or less.

When switching the auxiliary transmission lever to the 4H range, the mode signal Dn of the two-wheel/four-wheel mode sensor 290 is switched to the four-wheel drive mode, so that upon execution of processing as shown in FIG. 24, control proceeds from the step S115 to the step S117. If the detection signal $S_H$ is in the on state when reading from the high-speed shift position sensor 286, control proceeds from the step S118 to the step S119 where the control signal $CS_1$ for the electromagnetic selector valve 320 is turned on. Thus, the electromagnetic selector valve 320 is switched from the normal position 320b to the operating position 320c, so that the line pressure $P_L$ is supplied as the pilot control pressure to the pilot selector valve 326 without any change, which allows switching of the pilot selector valve 326 from the normal position 326b to the operating position 326c wherein the clutch pressure $P_C$ output from the clutch-pressure regulating valve 322 can be supplied to the friction clutch 266.

At the step S120, the revolution detection values $N_F$, $N_R$ are read out of the front and rear wheel revolution sensors 296, 298, and at the subsequent step S121, the revolution difference ΔN between the front and rear wheels is calculated. At the step S122, the duty ratio D of the control signal $CS_0$ for the duty-control solenoid valve 328 is determined, and at the subsequent step S123, the control signal $CS_0$ having a command value corresponding to the duty ratio D as determined is output to the drive circuit 231a. Thus, the drive circuit 231a supplies the exciting current $i_0$ having the duty ratio D to the duty-control solenoid valve 328, so that the duty-control solenoid valve 328 outputs the pilot control pressure corresponding to the duty ratio D to the clutch-pressure regulating valve 322 which in turn outputs the clutch pressure $P_C$ corresponding to the pilot control pressure, which is supplied to the friction clutch 266 through the pilot selector valve 326, thus controlling a clutch engaging force of the friction clutch 266.

Therefore, when the revolution difference ΔN between the front and rear wheels is small, the duty ratio D is close to zero, so that the on period of the exciting current $i_0$ output from the drive circuit 321a is shorter than the off period thereof. According to this, the pilot control pressure output from the duty-control solenoid valve 328 is close to zero, by which the clutch pressure $P_C$ is also close to zero, controlling a clutch engaging force of the friction clutch 266 to a small value. As a result, traction transmitted from the first output shaft 244 to the first sprocket 268 through the friction clutch 266 is close to zero, so that traction is scarcely transmitted to the front wheels, obtaining substantially the two-rear-wheel drive state. In that state, as the revolution difference ΔN between the front and rear wheels becomes greater, the duty ratio D becomes greater, and the clutch pressure $P_C$ output from the clutch-pressure regulating valve 322 is increased in accordance with the duty ratio D, increasing the clutch pressure $P_C$ of the friction clutch 266, driving the front wheels 212FL, 212RR through the friction clutch 266, the first sprocket 268, the chain 272, the second sprocket 270, the second output shaft 254, the front wheel output shaft 224, the front differential gear 226, and the front wheel drive shaft 228, obtaining the four-wheel drive state. Specifically, the ratio of a distribution of traction between the front and rear wheels is changed from 0%:100% to 50%:50% in accordance with the revolution difference ΔN, enabling the excellent cruising state of the motor vehicle.

When the motor vehicle, cruising in the four-wheel drive state with the auxiliary transmission lever selected in the 4H range, runs at a tight corner having a small turning radius at relatively low speed, a tight corner braking phenomenon occurs. If the auxiliary transmission lever is switched to the 2H range so as to remove this phenomenon, control proceeds, upon execution of processing as shown in FIG. 24, from the step S103 to the step S104 where the switching determination flag F is set to 1 (one). At the subsequent step S105, the vehicle speed detection signal V and the steering angle detection signal θ are read. Then, at the step S106, the switching time "t" is calculated in referring to the memory table as shown in FIG. 23. At that time, in view of the fact that the switching time "t" becomes longer as a value of the steering angle detection signal θ becomes greater, and that it becomes longer as a value of the vehicle speed detection signal V becomes smaller even with the same value of the steering angle detection signal θ, the switching time "t" is determined in accordance with the extent of the tight corner braking phenomenon.

At the step S108, the reduction amount ΔD of the duty ratio D is calculated in accordance with the switching time "t" as determined, and at the subsequent step S109, a value obtained by subtracting the reduction amount ΔD of the duty ratio D from the current duty ratio D is stored as a new duty ratio D. Then, at the step S110, the control signal $CS_0$ having a command value corresponding to the duty ratio D as updated is output. As a result, the pilot control pressure of the duty-control solenoid valve 328 is decreased in accordance with the reduction amount ΔD of the duty ratio D, so that the clutch pressure $P_C$ output from the clutch-pressure regulating valve 322 is also decreased, decreasing a clutch engaging force of the friction clutch 266, resulting in reduced torque distribution to the second output shaft 254.

Thereafter, on condition that the switching determination flag F is set to 1 (one), control proceeds from the step S102 to the step S108 via the step S113 so as to repeatedly reduce the duty ratio D by the reduction amount ΔD in accordance with the switching time "t" determined at the previous processing, obtaining gradually decreased torque distribution to the front wheels. Before the duty ratio D becomes zero or negative, a clutch engaging force of the friction clutch 266 becomes zero, switching completely to the two-wheel drive state. In that state, the control signals $CS_0$, $CS_1$ are turned off (step S111), the switching determination flag F is reset to zero, returning to the two-wheel drive state as described above.

In such a way, when carrying out switching from the four-wheel drive mode to the two-wheel drive mode so as to avoid the tight corner braking phenomenon upon turning of the motor vehicle, the switching time "t" is determined in accordance with the extent of the tight corner braking phenomenon, so that torsional torque is gradually released from the power train in the four-wheel drive state, enabling sure prevention of a shock produced by a sudden release of torque. Moreover, when the tight corner braking phenomenon is smaller, the switching time "t" is shorter, enabling quick switching from the four-wheel drive state to the two-wheel drive state, resulting in improved responsibility. Moreover, switching can gradually be made from the four-wheel drive state to the two-wheel drive state, enabling prevention of a sudden change of the steering characteristic, resulting in improved steering stability.

On the other hand, if, during switching from the four-wheel drive state to the two-wheel drive state, the four-wheel drive mode is selected by the auxiliary transmission lever again, control proceeds from the step S113 to the step S114 where the switching determination flag F is reset to zero, so that upon next execution of processing, control proceeds via the steps S101 to S103, and S115 to the step S117 where clutch-pressure control in the four-wheel drive mode is carried out as described above.

When the motor vehicle sticks in cruising with the auxiliary transmission lever selected in the 4H range, or cruises on a sandy road of easy occurrence of sticking, the auxiliary transmission lever should be switched to the 4L range. In that case, with the motor vehicle stopped, the shift lever is shifted, for example, to the N or P range, and the auxiliary transmission lever is shifted to the 4L range. Thus, the spline hole $264b_1$ of the shift sleeve 264b can be engaged with the high-speed shift gear 280 of the first sprocket 268, enabling movement of the shift sleeve 264b from the high-speed shift position H to the low-speed shift position L.

In the state of selecting the 4L range by the auxiliary transmission lever, a driving force of the output shaft 256 of the automatic transmission 220 is reduced by the auxiliary transmission unit 262 via the input shaft 242 of the transfer 222, which is transmitted not only to the shift sleeve 264b through the low-speed shift gear 264d arranged to the pinion gear 262d and the external teeth $264b_2$ of the shift sleeve 264b, then to the first output shaft 244 spline-coupled with the shift sleeve 264b, but to the second output shaft 254 through the four-wheel drive gear 280 engaged with the spline hole $264b_1$ of the shift sleeve 264b, the first sprocket 268, the chain 272, and the second sprocket 270. That is, a driving force transmitted to the input shaft 242 is forcibly distributed between the first and second output shafts 244, 254, obtaining the direct-coupled four-wheel drive state.

At that time, the shift sleeve 264b is shifted in the low-speed shift position L, so that the detection signal of the high-speed shift position sensor 288 is turned off. When the microcomputer 207 executes processing as shown in FIG. 24, control proceeds from the step S118 to the step S116 where the control signal $CS_0$ for the duty-control solenoid valve 328 and the control signal $CS_1$ for the electromagnetic solenoid valve 320 are continuously turned off, maintaining interrupted supply of the clutch pressure $P_C$ to the friction clutch 266.

In the second embodiment, the reduction amount ΔD of the duty ratio D is obtained by calculation based on the switching time "t", alternatively, it may be obtained by using a memory table for directly calculating the reduction amount ΔD of the duty ratio D based on the vehicle speed detection signal V and the steering angle detection signal θ. In case of this variant, the switching time is varied in accordance with a value of the duty ratio upon switching from the four-wheel drive state to the two-wheel drive state, enabling smoother release of torsional torque in the power train.

Figure 25:
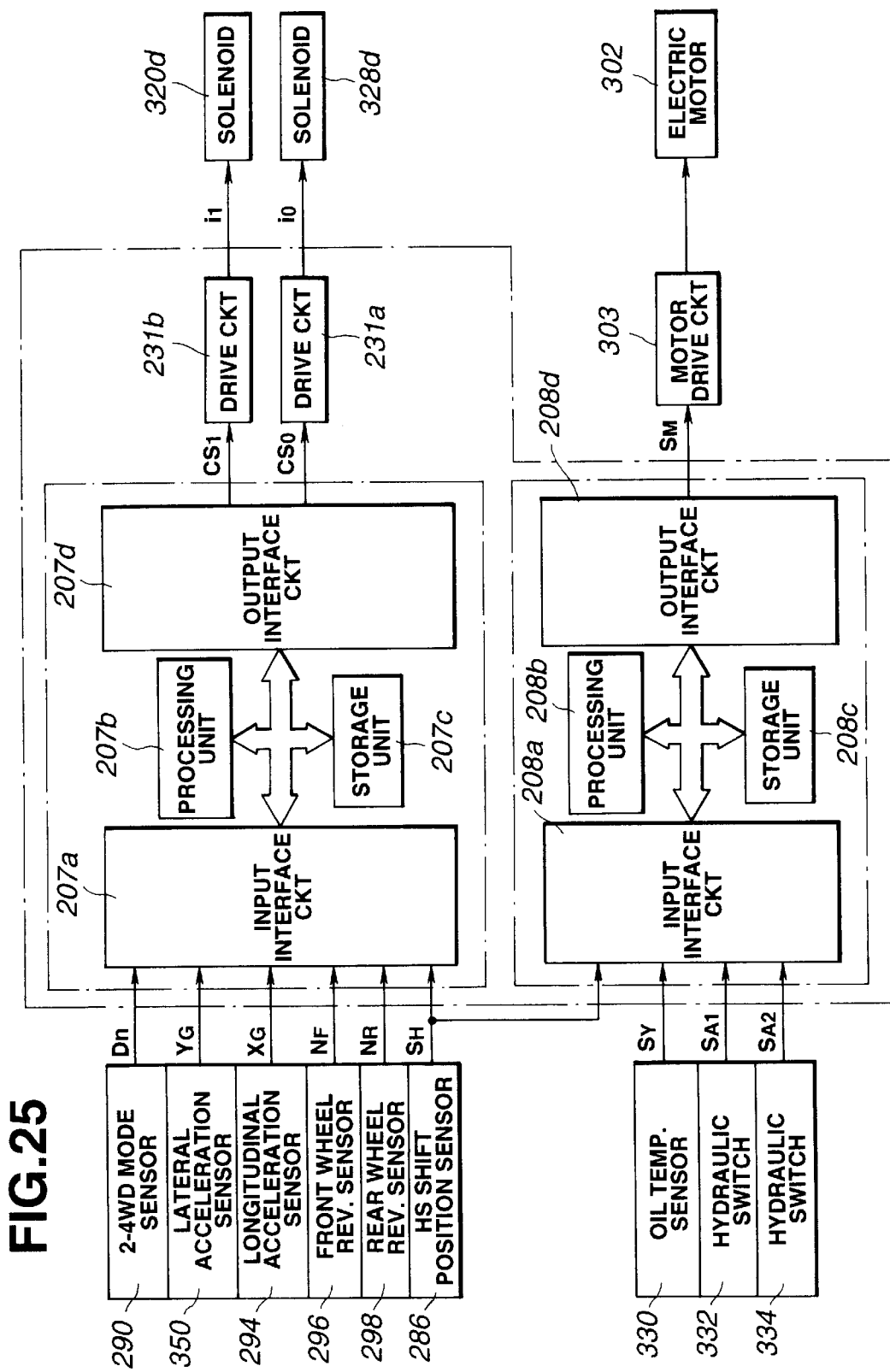
FIG. 25 is a view similar to FIG. 19, showing a third preferred embodiment of the present invention.
Figure 26:
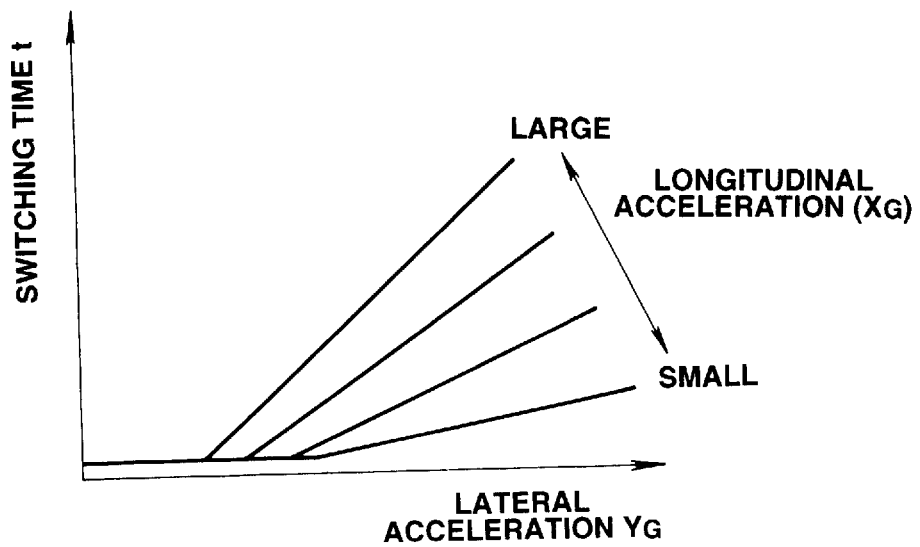
FIG. 26 is a view similar to FIG. 23, illustrating a characteristic of switching time vs. lateral acceleration with a longitudinal acceleration as a parameter.
Figure 27:
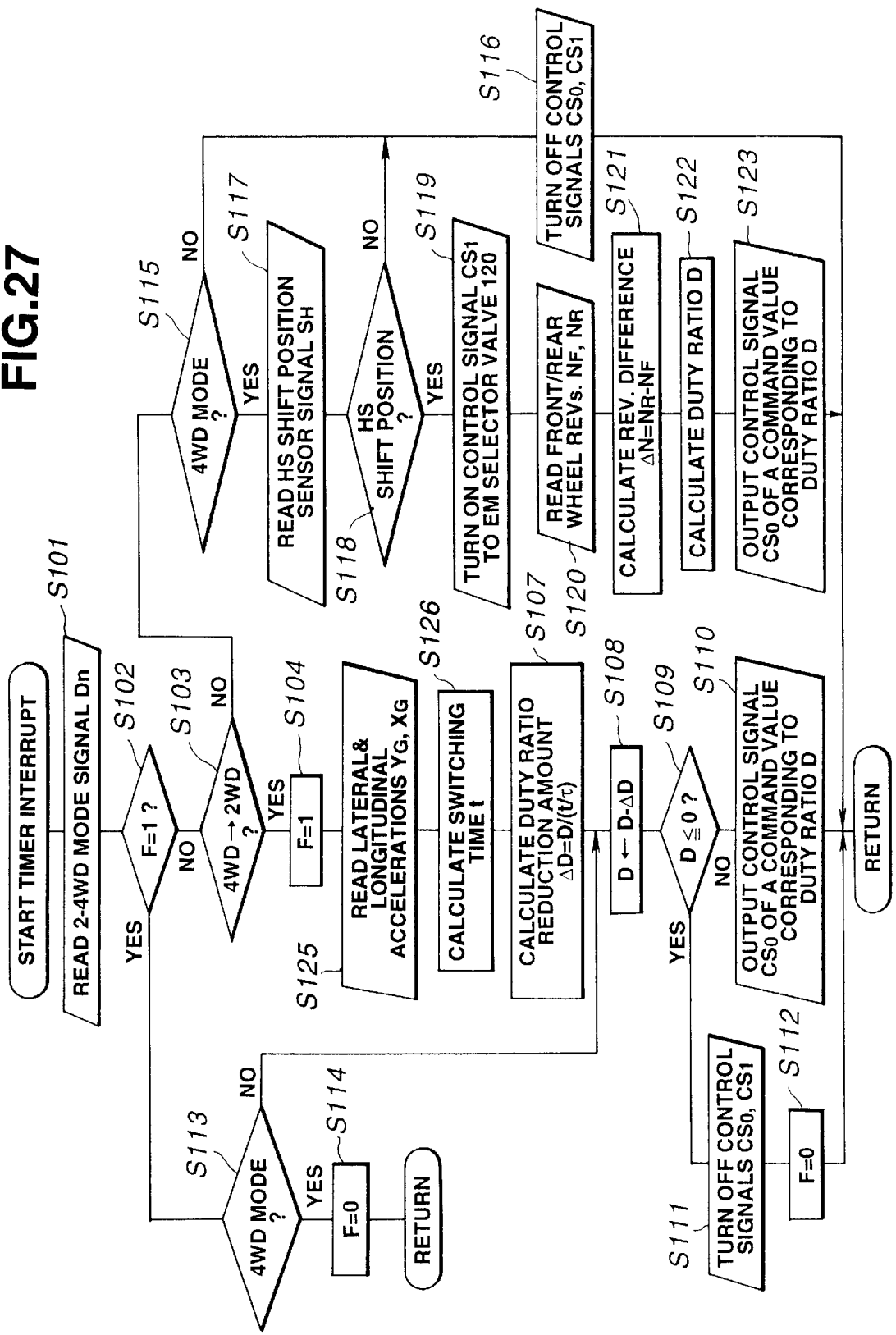
FIG. 27 is a view similar to FIG. 24, showing operation of the third preferred embodiment of the present invention.

FIGS. 25 to 27 show a third embodiment of the present invention. The third embodiment is designed, in place of controlling the switching time in accordance with the extent of the tight corner braking phenomenon as described in the second embodiment, to prevent a sudden change of the steering characteristic produced when carrying out switching from the four-wheel drive state to the two-wheel drive state upon turning of the motor vehicle.

The third embodiment has substantially the same structure as the second embodiment except that a lateral acceleration sensor 350 for sensing a lateral acceleration $Y_G$ and a longitudinal acceleration sensor 352 for sensing a longitudinal acceleration $X_G$ as shown in FIG. 25 are arranged in place of the steering angle sensor 292 and the vehicle speed sensor 294, and a memory table as shown in FIG. 26 is stored in the storage unit 207c of the microcomputer 207 in place of the memory table as shown in FIG. 23, and a processing as shown in FIG. 27 is carried out in place of that one as shown in FIG. 24.

Referring to FIG. 26, a characteristic view shows a relationship between the lateral acceleration detection value $Y_G$ and the switching time "t" with the longitudinal acceleration detection value $X_G$ as a parameter. As seen in Fig. FIG. 26, when the lateral acceleration detection value $Y_G$ is small, increasing of the switching time "t" is started from the relatively large longitudinal acceleration detection value $X_G$, and the rate of increasing is greater, whereas with the lateral acceleration detection value $Y_G$ being greater, the longitudinal acceleration detection value $X_G$ at which increasing of the switching time "t" is started is smaller, and the rate of increasing thereof is smaller.

A processing as shown in FIG. 27 is substantially the same as that one as shown in FIG. 24 except that the steps S105 and S106 are replaced with a step S125 for reading the lateral acceleration detection value $Y_G$ and the longitudinal acceleration detection value $X_G$, and a step S126 for calculating the switching time "t" in accordance with the lateral acceleration detection value $Y_G$ and longitudinal acceleration detection value $X_G$ as read and in referring to the memory table as shown in FIG. 26.

According to the third embodiment, when the motor vehicle, cruising in the four-wheel drive state with the auxiliary transmission lever selected in the 4H range, makes a turn, and the auxiliary transmission lever is switched to the 2H range so as to obtain the two-wheel drive state, control proceeds, in processing as shown in FIG. 27, from the step S103 to the step S104 where the switching determination flag F is set to 1 (one). At the subsequent step S125, the lateral acceleration detection value $Y_G$ and the longitudinal acceleration detection value $X_G$ are read in the RAM, and at the subsequent step S126, the switching time "t" is calculated in accordance with the lateral acceleration detection value $Y_G$ and the longitudinal acceleration detection value $X_G$ and in referring to the memory table as shown in FIG. 26.

Thus, since the longitudinal acceleration detection value $X_G$ is approximately zero in the steady circular turning state, the switching time "t" as calculated becomes longer as the lateral acceleration detection value $Y_G$ becomes greater, obtaining moderated variation in the steering characteristic when carrying out switching from the four-wheel drive state to the two-wheel drive state, resulting in improvement of the steering stability. Further, even with the same lateral acceleration detection value $Y_G$, the motor vehicle is in the acceleration or deceleration state, so that the switching time "t" becomes longer as the longitudinal acceleration detection value $X_G$ becomes greater, enabling restraint of occurrence of noises and vibrations when carrying out switching from the four-wheel drive state to the two-wheel drive state during acceleration or deceleration. Furthermore, when the lateral acceleration detection value $Y_G$ is small, which appears when the motor vehicle runs at a curve having a large turning radius, for example, the switching time "t" is kept to a minimum, enabling improvement of the responsibility.

In the third embodiment, the lateral acceleration and longitudinal acceleration produced in the motor vehicle are individually sensed by the acceleration sensors. Alternatively, it is possible to estimate the longitudinal acceleration based on a variation per unit time of the speed of the front wheel or non-driving wheel as detected, and the lateral acceleration based on the revolution difference between the front wheels as detected, the switching time "t" being calculated in accordance with these accelerations as estimated.

Further, in the second and third embodiments, the automatic transmission 220 is applied, alternatively, a manual transmission may be applied.

Furthermore, in the second and third embodiments, the auxiliary transmission 258 is applied to switching among the three modes or the 2H range, 4H range, and 4L range. The present invention is also applicable to switching between the two modes or the two-wheel drive mode and four-wheel drive mode with the auxiliary transmission 258 eliminated. In that case, mode switching control may be carried out by arranging a mode changeover switch which provides a mode switching signal which is read by the microcomputer 207, the switching state being determined in accordance with the mode switching signal.

Still further, in the second and third embodiments, the high/low speed changeover device 264 of the auxiliary transmission unit 262 is mechanically operated by the auxiliary transmission lever. Alternatively, the shift sleeve 264b can be moved slidingly by arranging a mode selection switch having contacts corresponding to the 2H range, the 4H range and the 4L range of the auxiliary transmission lever in the vicinity of the driver's seat, and an electric motor for driving the shift sleeve 264b, the electric motor being driven in accordance with the mode selected by the mode selection switch.

Furthermore, in the second and third embodiments, the duty-control solenoid valve 328 serves to form the pilot control pressure of the clutch-pressure regulating valve 322, alternatively, an electromagnetic proportional-pressure control valve is applicable, having an output pressure which can be controlled in accordance with a value of the exciting current supplied to a solenoid thereof. In that case, the drive circuit 231a may be constructed by a floating-type constant voltage circuit, for example, to output the exciting current $i_0$ having a value corresponding to a voltage value of the control signal $CS_0$ as input.

Still further, in the second and third embodiments, the present invention is applied to the four-wheel drive motor vehicle designed to cruise basically in the rear-wheel drive mode, alternatively, it is applicable to the four-wheel drive motor vehicle designed to cruise basically in the front-wheel drive mode.

Figure 28:
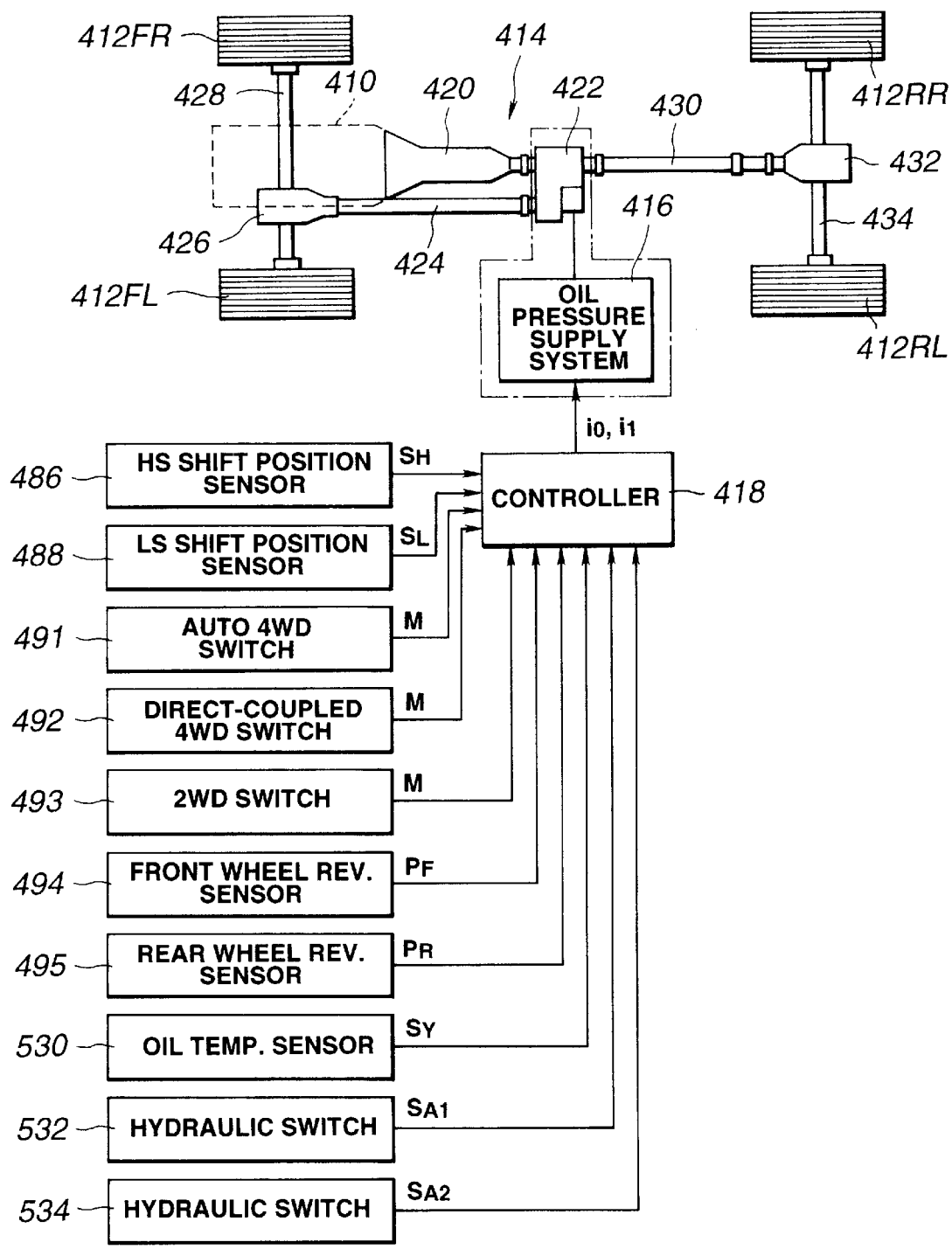
FIG. 28 is a view similar to FIG. 25, showing a fourth preferred embodiment of the present invention.

FIGS. 28 to 38 show a fourth embodiment of the present invention. Referring first to FIG. 28, the part-time four-wheel drive motor vehicle is designed to cruise basically in the front-engine rear-drive (FR) mode, and is provided with an engine 410 as a drive source, front and rear wheels 412FL-412RR, a traction transmission train 414 which can change the ratio of a traction distribution between the wheels 412FL-412RR, an oil pressure supply system 416 which serves to supply an oil pressure for controlling a distribution of traction by the traction transmission train 414, and a controller 418 which serves to control the oil pressure supply system 416.

The traction transmission train 414 includes a transmission 420 for shifting traction out of the engine 410 according to the gear ratio selected, and a transfer 422 for dividing traction out of the transmission 420 between the front wheels 412FL, 412FR and the rear wheels or regular driving wheels 412RL, 412RR. The traction transmission train 414 is constructed so that front wheel traction divided by the transfer 422 is transmitted to the front wheels 412FL, 412FR through a front wheel output shaft 424, a front differential gear 426 and a front wheel drive shaft 428, whereas rear wheel traction is transmitted to the rear wheels 412RL, 412RR through a propeller shaft or rear wheel output shaft 430, a rear differential gear 432 and a rear wheel drive shaft 434.

Figure 29:
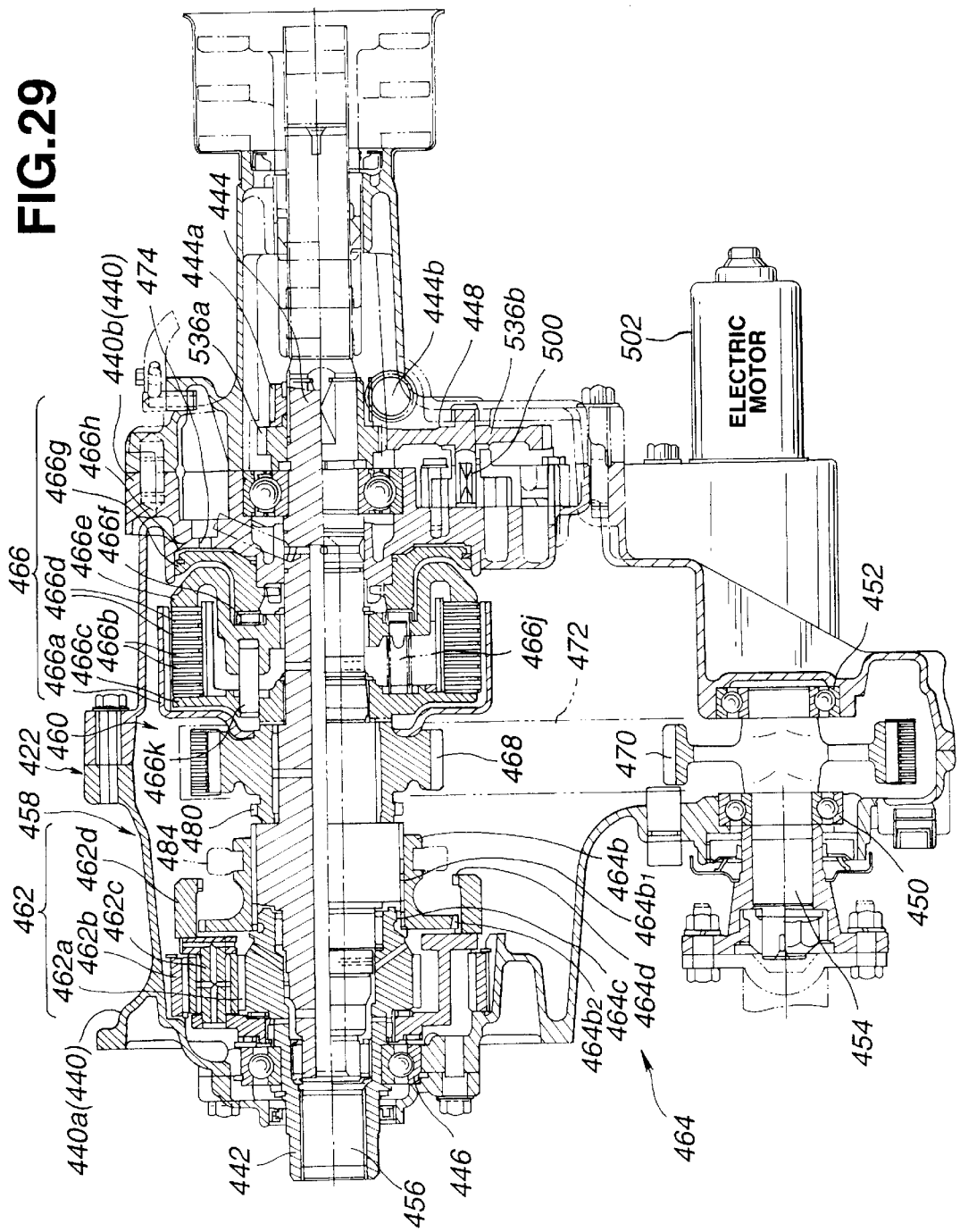
FIG. 29 is a view similar to FIG. 16, showing the transfer in FIG. 28.

Referring to FIG. 29, the transfer 422 includes in a transfer casing 440 an input shaft 442 and a first output shaft 444 disposed coaxially to butt at each other. The input shaft 442 is rotatably supported to a front casing 440a through a radial bearing 446, whereas the first output shaft 444 is rotatably supported to a rear casing 440b through a radial bearing 448, so that the two shafts 442, 444 enables relative rotation.

Moreover, a second output shaft 454 is rotatably supported to the front and rear casings 440a, 440b in lower portions thereof in parallel to the input shaft 442 and the first output shaft 444 through bearings 450, 452 disposed to the front and rear casings 440a, 440b, respectively. The input shaft 442 is coupled with an output shaft 456 of the transmission 420, and the first output shaft 444 is coupled with the rear wheel output shaft 430, and the second output shaft 454 is coupled with the front wheel output shaft 424.

An auxiliary transmission unit 458 is interposed between the input shaft 442 and the first output shaft 444, whereas and a two-wheel/four-wheel drive changeover device 460 is interposed between the first output shaft 444 and the second output shaft 454.

The auxiliary transmission unit 458 comprises a planetary gear 462, and a dog-clutch-type high/low speed changeover device 464 disposed coaxially to the planetary gear 462.

The planetary gear 462 comprises a sun gear 462a formed on the outer periphery of the input shaft 442, an internal gear 462b fixed inside the front casing 440a, a pinion gear 462c engaged with the sun gear 462a and the internal gear 462b, and a pinion carrier 462d for rotatably supporting the pinion gear 462c.

The high/low speed changeover device 464 comprises a shift sleeve 464b arranged axially slidably by spline coupling of a plurality of key grooves formed on the outer periphery of the first output shaft 444 with an internal teeth 464b i and having an external teeth 464b$_2$ arranged on the outer periphery thereof, a high-speed shift gear 464c formed on the outer periphery of the input shaft 442 which is engageable with the internal teeth 464b$_1$ of the shift sleeve 464b, and a low-speed shift gear 464d formed on the inner periphery of the pinion carrier 462d which is engageable with the external teeth 464b$_2$ of the shift sleeve 464b.

Figure 30:
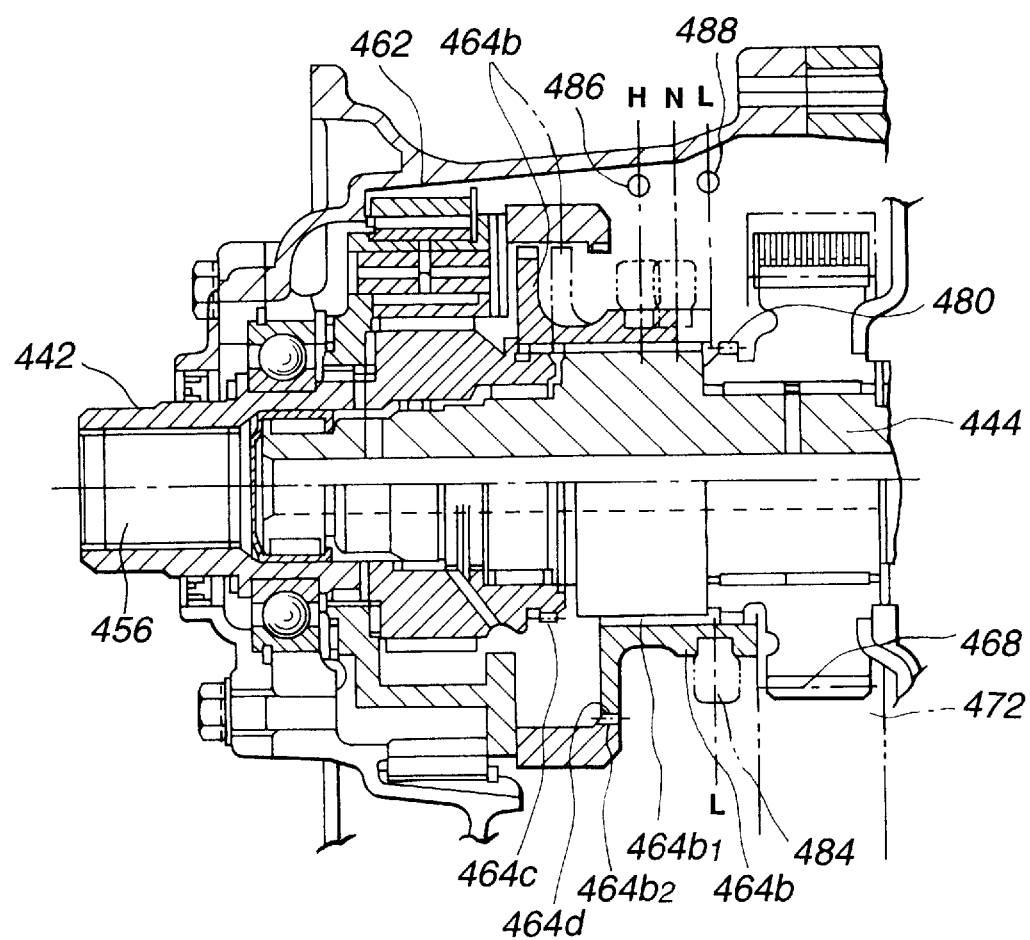
FIG. 30 is a view similar to FIG. 29, showing the auxiliary transmission unit with shift sleeve moved.

Referring to FIG. 30, when the shift sleeve 464b is slidingly moved up to a high-speed shift position H as seen in the upper disposition of the shift sleeve 464b as indicated by a fully-drawn line, the high-speed shift gear 464c and the internal teeth 464b$_1$ are engaged with each other. Further, when the shift sleeve 464b is slidingly moved up to a low-speed shift position L as seen in the lower disposition of the shift sleeve 464b as indicated by a fully-drawn line in FIG. 30, the low-speed shift gear 464d and the external teeth 464b$_2$ are engaged with each other. Furthermore, when the shift sleeve 464b is slidingly moved up to a neutral position N as seen in the lower disposition of the shift sleeve 464b as indicated by a two-dot chain line in FIG. 30, the internal teeth 464b$_1$ and the external teeth 464b$_2$ are not engaged with any of the other gears of the high/low speed changeover device 464.

Referring also to FIG. 28, the shift sleeve 464b is moved and controlled, for example, by a shift sleeve drive motor, not shown, in accordance with setting of an auto four-wheel drive switch 491 which enables the motor vehicle to cruise in the four-wheel drive mode, a direct-coupled four-wheel drive switch 492 which enables the motor vehicle to cruise in the direct-coupled four-wheel drive mode, and a two-wheel drive switch 493 as a changeover switch which enables the motor vehicle to cruise in the two-wheel drive mode, the switches being arranged in the vicinity of the driver's seat. When the auto four-wheel drive mode is selected by the auto four-wheel drive switch 491, or the two-wheel drive mode is selected by the two-wheel drive switch 493, the shift sleeve 464b is moved to the high-speed shift position H, whereas when the direct-coupled four-wheel drive mode is selected by the direct-coupled four-wheel drive switch 492, the shift sleeve 464b is moved to the low-speed shift position L.

Returning to FIG. 29, the two-wheel/four-wheel drive changeover device 460 comprises a wet multiple-disc friction clutch (hereafter refer to as "friction clutch") 466 for changing the ratio of a traction distribution between the front and rear wheels, a first sprocket 468 disposed rotatably to the first output shaft 444, a second sprocket 470 coupled coaxially with the second output shaft 454, and a chain 472 arranged to allow connection between the first and second sprockets 460, 470.

The friction clutch 466 comprises a clutch drum 466a coupled with the first sprocket 468, friction plates 466b spline-coupled with the clutch drum 466a, a clutch hub 466c spline-coupled with the outer periphery of the first input shaft 444, friction discs 466d coupled integrally with the clutch hub 466c, each being disposed between the friction plates 466b, a rotary member 466e disposed on the outer periphery of the first output shaft 444 and moving axially toward the clutch drum 466a to bring the friction plates 466b into contact with the friction discs 466d, a pin 466k coupled integrally with the clutch hub 466c and for engaging the clutch hub 466c with the rotary member 466e, a clutch piston 466g mounted to an inner wall of the rear casing 440b and being movable axially, a thrust bearing 466f for transmitting axial movement of the clutch piston 466g to the rotary member 466e, a cylinder chamber 466h formed between the inner walls of the clutch piston 466g and the rear casing 440b, and a return spring 466j for providing to the rotary member 466e a basing force in the direction of the clutch piston 466g.

When the oil pressure supply system 416 provides a clutch pressure P$_C$ to an input port 474 formed through the rear casing 440b which communicates with the cylinder chamber 466h, a pressing force is generated in the cylinder chamber 466h, so that the clutch piston 466g is moved leftward as viewed in FIG. 29, which is transmitted to the rotary member 466e through the thrust bearing 466f. The friction plates 466b and friction discs 466d separated from each other come in contact with each other by movement of the friction discs 466d, producing an engaging force corresponding to the clutch pressure P$_C$ due to a frictional force. Thus, a driving force of the first output shaft 444 is transmitted, according to a predetermined ratio of a torque distribution corresponding to an engaging force of the friction clutch 466, to the second output shaft 454 through the first sprocket 468, the chain 472, and the second sprocket 470.

On the other hand, when the clutch pressure P$_C$ as supplied is decreased, and the rotary member 466e and the clutch piston 466g are moved rightward as viewed in FIG. 29 by a biasing force of the return spring 466j so that the friction plates 466b and the friction discs 466d are separated from each other, a driving force of the first output shaft 444 is not transmitted to the second output shaft 454.

A four-wheel drive gear 480 is arranged to the first sprocket 468 on the outer periphery thereof on the side of the shift sleeve 464b. When the shift sleeve 464b is moved up to the low-speed shift position L as described above in connection with FIG. 30, the external teeth 464b$_2$ are engaged with the low-speed shift gear 464d, and also the four-wheel drive gear 480 is engaged with the internal teeth 464b$_1$,. Thus, the shift sleeve 464b and the four-wheel drive gear 480 constitute a dog clutch for forcibly coupling the first output shaft 444 and the second output shaft 454 together in the low-speed shift position L.

Referring to FIG. 30, disposed inside the front casing 440a are a high-speed shift position sensor 486 for sensing that the shift sleeve 464b is slidingly moved up to the high-speed shift position H, and a low-speed shift position sensor 488 for sensing that the shift sleeve 464b is slidingly moved up to the low-speed shift position L. A detection signal S$_H$ Of the high-speed shift position sensor 486 and a detection signal of the low-speed shift position sensor 488 are always input to a controller 418 as will be described later.

Figure 31:
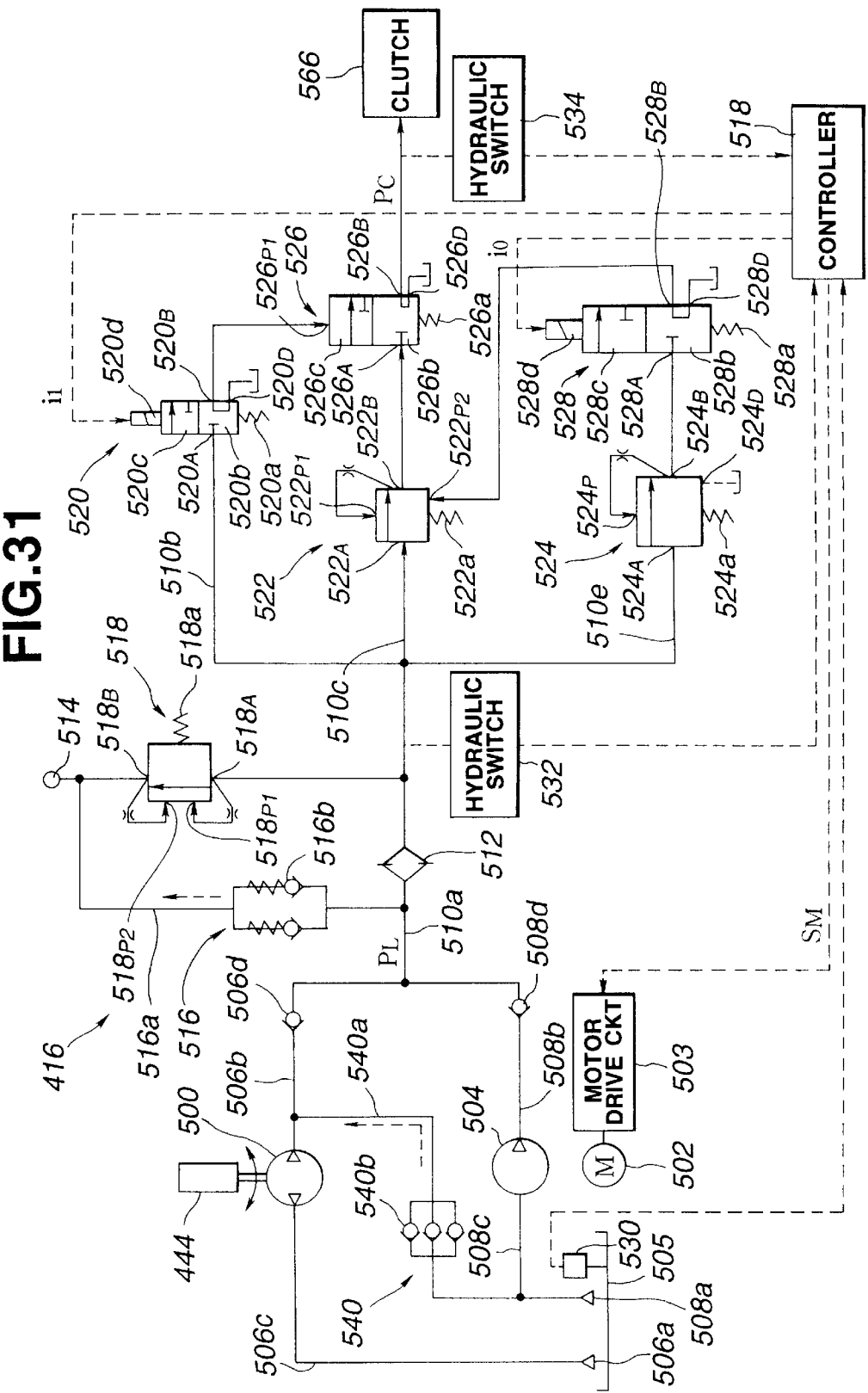
FIG. 31 is a view similar to FIG. 17, showing the oil pressure supply system in FIG. 28.

Referring to FIG. 31, the oil pressure supply system 416 has a circuit structure as shown in FIG. 31, and provides a predetermined clutch pressure P$_C$ to the input port 474 of the transfer 422.

The oil pressure supply system 416 has as an oil pressure source a main pump 500 of the normal/reverse rotation type connected directly to and driven by the first output shaft 444, and a sub-pump 504 of the normal rotation type disposed in parallel with the main pump 500 and driven by an electric motor 502 as a power source. The main pump 500 and the sub-pump 504 inhale hydraulic fluid within an oil tank 505 arranged in lower portions of the front and rear casings 440a, 440b through strainers 506a, 508a, and discharge it into ducts 506b, 508b on the discharge side. Connected to a convergent duct 510a which converges the ducts 506b, 508b is an oil element 512 to which a relief passage 516 is connected on the upstream side thereof, i.e. on the side of the main pump 500 and the sub-pump 504, the relief passage 516 having the other end connected to a lubricating system 514. Moreover, a line-pressure regulating valve 518 is connected to the oil element 512 on the downstream side thereof. Connected to ducts 510*b*, 510*c*, 510*e* which branch off from the convergent duct 510*a* are an electromagnetic selector valve 520, a clutch-pressure regulating valve 522, and a pressure reducing valve 524 on the input side thereof, respectively. Moreover, connected to the clutch-pressure regulating valve 522 on the output side thereof is a pilot selector valve 526 on the input side thereof, which supplies the clutch pressure $P_C$ to the transfer 522 when receiving a pilot pressure out of the electromagnetic selector valve 520, whereas connected to the pressure reducing valve 524 on the output side thereof is a duty-control solenoid valve 528 on the input side thereof.

Arranged in the oil tank 505 are a temperature sensor 530 for sensing the temperature of hydraulic fluid, a hydraulic switch 532 for detecting a pressure reduced by the line-pressure regulating valve 518, and a pressure switch 534 for detecting the clutch pressure $P_C$ output from the pilot selector valve 526, detection signals thereof being output to the controller 418.

As for the actual motor vehicles, the oil pressure supply system 416 is arranged inside the transfer 422. The main pump 500 for inhaling hydraulic fluid out of the oil tank 505 is coupled with the first output shaft 444 through first and second gears 536*a*, 536*b* as shown in FIG. 29, whereas the sub-pump 504 is coupled with the electric motor 502 mounted to the rear casing 440*b* on the outside thereof.

Next, referring to FIG. 31, component parts of the oil pressure supply system 416 will be described in detail.

The main pump 500 rotating in the normal direction inhales hydraulic fluid out of the oil tank 505 through the strainer 506*a* connected to a suction duct 506*c* at an end thereof, and the sub-pump 504 also inhales hydraulic fluid out of the oil tank 505 through the strainer 508*a* connected to a suction duct 508*c* at an end thereof. Check valves 506*d*, 508*d* are arranged in the discharge ducts 506*b*, 508*b* of the main pump 500 and the sub-pump 504, respectively, and a bypass passage 540 is arranged to allow communication between the discharge duct 506*b* of the main pump 500 and the discharge duct 508*c* of the sub-pump 504. The bypass passage 540 comprises a bypass duct 540*a* and a triple check valve 540*b* arranged therein, and is constructed so that when the discharge duct 506*b* becomes in the negative pressure state, the check valve 540*b* opens to form a communication passage for allowing passage of hydraulic fluid in the direction of a dotted arrow as shown in FIG. 31.

The relief passage 516 connected to the convergent duct 510*a* on the upstream side of the oil element 512 comprises a relief duct 516*a* having the other end connected to the lubricating system 514, and a double spring check valve 516*b* arranged therein. When an oil pressure on the upstream side of the oil element 512 becomes greater than a predetermined value due to clogging produced in a filter of the oil element 512, the check valve 516*b* opens to form a communication passage for allowing passage of hydraulic fluid in the direction of a dotted arrow as shown in FIG. 31.

The line-pressure regulating valve 518 comprises a pressure regulating valve of the inner pilot and spring type, including a spool arranged slidably in a cylindrical valve housing having an input port 518A connected to the convergent duct 510*a*, an output port $518_B$ connected to the lubricating system 514 and inner pilot ports $518_{P1}$, $518_{P2}$ receiving primary and secondary pressures through stationary orifices, and a return spring 518*a* for biasing the spool on the one end side. A supply pressure $P_L$ increased through the main pump 500 or the sub-pump 504 is decreased to a predetermined value by the line-pressure regulating valve 518, which is provided to the electromagnetic selector valve 520, the clutch-pressure regulating valve 522, and the pressure reducing valve 524. Hydraulic fluid flowing out of the output port $518_B$ upon decreasing is supplied to the lubricating system 514.

The clutch-pressure regulating valve 522 comprises a pressure regulating valve of the inner and outer pilot and spring type, including a spool arranged slidably in a cylindrical valve housing having an input port $522_A$ connected to the duct 510*c*, an output port $522_B$ connected to the pilot selector valve 526, an inner pilot port $522_{P1}$ receiving as a pilot pressure the secondary pressure through a stationary orifice and an outer pilot port $522_{P2}$ receiving a control pressure out of the duty-control solenoid valve 528, and a return spring 522*a* for biasing the spool on the one end side. The clutch-pressure regulating valve 522 is constructed so that when receiving no pilot control pressure out of the duty-control solenoid valve 528, a communication passage between the input port $522_A$ and the output port $522_B$ is closed so as not to output the secondary pressure, whereas when receiving the pilot control pressure out of the duty-control solenoid valve 528, the spool is moved to output from the output port $522_B$, as the clutch pressure $P_C$, the secondary pressure corresponding to the pilot control pressure.

The pressure reducing valve 524 comprises a pressure reducing valve of the inner pilot and spring type and with a constant secondary pressure, including a spool arranged slidably in a cylindrical valve housing having an input port 524A connected to the duct 510*e*, an output port $524_B$ connected to the duty-control solenoid valve 528, an inner pilot port $524_P$ receiving as a pilot pressure the secondary pressure out of the output port $524_B$ through a stationary orifice and a drain port $524_H$, and a return spring 524*a* for biasing the spool on the one end side. When the spool is moved to a predetermined position by the pilot pressure supplied to the inner pilot port $524_P$, the primary pressure out of the input port $524_A$ is supplied, as a control pressure having a predetermined reduced value, to the duty-control solenoid valve 528.

The duty-control solenoid valve 528 has three ports and two positions. This valve includes an input port $528_A$ connected to the pressure reducing valve 524, a drain port $528_R$ connected to a drain, an output port $528_B$ connected to an outer pilot port $522_{P2}$ of the clutch-pressure regulating valve 522, and a return spring 527*a*. The duty-control solenoid valve 528 is movable between a normal position 528*b* wherein a spool arranged in the valve allows communication between the output port $528_B$ and the drain port $528_R$, and an operating position 528*c* wherein the spool allows communication between the input port $528_A$ and the output port $528_B$. When the controller 418 provides to a solenoid 528*d* an exciting current $i_0$ with a predetermined duty ratio, the spool is moved from the normal position 528*b* to the operating position 528*c* against the return spring 528*a* during a period of time that the current $i_0$ is turned on, outputting to the clutch-pressure regulating valve 522 the pilot control pressure corresponding to the duty ratio. Therefore, when the duty-control solenoid valve 528 supplies the control pressure to the outer pilot port $522_{P2}$, the clutch-pressure regulating valve 522 provides the clutch pressure $P_C$ corresponding to the pilot control pressure, so that an engaging force of the friction clutch 466 is controlled according to this, obtaining a distribution of drive torque to the front wheels in accordance with the clutch pressure $P_C$.

The electromagnetic selector valve 520 is of the spring-offset type, and has three ports and two positions. This valve includes an input port 520A receiving a line pressure, an output port $520_B$ connected to an outer pilot port $526_{P1}$ of the pilot selector valve 526, and a drain port $520_D$. The electromagnetic selector valve 520 is movable between a normal position 520b wherein a spool arranged in the valve closes the input port $520_A$ and allows communication of the output port $520_B$ with the drain port $520_D$, and an operating position 520c wherein the spool allows communication between the input port $520_A$ and the output port $520_B$ and closes the drain port $520_D$. When the controller 418 provides to a solenoid 120d an exciting current $i_1$, the spool is moved to the operating position 520c against the return spring 520a during a period of time that the current $i_1$ is turned on, providing the pilot control pressure to the outer pilot port $526_{P1}$ of the pilot selector valve 526. On the other hand, when the control signal $CS_1$ out of the controller 418 is turned off, the spool is returned to the normal position 520b by a pressing force of the return spring 520a, so that the pilot control pressure being supplied to the outer pilot port $526_{P1}$ is removed through the drain port $520_D$.

Figure 32:
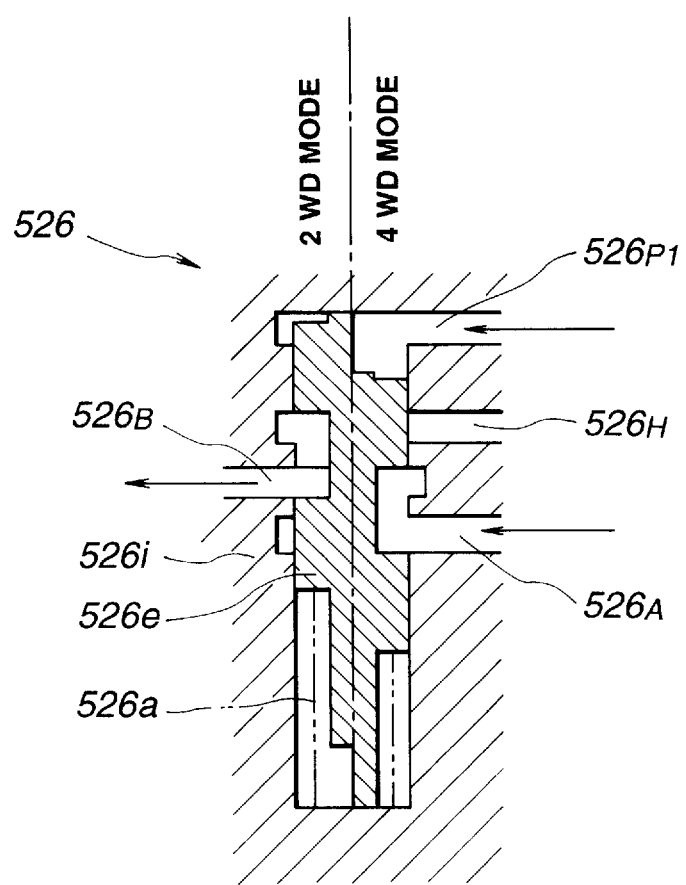
FIG. 32 is a view similar to FIG. 18, showing the pilot selector valve used in the oil pressure supply system in FIG. 31.

Referring also to FIG. 32, the pilot selector valve 526 includes a spool 526e arranged slidably in a cylindrical housing 526i having an input port $526_A$ receiving the secondary pressure out of the clutch-pressure regulating valve 522, an output port $526_B$ providing the secondary pressure to the transfer 422, an outer pilot port $526_{P1}$ receiving the pilot control pressure when the solenoid 520d of the electromagnetic selector valve 520 is turned on and a drain port $526_H$, and a return spring 526a for biasing the spool 526e on the one end side.

When supplying no pilot control pressure to the outer pilot port $526_{P1}$ the spool 526e of the pilot selector valve 526 is moved to a two-wheel drive (2WD) mode position 526b wherein the input and output ports $526_A$, $526_B$ are closed, and the output port $526_B$ is in communication with the drain port $526_D$ as seen in a left half in FIG. 32.

On the other hand, when the solenoid 520d of the electromagnetic selector valve 520 is turned on, the spool of the electromagnetic selector valve 520 is moved to a four-wheel drive (4WD) mode position 526c wherein the spool is placed in the operating position 520c to supply the pilot control pressure to the outer pilot port $526_{P1}$, and the input port $526_A$ is in communication with the output port $526_B$ as seen in a right half in FIG. 32.

In such a way, the pilot selector valve 526 is driven by the pilot control pressure out of the electromagnetic selector valve 520, i.e. the spool 526e is driven by the pilot control pressure having a high value, so that even when the spool 526e has a great slide resistance due to dust, chips, etc. attached to a slide passage thereof, sliding of the spool 520e can be ensured.

Returning to FIG. 28, the controller 418 serves to output the exciting currents $i_0$, $i_1$ to the oil pressure supply system 416 in accordance with detection signals out of the high-speed shift position sensor 486, the low-speed shift position sensor 488, the auto four-wheel drive switch 491, the direct-coupled four-wheel drive switch 492, the two-wheel drive switch 493, a front wheel revolution sensor 494, and a rear wheel revolution sensor 495. In the fourth embodiment, the controller 418 is constructed to carry out control for enabling the oil pressure supply system 416 to keep a predetermined line pressure, and it is thus provided with the above oil temperature sensor 530 and hydraulic switches 532, 534, and outputs a motor control signal $S_M$ to the oil pressure supply system 416 in accordance with the detection signals of these sensors.

The auto four-wheel drive switch 491 and the direct-coupled four-wheel drive switch 492 comprise an auto-return-type momentary switch having a normally open contact, and become in the on state when closed by a seat occupant. On the other hand, the two-wheel drive switch 493 comprises a fixed-position switch, and becomes in the on state when closed by the seat occupant, the two-wheel drive switch 493 being opened when setting the two-wheel drive mode, whereas the two-wheel drive switch 493 being closed when releasing the two-wheel drive mode.

The hydraulic switch 532 turns the detection signal $S_{A1}$ on when the oil pressure detection value is lower than a previously set value, whereas the hydraulic switch 534 turns the detection signal $S_{A2}$ on when the oil pressure detection value is lower than a previously set value, the detection signals being output to the controller 418. The oil temperature sensor 530 senses the temperature of hydraulic fluid within the oil tank 505, which is converted into the digital signal $S_Y$ by an A/D converter, and output to the controller 418.

The front wheel revolution sensor 494 is disposed, for example, to the front wheel output shaft 424 in a predetermined position thereof, whereas the rear wheel revolution sensor 495 is disposed, for example, to the rear wheel output shaft 430 in a predetermined position thereof. The front and rear wheel revolution sensors 494, 495 comprise, for example, a rotary sensor having photoelectric cell and element disposed in a hole of a rotary plate fixed to a shaft, and serve to output pulse signals $P_F$, $P_R$ to the controller 418.

Figure 33:
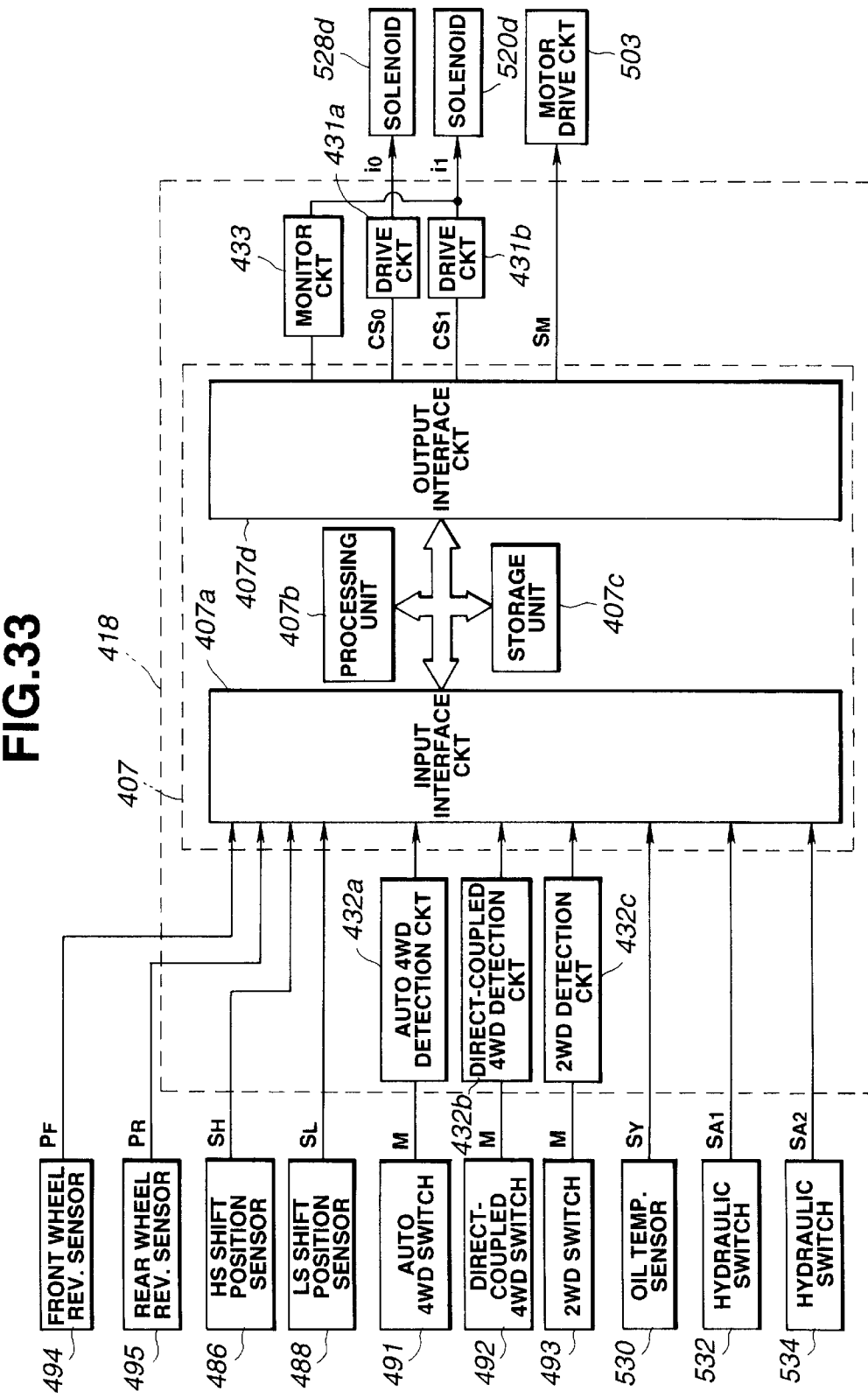
FIG. 33 is a view similar to FIG. 25, showing the controller in FIG. 28.

Referring to FIG. 33, the controller 418 is provided with a microcomputer 407 for carrying out traction distribution control in the friction clutch 466, a drive circuit 431a for supplying in accordance with the control signal $CS_0$ out of the microcomputer 407 the exciting current $i_0$ having a predetermined duty ratio D to the solenoid 528d of the duty-control solenoid valve 528 in the oil pressure supply system 416, a drive circuit 431b for supplying the exciting current $i_1$ which is turned on and off in accordance with the control signal $CS_1$ out of the microcomputer 407 to the solenoid 520d of the electromagnetic selector valve 520 in the oil pressure supply system 516, and an auto four-wheel drive detection circuit 432a, direct-coupled four-wheel drive detection circuit 432b and two-wheel drive detection circuit 432c for determining whether the auto four-wheel drive switch 491, the direct-coupled four-wheel drive switch 492, and the two-wheel drive switch 493 are in the open state or in the closed state, respectively, and a monitor circuit 433 for monitoring a current supplied to the solenoid 520d.

It is noted that the auto four-wheel drive switch 491, direct-coupled four-wheel drive switch 492 and two-wheel drive switch 493, the auto four-wheel drive detection circuit 432a, direct-coupled four-wheel drive circuit 432b and two-wheel drive detection circuit 432c, the microcomputer 407, the drive circuits 431a, 431b, and the monitor circuit 433 constitute a two-wheel/four-wheel drive changeover control circuit 409, the microcomputer 407 corresponding to control circuit means, the drive circuit 431b corresponding to current supply means.

Figure 34:
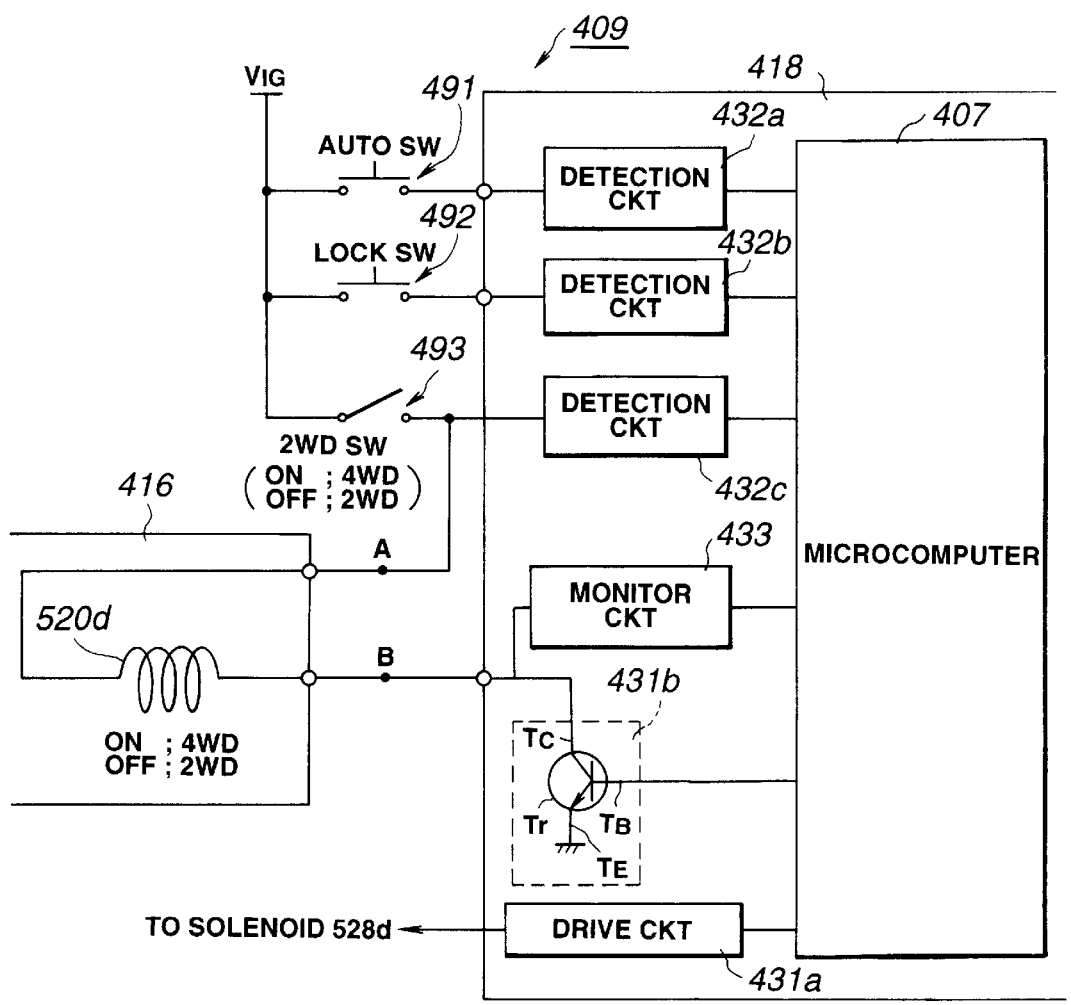
FIG. 34 is a view similar to FIG. 31, showing a two-wheel/four-wheel drive control changeover circuit.

Referring to FIG. 34, the two-wheel/four-wheel drive changeover control circuit 409 is constructed such that the auto four-wheel drive switch 491 has one end connected to a power source $V_{IG}$ which starts power supply when an ignition switch is turned on, and the other end connected to the auto four-wheel drive detection circuit 432a so as to output to the microcomputer 407 the state of the auto four-wheel drive switch 491 detested by the auto four-wheel drive detection circuit 432a. Likewise, the direct-coupled four-wheel drive switch 492 has one end connected to the power source $V_{IG}$, and the other end connected to the direct-coupled four-wheel drive detection circuit 432b so as to output to the microcomputer 407 the state of the direct-coupled four-wheel drive switch 492 detected by the direct-coupled four-wheel drive detection circuit 432b.

Moreover, the two-wheel drive switch 493 has one end connected to the power source $V_{IG}$, and the other end connected to the two-wheel drive detection circuit 432c which carries out a continuity test, etc. to detect the state of the two-wheel drive switch 493, which is output to the microcomputer 407.

The drive circuit 431b comprises an NPN transistor Tr having a base terminal $T_B$ connected to the microcomputer 407, an emitter terminal $T_E$ connected to the ground, and a collector terminal $T_C$ connected to the other end of the solenoid 520d. The monitor circuit 433 as an observation circuit is interposed between the collector terminal $T_C$ and the microcomputer 407. The drive circuit 431a comprises a floating-type constant voltage circuit, for example, and serves to supply a predetermined exciting current $i_0$ to the solenoid 528d of the duty-control solenoid valve 528.

The auto four-wheel drive detection circuit 432a detects that the auto four-wheel drive switch 491 is in the closed state based on the fact that when closed, the auto four-wheel drive switch 491 becomes in the on state to supply a source voltage to the auto four-wheel drive detection circuit 432a, and it outputs to the microcomputer 407 the drive mode signal M indicative of the auto four-wheel drive. Likewise, the direct-coupled four-wheel drive detection circuit 432b detects that the direct-coupled four-wheel drive switch 492 is in the closed state based on the fact that when closed, the direct-coupled four-wheel drive switch 492 becomes in the on state to supply a source voltage to the direct-coupled four-wheel drive detection circuit 432b, and it outputs to the microcomputer 407 the drive mode signal M indicative of the direct-coupled four-wheel drive.

Likewise, the two-wheel drive detection circuit 432c detects that the state of the two-wheel drive switch 493 based on the fact that when closed, the two-wheel drive switch 493 becomes in the on state to supply a source voltage to the two-wheel drive detection circuit 432c, whereas when opened, the two-wheel drive switch 493 does not become in the on state. The two-wheel drive detection circuit 432c outputs to the microcomputer 407 the drive mode signal M indicative of the two-wheel drive, as selecting the two-wheel drive mode, when the two-wheel drive switch 493 is in the open state, but does not output thereto the drive mode signal M, as failing to select the two-wheel drive mode, when the two-wheel drive switch 493 is in the closed state.

Returning to FIG. 33, the microcomputer 407 is provided with an input interface circuit 407a having the A/D conversion function for reading as detection values the detection signals of the devices such as the high-speed shift position sensor 486, the low-speed shift position sensor 488, the front wheel revolution sensor 494, the rear wheel revolution sensor 495, etc., a processing unit 407b for carrying out a predetermined processing for traction distribution control according to a predetermined program, a storage unit 407c such as a read-only memory (ROM), a random access memory (RAM) or the like, and an output interface circuit 407d having the D/A conversion function and for outputting as the clutch engaging force control signals $CS_0$, $CS_1$ the front wheel transmission torque ΔT obtained by the processing unit 407b.

The microcomputer 407 counts the number of pulses per predetermined period of time in accordance with the pulse signals $P_F$, $P_R$ out of the front and rear wheel revolution sensors 494, 495 so as to calculate the front wheel revolution $N_F$ and the rear wheel revolution $N_R$, which are stored, for example, in a predetermined storage area in the storage unit 407c. Moreover, the microcomputer 407 inputs the drive mode signals M out of the auto four-wheel drive detection circuit 432a, the direct-coupled four-wheel detection circuit 432b, and the two-wheel drive detection circuit 432c so as to update successively the drive mode signals M stored, for example, in a predetermined storage area in the storage unit 407c.

Figure 35:
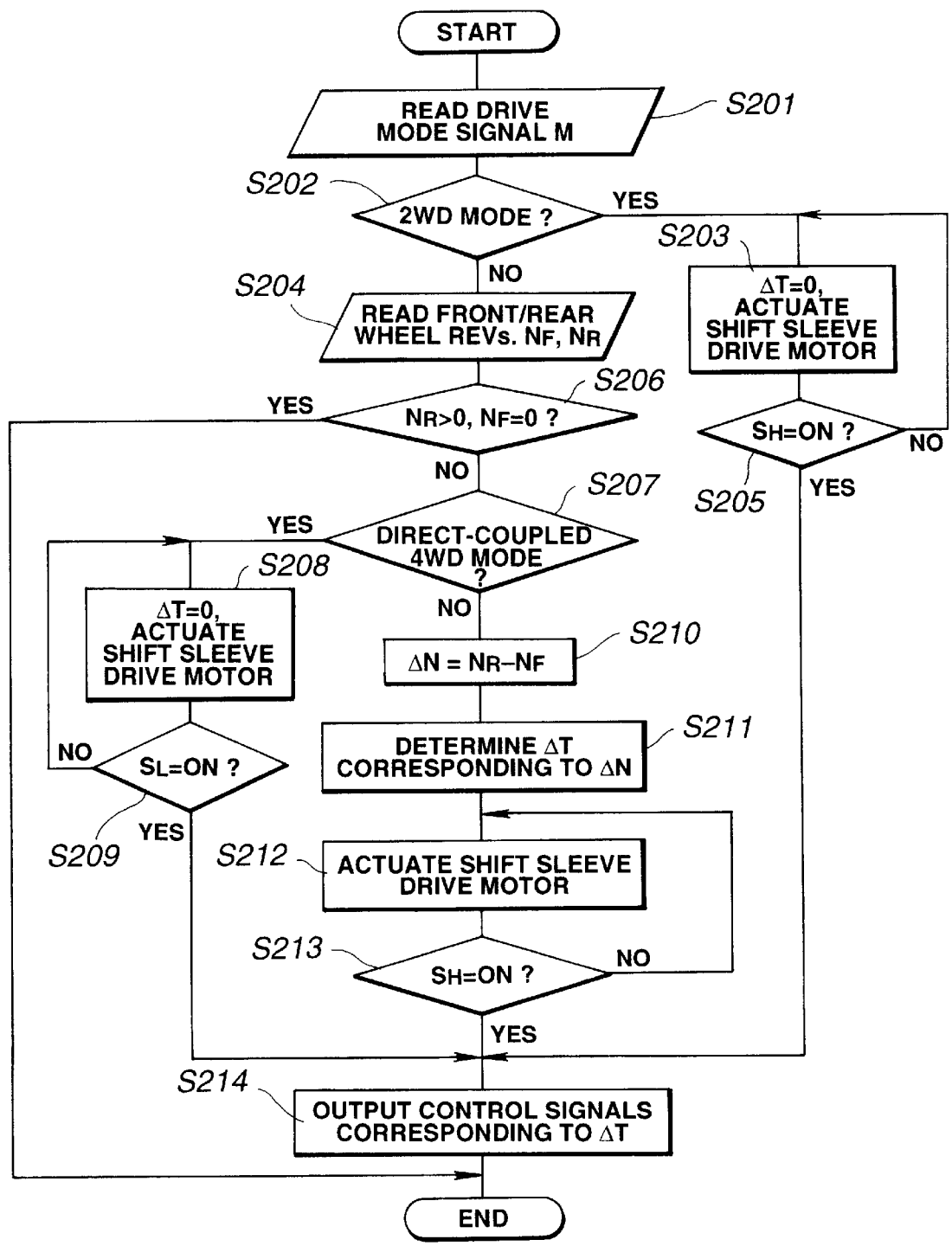
FIG. 35 is a view similar to FIG. 27, showing operation of the fourth preferred embodiment of the present invention.

Referring to FIG. 35, based on the front wheel revolution $N_F$ and rear wheel revolution $N_R$, and the drive mode signals M out of the auto four-wheel drive switch 491, the direct-coupled four-wheel drive switch 492, and the two-wheel drive switch 493, the microcomputer 407 determines the front wheel transmission torque ΔT, and calculates the duty ratio D for producing a clutch engaging force corresponding to the front wheel transmission torque ΔT as determined, producing the control signal $CS_0$ having a command value corresponding to this duty ratio D. The microcomputer 407 also controls the control signal $CS_1$ in the on or off state.

The drive circuit 431a is provided with a pulse duration modulation circuit, for example, for outputting an exciting current of the duty ratio D in accordance with a command value of the control signal $CS_0$ which is in the form of an analog voltage signal output from the microcomputer 407 and corresponds to the front wheel transmission torque ΔT, and serves to output to the solenoid 528d of the duty-control solenoid valve 528 the exciting current $i_0$ of the duty ratio D in accordance with the command value of the control signal $CS_0$.

The drive circuit 431b serves to convert the control signal $CS_1$ out of the microcomputer 407 into the exciting current $i_1$ having an enough value to excite the solenoid 520d of the electromagnetic selector valve 520, which is output to the solenoid 520d of the electromagnetic selector valve 520.

Moreover, the controller 407 carries out control for enabling the oil pressure supply system 416 to supply a predetermined oil pressure, as follows. When the hydraulic switch 532 detects, for example, that the line pressure $P_L$ downstream of the oil element 512 of the convergent duct 510a is lower than a set value in accordance with a control program, not shown, the control signal $S_M$ indicative of a revolution command value determined in accordance with the oil temperature detection value $S_Y$ of the oil temperature sensor 530 is calculated to control a discharge pressure or discharged oil amount of the sub-pump 504, which is provided to the motor drive circuit 503 to control a revolution or rotating speed of the electric motor 504, thus maintaining the line pressure $P_L$ out of the oil pressure supply system 416 at a predetermined value. When detecting that the detection signal $S_H$ of the high-speed shift position sensor 486 is turned on, and the clutch pressure $P_C$ out of the pilot selector valve 526 is zero, the microcomputer 407 determines that the pilot selector valve 526 is abnormal, and raises an alarm.

The motor drive circuit 503 is constructed to input the motor control signal $S_M$ out of the microcomputer 8 to carry out chopper control of the revolution of the electric motor 502 in accordance with the motor control signal $S_M$ and the oil temperature.

The storage unit 407c of the microcomputer 407 has previously stored program and fixed data necessary for execution of processing in the processing unit 407b, and can temporally store results of processing.

Figure 36:
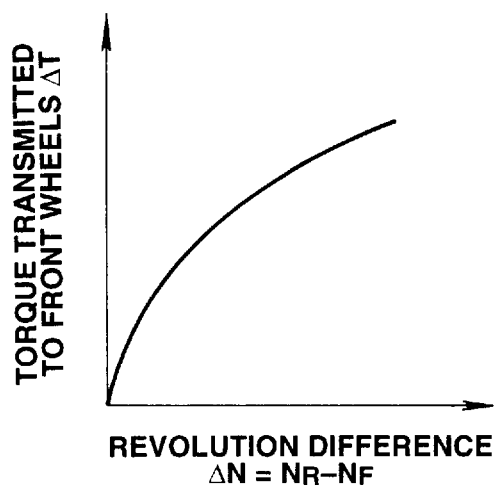
FIG. 36 is a view similar to FIG. 26, illustrating a characteristic of front wheel transmission torque vs. revolution difference between front and rear wheels according to the fourth preferred embodiment.
Figure 37:
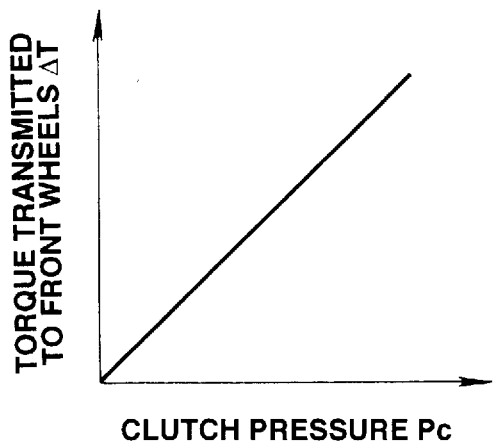
FIG. 37 is a view similar to FIG. 36, illustrating a characteristic of front wheel transmission torque vs. clutch pressure according to the fourth preferred embodiment.
Figure 38:
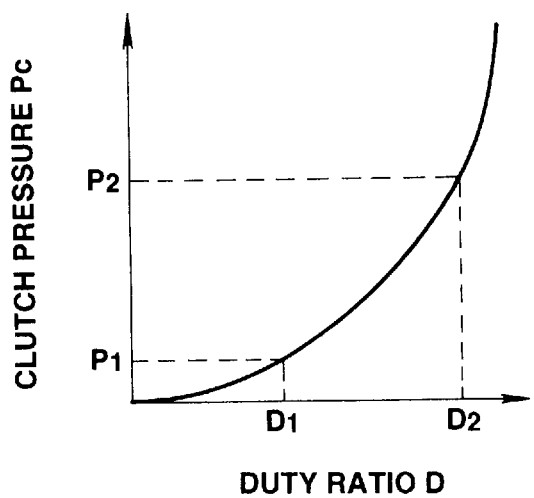
FIG. 38 is a view similar to FIG. 37, illustrating a characteristic of clutch pressure vs. duty ratio.

The fixed data include memory tables corresponding to control characteristics as shown in FIGS. 36 to 38, respectively. FIG. 36 shows a control characteristic of the front wheel transmission torque $\Delta T$ vs. the revolution or rotating speed difference $\Delta N$ between the front and rear wheels. As seen in FIG. 36, a traction distribution, i.e. the front wheel transmission torque $\Delta T$, is nonlinearly increased in accordance with an increase in the revolution difference $\Delta N$ between the front and rear wheels. FIG. 37 shows a relationship between the clutch pressure $P_C$ of the pilot selector valve 526 and the front wheel transmission torque $\Delta T$. FIG. 38 shows a value of the clutch pressure $P_C$ of the clutch-pressure regulating valve 522 which is nonlinearly parabolically increased in accordance with an increase in the duty ratio D of the exciting current $i_0$ supplied to the solenoid 528d of the duty-control solenoid valve 528.

When determining the front wheel transmission torque $\Delta T$ in referring to the memory table corresponding to FIG. 36, the microcomputer 407 refers successively the memory tables corresponding to FIGS. 37 and 38 to calculate back a value of the duty ratio D to be output by the controller 418. Referring to FIG. 38, when the clutch pressure $P_C$ between $P_1$ and $P_2$ corresponding to the duty ratio D between $D_1$ and $D_2$ is supplied to the friction clutch 466, the ratio of a torque distribution between the front and rear wheels in accordance with a clutch engaging force of the friction clutch 466 is changed continuously, i.e. in the range from 0%:100% to 50%:50%.

When the duty ratio D is smaller than $D_1$, the clutch pressure $P_C$ is produced, so that the friction plate 466b and friction disc 466d of the friction clutch 466 come in press contact with each other, but with no transmission of traction.

Referring to FIG. 35, the microcomputer 407 of the controller 418 carries out traction distribution control of the friction clutch 466 in accordance with basic processing as shown in a flowchart in FIG. 35.

A brief description will be made with regard to the basic processing of traction distribution control. The basic processing is executed every predetermined period of time $\Delta t$, e.g. 10 msec, by a timer interrupt. First, at a step S201, the drive mode signal M is read out of a predetermined storage area in the storage unit 407c, the drive mode signal M being previously input from the detection circuits 432a–432c, and stored in the storage unit 407c.

At a subsequent step S202, it is determined whether or not the drive mode signal M read at the step S201 corresponds to the two-wheel drive mode. If the drive mode signal M corresponds to the two-wheel drive mode, control proceeds to a step S203, whereas if not, control proceeds to a step S204.

At the step S203, the front wheel distribution torque $\Delta T$ is set to zero for achieving the two-wheel drive mode, and the shift sleeve drive motor is actuated to move the shift sleeve 464b to the high-speed shift position H. At a subsequent step S205, it is determined whether or not the detection signal $S_H$ of the high-speed shift position sensor 486 is turned on. If the detection signal $S_H$ is turned on, it is determined that the shift sleeve 464b is moved up to the high-speed shift position H, and the shift sleeve drive motor is stopped, then, control proceeds to a step S214. On the other hand, if the detection signal $S_H$ is not turned on, it is determined that the shift sleeve 464b is not moved up to the high-speed shift position H, and control returns to the step S203 where the shift sleeve drive motor is actuated.

At the step S204, the number of pulses per predetermined period of time is counted based on the pulse signals $P_F$, $P_R$ out of the front and rear wheel revolution sensors 494, 495 so as to read the front and rear revolutions $N_F$, $N_R$ stored, for example, in a predetermined storage area in the storage unit 407c. At a subsequent step S206, it is determined whether or not the front wheel revolution $N_F$ is zero, whereas the rear wheel revolution $N_R$ is greater than zero.

If $N_F=0$, and $N_R>0$, it is determined that due to the rear wheels being racing, switching is impossible from the two-wheel drive mode to the four-wheel drive mode, and control comes to an end, returning to a main program.

On the other hand, if $N_F \neq 0$, and $N_R \leq 0$, it is determined that switching is possible from the two-wheel drive mode to the four-wheel drive mode, and control proceeds to a step S207 where it is determined whether or not the drive mode signal M read at the step S202 corresponds to the direct-coupled four-wheel drive mode. If the drive mode signal M corresponds to the direct-coupled four-wheel drive mode, control proceeds to a step S208 where the front wheel distribution torque $\Delta T$ is set to zero, and the shift sleeve drive motor is actuated to move the shift sleeve 464b to the low-speed shift position L. At a subsequent step S209, it is determined whether or not the detection signal $S_L$ out of the low-speed shift position sensor 488 is turned on. If the detection signal $S_L$ is turned on, it is determined that the shift sleeve 464b is moved up to the low-speed shift position L, and control proceeds to the step S214. On the other hand, if the detection signal $S_L$ is turned off, it is determined that the shift sleeve 464b is not moved up to the low-speed shift position L, control returns to the step S208 where the shift sleeve motor is actuated again.

At the step S207, if the drive mode signal M does not correspond to the direct-coupled four-wheel drive mode, control proceeds to a step S210 where in accordance with the front and rear wheel revolutions $N_F$, $N_R$ which are a revolution per predetermined period of time, and thus indicative of a rotating speed, respectively, the revolution difference $\Delta N$ between the front and rear wheels is determined by subtracting the front wheel revolution $N_F$ from the rear wheel revolution $N_R$.

At a subsequent step S211, in referring to the control map indicative of the relationship between the revolution difference $\Delta N$ and the front wheel transmission torque $\Delta T$ as shown in FIG. 36, the front wheel transmission torque $\Delta T$ is determined which corresponds to the revolution difference $\Delta N$ calculated at the step S209. Then, at a step S212, the shift sleeve motor is actuated to move the shift sleeve 464b to the high-speed shift position H. At a subsequent step S213, it is determined whether or not the detection signal $S_H$ out of the high-speed shift position sensor 486 is turned on. If the detection signal $S_H$ is turned on, it is determined that the shift sleeve 464b is moved up to the high-speed shift position H, and the shift sleeve drive motor is stopped, and control proceeds to a step S214. On the other hand, if the detection signal $S_H$ is turned off, it is determined that the shift sleeve 464b is not moved up to the high-speed shift position H, and control returns to the step S112 where the shift sleeve drive motor is actuated again.

At the step S214, in accordance with the front wheel distribution torque $\Delta T$ as determined, the corresponding clutch pressure $P_C$ is determined in referring to the control maps as shown in FIGS. 36 and 37, and the corresponding duty ratio D is set in referring to the control map as shown in FIG. 38, producing the control signal $CS_0$ corresponding to the front wheel distribution torque $\Delta T$. The control signal $CS_1$ is put in the on state. These control signals $CS_0$, $CS_1$ are output to the drive circuits 431a 32b. Then, control comes to an end, returning to the main program.

Therefore, in case of enabling the motor vehicle to cruise in the two-wheel drive mode, for example, the seat occupant puts the two-wheel drive switch 493 in the open state.

Thus, the two-wheel drive detection circuit 432c recognizes that the two-wheel drive switch 493 is in the open state based on the fact that the two-wheel drive detection circuit 432c is not in the on state with the two-wheel drive switch 493 being in the off state, and outputs to the microcomputer 407 the drive mode signal M indicative of the two-wheel drive.

When inputting the drive mode signal M out of the two-wheel drive detection circuit 432c, the microcomputer 407 stores it in a predetermined storage area in the storage unit 407c.

With regard to traction distribution control as shown in FIG. 35, at the step S201, the drive mode signal M is read out of a predetermined storage area in the storage unit 407c. In that case, since the drive mode signal M corresponds to the two-wheel drive, control proceeds from the step S202 to the step S203 where the front wheel distribution torque $\Delta T$ is set to zero, and the shift sleeve drive motor is actuated to move the shift sleeve 464b to the high-speed shift position H, then, the control signals $CS_0$, $CS_1$ are turned off, which are output to the drive circuits 431a, 432b.

Due to the control signal $CS_0$ being turned off, the drive circuit 431a stops output of the exciting current $i_0$ to the solenoid 528d. With no excitation of the solenoid 528d, the duty-control solenoid valve 528 becomes such that the spool is moved to the position wherein the input port $528_A$ does not communicate with the output port 528B.

In the drive circuit 431b, due to the control signal $CS_1$ being turned off, voltage supply is cut off to the base terminal $T_B$ of the transistor Tr to turn the transistor Tr off. Thus, since a current of the power source $V_{IG}$ to be supplied to the emitter terminal $T_E$ is not supplied to the solenoid 520d, the electromagnetic selector valve 520 becomes such that the spool is moved by the return spring 520a to the position wherein the input port $520_A$ does not communicate with the output port $520_B$. With no oil pressure supplied to the pilot port $526_{P1}$ of the pilot selector valve 526, the return spring 526a operates so that the input port $526_A$ does not communicate with the output port $526_B$, removing the clutch pressure $P_C$ as a secondary oil pressure of the pilot selector valve 526. This reduces a clutch engaging force of the friction clutch 466, so that the friction plate 466b and friction disc 466d of the friction clutch 466 do not come in frictional contact with each other, transmitting no traction to the front wheel output shaft 424, obtaining the two-wheel drive state.

When changing from cruising in the two-wheel drive mode to cruising, e.g. in the auto four-wheel drive mode, the seat occupant puts the two-wheel drive switch 493 in the closed state, and also the auto four-wheel drive switch 491 in the closed state.

Thus, the auto four-wheel drive detection circuit 432a recognized that the auto four-wheel drive switch 491 is in the closed state based on the fact that the auto four-wheel drive circuit 432a receives power out of the power source $V_{IG}$ with the auto four-wheel drive switch 491 being in the closed state or on state, and it outputs to the microcomputer 407 the drive mode signal M indicative of the auto four-wheel drive. On the other hand, the two-wheel drive detection circuit 432c recognizes that the two-wheel drive switch 493 is in the closed state based on the fact that the two-wheel drive detection circuit 432c is in the on state with the two-wheel drive switch 493 being in the closed state.

The microcomputer 407 inputs the drive mode signal M indicative of the auto four-wheel drive from the auto four-wheel drive detection circuit 432a, which is stored in a predetermined storage area in the storage unit 407c.

Upon execution of traction distribution control as shown in FIG. 35, since the drive mode signal M corresponds to the auto four-wheel drive mode, control proceeds from the step S202 to the step S204 where the front and rear wheel revolutions $N_F$, $N_R$ are read out of a predetermined storage area in the storage unit 407c. At that time, when the motor vehicle is cruising, $N_F \neq 0$, and $N_R \leq 0$, so that control proceeds from the step S206 to the step S207. Due to the auto four-wheel drive mode being set, control proceeds to the step S210 where the revolution difference $\Delta N$ between the front and rear wheels is calculated in accordance with the front and rear wheel revolutions $N_F$, $N_R$. At the subsequent steps, the front wheel distribution torque $\Delta T$ corresponding to the revolution difference $\Delta N$ is determined out of FIG. 36, and the shift sleeve drive motor is actuated to move the shift sleeve 464b to the high-speed shift position H, then, the control signal $CS_0$ corresponding to the duty ratio D in accordance with the front wheel distribution torque $\Delta T$ as determined is output to the drive circuit 431a. The control signal $Cs_1$ is put in the on state, which is output to the drive circuit 431b.

Thus, the control signal $CS_0$ of the duty ratio D corresponding to the front wheel distribution torque $\Delta T$ and the control signal $CS_1$ in the on state are input to the drive circuits 431a, 431b, respectively, so that the drive circuit 431a outputs the exciting current $i_0$ corresponding to the control signal $CS_0$ to the solenoid 528d of the duty-control solenoid valve 528, whereas due to supply of the control signal $CS_1$ for turning on the transistor Tr, the drive circuit 431b becomes in the on state to supply a command current to the solenoid 520d, which causes communication of the input port $120_A$ of the electromagnetic selector valve 526 with the output port $520_B$ thereof. By this, the pilot port $526_{P1}$ of the pilot selector valve 526 receives the pilot pressure, and becomes in the communication state, outputting the predetermined clutch pressure $P_C$ as a secondary voltage. In accordance with the clutch pressure $P_C$, a clutch engaging force of the friction clutch 466 is controlled to provide a corresponding traction which drives the clutch hub 466c of the friction clutch 466. This driving force is transmitted to the front wheel output shaft 424, obtaining the auto four-wheel drive state wherein traction corresponding to the front wheel transmission torque $\Delta T$ is transmitted to the front wheels.

At that time, when setting to the auto four-wheel drive mode in the state that the motor vehicle cruises in the two-wheel drive mode with the front wheels stuck in the snow road, the front wheel revolution $N_F$ being zero, the rear wheel revolution $N_R$ being greater than zero, for example, control comes to an end, upon execution of traction distribution control as shown in FIG. 35, at the step S206 since $N_F = 0$, and $N_R > 0$. Thus, the motor vehicle does not set to the auto four-wheel drive state, preventing occurrence of a shock due to sudden mode switching.

Moreover, when carrying out switching from the auto four-wheel drive state to the direct-coupled four-wheel drive state, for example, the seat occupant opens the auto four-wheel drive switch 491, and closes the direct-coupled four-wheel drive switch 492 and the two-wheel drive switch 492. Thus, the direct-coupled four-wheel detection circuit 432b recognizes that the direct-coupled four-wheel drive switch 492 is in the closed state based on the fact that when closed, the direct-coupled four-wheel drive switch 492 becomes in the on state, and it outputs to the microcomputer 407 the drive mode signal M indicative of the direct-coupled four-wheel drive, which is stored in a predetermined storage area in the storage unit 407c of the microcomputer 407.

Upon execution of traction distribution control as shown in FIG. 35, since the drive mode signal M corresponds to the direct-coupled four-wheel drive mode, control proceeds from the step S202 to the step S204. At that time, when the motor vehicle is cruising, the front wheel revolution $N_F$ being not equal to zero, the rear wheel revolution being not greater than zero, control proceeds from the step S206 to the step S207. In view of the direct-coupled four-wheel drive mode, control proceeds to the step S208 where the front wheel transmission torque ΔT is set to zero, and the shift sleeve drive motor is actuated to move the shift sleeve 464b to the low-speed shift position L. Then, the control signals $CS_0$, $CS_1$ corresponding to the front wheel transmission torque ΔT are output to the drive circuits 431a, 431b.

Since the shift sleeve 464b is moved to the low-speed shift position L, the first output shaft 444 and the second output shaft 454 are forcibly coupled with each other, enabling the motor vehicle to cruise in the direct-coupled four-wheel drive mode regardless of an engaging force of the friction clutch 466.

Suppose, for example, that when setting in the two-wheel drive mode, the microcomputer 407 or the drive circuit 431b, i.e. the transistor Tr, produces a malfunction, and becomes in the on state to supply to the solenoid 520d the exciting current $i_1$ which is not to be supplied thereto.

In this state, the two-wheel drive switch 493 is set to the two-wheel drive mode, and thus in the open state, so that even when the controller 418 supplies the exciting current $i_1$ to the solenoid 520d, the solenoid 520d does not become in the on state, producing no operation of the electromagnetic selector valve 520. Thus, even when the controller 418 is out of order, the motor vehicle does not undergo a change from the two-wheel drive mode to the four-wheel drive mode. By way of example, even when, during cruising on the snow road in the two-wheel drive mode with the front wheels contacting the road surface and the rear wheels racing, the controller 418 is out of order to supply the exciting current $i_1$ to the solenoid 520d and the motor vehicle does not undergo a change to the four-wheel drive mode, resulting in no occurrence of a shock due to a sudden mode change.

Further, when, during cruising in the two-wheel drive mode with the microcomputer 407 or the drive circuit 431a being in order, an ignition short occurs at a point A between the solenoid 520d and the two-wheel drive switch 493 as shown in FIG. 34, the two-wheel drive detection circuit 432c detects that the two-wheel drive switch 493 is in the closed state. However, if switching to the four-wheel drive state will produce a shock, i.e. the front wheels are at a standstill whereas the rear wheels are in rotation, switching to the four-wheel drive state is prohibited by control shown in FIG. 35 as described above, resulting in no occurrence of a shock due to a sudden mode change.

Furthermore, when a ground short occurs at a point B between the solenoid 520d and the collector terminal $T_C$ as shown in FIG. 34, for example, during cruising in the two-wheel drive mode, the solenoid 520d is not turned on since the solenoid 520d is completely disconnected from the power source $V_{IG}$ in the two-wheel drive mode, failing to be in the four-wheel drive mode unless the two-wheel drive switch 493 is put in the closed state.

Therefore, according to the fourth embodiment, when selecting the two-wheel drive mode, the solenoid 520d is completely disconnected from the power source $V_{IG}$, so that even when the transistor Tr in the drive circuit 431b is turned on by abnormality of the controller 418 or the drive circuit 431b, the solenoid 520d does not turn on, thus avoiding an unexpected change to the four-wheel drive mode by a failure in the two-wheel/four-wheel drive changeover control circuit 409.

Therefore, when sticking in the snow road with the rear wheels being racing in the two-wheel drive mode, the motor vehicle cannot undergo a sudden change to the four-wheel drive mode, thus not providing a shock to the seat occupant due to an unexpected change from the two-wheel drive mode to the four-wheel drive mode.

Figure 39:
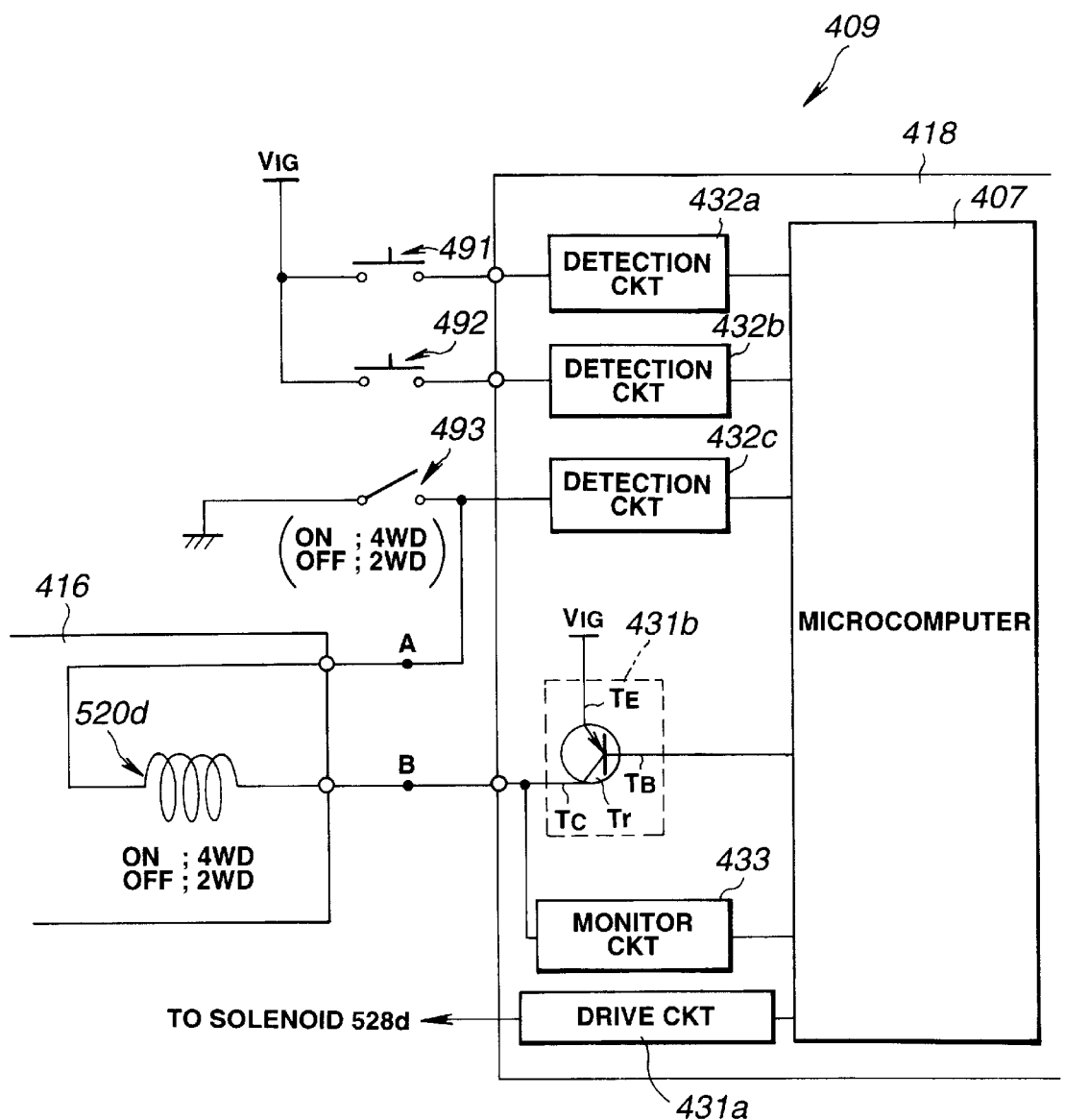
FIG. 39 is a view similar to FIG. 34, showing a fifth preferred embodiment of the present invention.

FIG. 39 shows a fifth embodiment of the present invention. The fifth embodiment is the substantially the same as the fourth embodiment except the circuit structure of the two-wheel/four-wheel drive changeover control circuit 409.

Specifically, referring to FIG. 39, the two-wheel/four-wheel drive changeover control circuit 409 according to the fifth embodiment is the same as that one according to the fourth embodiment as shown in FIG. 34 except that the transistor Tr in the drive circuit 431b is of the different type, and the transistor Tr and the two-wheel drive switch 493 are connected to different devices.

The auto four-wheel drive switch 491 has one end connected to the power source $V_{IG}$, and the other end connected to the auto four-wheel drive detection circuit 432a, the state of the auto four-wheel drive switch 491 detected by the auto four-wheel drive detection circuit 432a being output to the microcomputer 407. Likewise, the direct-coupled four-wheel drive switch 492 has one end connected to the power source $V_{IG}$, and the other end connected to the direct-coupled four-wheel drive detection circuit 432b, the state of the direct-coupled four-wheel drive switch 492 detected by the direct-coupled four-wheel drive detection circuit 432b being output to the microcomputer 407.

The two-wheel drive switch 493 has one end connected to the ground, and the other end connected to the two-wheel drive detection circuit 432c which carries out a continuity tests to detect the state of the two-wheel drive switch 493, which is output to the microcomputer 407.

The drive circuit 431b comprises a PNP transistor Tr having a base terminal $T_B$ connected to the microcomputer 407, an emitter terminal $T_E$ connected to the power source $V_{IG}$, and a collector terminal $T_C$ connected to one end of the solenoid 520d of the electromagnetic selector valve 520. The other end of the solenoid 520d is connected to a section between the two-wheel drive switch 493 and the two-wheel drive detection circuit 432c.

The monitor circuit 433 is interposed between the collector terminal $T_C$ and the microcomputer 407. The drive circuit 431a comprises a floating-type constant voltage circuit, for example, and serves to supply a predetermined exciting current $i_0$ to the solenoid 528d of the duty-control solenoid valve 528 in accordance with the control signal $CS_0$.

The auto four-wheel drive detection circuit 432a detects that the auto four-wheel drive switch 491 is in the closed state based on the fact that when closed, the auto four-wheel drive switch 491 becomes in the on state to supply a source voltage of the power source $V_{IG}$ to the auto four-wheel drive detection circuit 432a, and it outputs to the microcomputer 407 the drive mode signal M indicative of the auto four-wheel drive. Likewise, the direct-coupled four-wheel drive detection circuit 432b detects that the direct-coupled four-wheel drive switch 492 is in the closed state based on the fact that when closed, the direct-coupled four-wheel drive switch 492 becomes in the on state to supply a source voltage of the power source $V_{IG}$ to the direct-coupled four-wheel drive detection circuit 432b, and it outputs to the microcomputer 407 the drive mode signal M indicative of the direct-coupled four-wheel drive.

Moreover, the two-wheel drive detection circuit 432c always detects the state of the two-wheel drive switch 493 by a continuity test. The two-wheel drive detection circuit 432c outputs to the microcomputer 407 the drive mode signal M indicative of the two-wheel drive, as selecting the two-wheel drive mode, when the two-wheel drive switch 493 is in the open state, but does not output thereto the drive mode signal M, as failing to select the two-wheel drive mode, when the two-wheel drive switch 493 is in the closed state.

In the same way as in the fourth embodiment, the microcomputer 407 carries out traction distribution control as shown in FIG. 35 based on the detection signals out of the sensors, and outputs the control signals $CS_0$, $CS_1$ to the drive circuits 431a, 431b in accordance with setting of the mode switches, the drive circuits 431a, 431b supplying the exciting currents $i_0$, $i_1$ to the solenoids 528d, 520d in accordance with the control signals $CS_0$, $CS_1$, enabling the motor vehicle to cruise in the drive mode as set.

Suppose, for example, that when setting in the two-wheel drive mode, the microcomputer 407 or the drive circuit 431b, i.e. the transistor Tr, produces a malfunction, and becomes in the on state to supply to the solenoid 520d the exciting current $i_1$ which is not to be supplied thereto.

In this state, the two-wheel drive switch 493 is set to the two-wheel drive mode, and thus in the open state, so that even when the controller 418 supplies the exciting current $i_1$ to the solenoid 520d, the solenoid 520d does not become in the on state, producing no operation of the electromagnetic selector valve 520. Thus, even when the controller 418 is out of order, the motor vehicle does not undergo a change from the two-wheel drive mode to the four-wheel drive mode. By way of example, even when, during cruising on the snow road in the two-wheel drive mode with the front wheels contacting the road surface and the rear wheels racing, the controller 418 is out of order to supply the exciting current $i_1$ to the solenoid 520d and the motor vehicle does not undergo a change to the four-wheel drive mode, resulting in no occurrence of a shock due to a sudden mode change.

Further, when, during cruising in the two-wheel drive mode with the microcomputer 407 or the drive circuit 431a being in order, a ground short occurs at a point A between the solenoid 520d and the two-wheel drive switch 493 as shown in FIG. 39, the two-wheel drive detection circuit 432c detects that the two-wheel drive switch 493 is in the closed state. However, if switching to the four-wheel drive state will produce a shock, i.e. the front wheels are at a standstill whereas the rear wheels are in rotation, switching to the four-wheel drive state is prohibited by control shown in FIG. 35 as described above, resulting in no occurrence of a shock due to a sudden mode change.

Furthermore, when an ignition short occurs at a point B between the solenoid 520d and the drive circuit 431b as shown in FIG. 39, for example, during cruising in the two-wheel drive mode, the solenoid 520d is not turned on since the two-wheel drive switch 493 is in the open state, failing to switch from the two-wheel drive mode to the four-wheel drive mode.

This ignition short has a low probability of occurrence, producing no problem. In this connection, the ratio of the probability of occurrence of the ground short to that of the ignition short is about 100 to 1.

At that time, the ground short occurs at the point B, for example, both ends of the solenoid 520d are connected to the ground, so that no current passes through the solenoid 520d, maintaining the two-wheel drive mode.

Therefore, according to the fifth embodiment, the two-wheel drive switch 493 is arranged in series between the solenoid 520d and the ground. Thus, even when, with the four-wheel drive mode, i.e. the direct-coupled four-wheel drive mode or the auto four-wheel drive mode being not selected, the controller 418 or the transistor Tr is out of order to supply a predetermined power to the solenoid 520d and the two-wheel drive switch 493 is in the open state due to no selection of the four-wheel drive mode so that no current passes through the solenoid 520d, resulting in no unexpected change to the four-wheel drive mode. As for occurrence of a short, the ignition short occurs scarcely, producing no problem, whereas even if the ground short occurs, the solenoid 520d does not turn on, enabling prevention of a change from the two-wheel drive state to the four-wheel drive state due to a failure in the two-wheel/four-wheel drive changeover control circuit 409.

Therefore, when the motor vehicle cruising in the two-wheel drive mode sticks in the snow road with the rear wheels racing, for example, occurrence of a malfunction of the controller 418 or the transistor Tr or a short cannot turn-on the solenoid 520d, thus not undergoing a sudden change to the four-wheel drive mode regardless of the drive mode set by the seat occupant. This enables prevention of occurrence of a seat occupant's shock due to an unexpected and sudden change to the four-wheel drive mode.

In the fourth and fifth embodiments, the high-speed/low-speed changeover device 464 of the auxiliary transmission unit 458 is arranged so that the shift sleeve 464b is slidingly moved by the shift sleeve drive motor in accordance with setting of the switches 491–493 for setting the drive mode of the motor vehicle. Alternatively, the auxiliary transmission lever mechanically coupled with the shift sleeve 464b may be arranged in the vicinity of the driver's seat so as to slide the shift sleeve 464b, and be provided with the mode setting switch for setting the drive mode of the motor vehicle.

Figure 40:
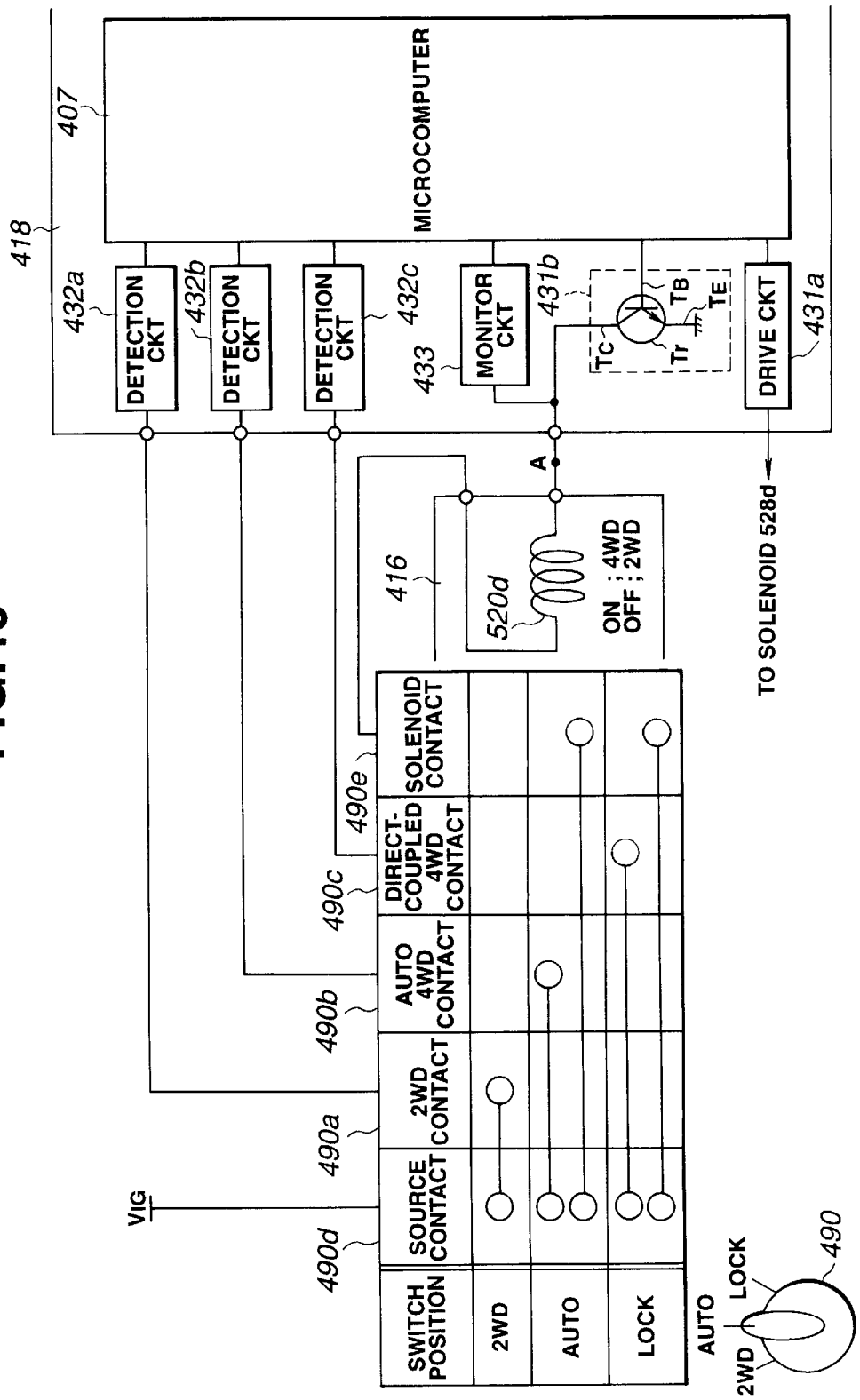
FIG. 40 is a view similar to FIG. 39, showing a sixth preferred embodiment of the present invention.

FIG. 40 shows a sixth embodiment of the present invention. The sixth embodiment is substantially the same as the fourth embodiment except the circuit structure of the two-wheel/four-wheel drive changeover control circuit 409.

Specifically, referring to FIG. 40, the two-wheel/four-wheel drive changeover control circuit 409 according to the sixth embodiment comprises a mode changeover switch 490 as a changeover switch in place of the auto four-wheel drive switch 491, the direct-coupled four-wheel drive switch 492, and the two-wheel drive switch 493 according to the fourth embodiment. As will be described later, a power source contact 490d and a two-wheel drive contact 490a correspond to the two-wheel drive switch 493, and the power source contact 490d and an auto four-wheel drive contact 490b correspond to the auto four-wheel drive switch 491, and the power source contact 490d and a direct-coupled four-wheel drive contact 490c correspond to the direct-coupled four-wheel drive switch 492.

The mode changeover switch 490 comprises a fixed-three-position switch, for example, and allows setting of three modes: the two-wheel drive mode (2WD), the auto four-wheel drive mode (AUTO) , and the direct-coupled four-wheel drive mode (LOCK) as shown in FIG. 40. The mode changeover switch 490 has the above two-wheel drive contact 490a connected to the two-wheel drive detection circuit 432a, auto four-wheel drive contact 490b connected to the auto four-wheel drive detection circuit 432b, direct-coupled four-wheel drive contact 490c connected to the direct-coupled four-wheel drive detection circuit 432c, power source contact 490d connected to the power source $V_{IG}$, and a solenoid contact 490e connected to one end of the solenoid 520d.

When selecting the two-wheel drive mode by the mode changeover switch 490, the power source contact 490d and the two-wheel drive contact 490a are connected to each other to supply a source voltage to the two-wheel drive detection circuit 432c through the power source contact 490d and the two-wheel drive contact 490a.

Further, when selecting the auto four-wheel drive mode by the mode changeover switch 490, the power source contact 490d and the auto four-wheel drive contact 490b and solenoid contact 490e are connected to each other to supply a source voltage to the auto four-wheel drive detection circuit 432b through the power source contact 490d and the auto four-wheel drive contact 490b, and to the solenoid 520d through the power source contact 490d and the solenoid contact 490e.

Furthermore, when selecting the direct-coupled four-wheel drive mode by the mode changeover switch 490, the power source contact 490d and the direct-coupled four-wheel drive contact 490c and solenoid contact 490e are connected to each other to supply a source voltage to the direct-coupled four-wheel drive detection circuit 432c through the power source contact 490d and the direct-coupled four-wheel drive detection circuit 432c, and to the solenoid 520d through the power source contact 490d and the solenoid contact 490e.

Each detection circuit 432a–432c detects selected mode by determining whether a signal out of the corresponding contact is high or low. If the signal out of the corresponding contact is high, the detection circuit determines that the corresponding mode is selected, outputting to the microcomputer 407 the drive mode signal M indicative of the auto four-wheel drive, the direct-coupled four-wheel drive, or the two-wheel drive.

On the other hand, the drive circuit 431b comprises an NPN transistor Tr having a base terminal $T_B$ connected to the microcomputer 407, an emitter terminal $T_E$ connected to the ground, and a collector terminal $T_C$ connected to the other end of the solenoid 520d. The monitor circuit 433 as an observation circuit is interposed between the collector terminal $T_C$ and the microcomputer 407.

In the same way as in the fourth embodiment, the microcomputer 407 inputs the drive mode signal M out of the detection circuits 432a–432c, and stores it in a predetermined storage area in the storage unit 407c. The microcomputer 407 carries out traction distribution control as shown in FIG. 35 to supply the exciting currents $i_0$, $i_1$ to the drive circuits 431a, 431b, respectively. Thus, the solenoids 528d, 520d receive the exciting currents $i_0$, $i_1$, respectively, to carry out switching to the two-wheel drive mode, the auto four-wheel drive mode, or the direct-coupled four-wheel drive mode.

Therefore, when putting the motor vehicle in the two-wheel drive mode, for example, the seat occupant operates the mode changeover switch 490 to select the two-wheel drive mode. Thus, the power source contact 490d is connected to the two-wheel drive contact 490a to supply a source voltage to the two-wheel drive detection circuit 432a which recognizes that the two-wheel drive mode is selected, outputting to the microcomputer 407 the drive mode signal M indicative of the two-wheel drive. Thereafter, in the same way as in the fourth embodiment, due to the drive mode signal M corresponding to the two-wheel drive, the microcomputer 407 outputs to the drive circuits 431a, 431b the control signals for setting the front wheel distribution torque ΔT to zero, i.e. the control signals $CS_0$, $CS_1$ turned off, respectively. Due to the control signal $CS_0$ turned off, the drive circuit 431a does not output the exciting current $i_0$, whereas due to control signal $CS_1$ turned off, i.e. the transistor Tr being not turned on, the drive circuit 431b does not supply the exciting current $i_1$ to the solenoid 520d. Since the solenoid 520d is in the off state, the spool 520c of the electromagnetic selector valve 520 is moved by the return spring 520a to put the input port $520_A$ and the output port $520_B$ in the non-communication state. Due to no supply of oil pressure to the pilot port $526_{P1}$ of the pilot selector valve 526, the return spring 526a puts the input port $526_A$ and the output port $526_B$ in the non-communication state, decreasing the clutch pressure $P_C$ as a secondary oil pressure of the pilot selector valve 526. This reduces a clutch engaging force of the friction clutch 466, so that the friction plate 466b and friction disc 466d of the friction clutch 466 do not come in frictional contact with each other, transmitting no traction to the front wheel output shaft 424, obtaining the two-wheel drive state.

When changing from cruising in the two-wheel drive mode to cruising in the auto four-wheel drive mode, for example, the seat occupant operates the mode changeover switch 490 to select the auto four-wheel drive mode. Thus, the power source contact 490d and the auto four-wheel drive contact 490b as well as the power source contact 490d and the solenoid contact 490e are connected to each other to supply a source voltage to the solenoid 520d and the auto four-wheel drive detection circuit 432b which recognizes that the auto four-wheel drive mode is selected, outputting to the microcomputer 407 the drive mode signal M indicative of the auto four-wheel drive. In traction distribution control as shown in FIG. 35, the microcomputer 407 processes the drive mode signal M as the auto four-wheel drive mode.

Suppose, for example, that the motor vehicle now sticks in the snow road with the rear wheels racing. Since the front wheel revolution $N_F$ is zero, control comes to an end at the step S206, carrying out no change to the four-wheel drive mode.

Further, even when, in the two-wheel drive mode, due to abnormality of the microcomputer 47 or the drive circuit 413b, for example, the transistor Tr being turned on causes a state where an end of the solenoid 520d on the side of the controller 418 is grounded, the power source contact 490d and the solenoid 490e are not connected to each other as long as the two-wheel drive mode is selected by the mode changeover switch 490, and the solenoid 520d cannot be thus in the on state.

Furthermore, referring to FIG., 40, as for a ground short occurring, for example, at a point A between the solenoid 520d and the collector terminal $T_C$ in the two-wheel drive mode, since the solenoid 520d is completely disconnected from the power source $V_{IG}$ in the two-wheel drive mode, execution of a continuity test in the monitor circuit 433 in that state contributes to sure detection of occurrence of the ground short at the point A. Thus, the ground short can be detected as soon as it occurs, and with an abnormality alarm such as an abnormality lamp, Due to the abnormality warning raising in the two-wheel drive mode, the seat occupant can avoid a change to the four-wheel drive mode, preventing a shock produced when the motor vehicle undergoes a sudden change to the four-wheel drive mode. Moreover, when selecting the four-wheel drive mode, the monitor circuit 433 can detect the ground short at the point A by the fact that a section between the point A and the collector terminal $T_C$ is in the on state in the normal condition, but not in the on state in the abnormal condition.

Therefore, according to the sixth embodiment, a ground short can be detected as soon as it occurs. When detecting abnormality, the seat occupant can avoid a change to the four-wheel drive mode, enabling sure prevention of occurrence of a shock due to a sudden change from the two-wheel drive mode to the four-wheel drive mode. Moreover, when selecting the two-wheel drive mode, the solenoid 520d and the power source $V_{IG}$ are completely disconnected from each other, so that even if the transistor Tr in the drive circuit 431b is turned on by malfunction of the controller 418 or the drive circuit 431b, the solenoid 520d cannot be in the on state, resulting in no unexpected change to the four-wheel drive mode due to a failure, etc. in the two-wheel/four-wheel drive changeover control circuit 409.

Therefore, when sticking in the snow road with the rear wheels racing in the two-wheel drive mode, the motor vehicle cannot undergo a sudden change to the four-wheel drive mode, thus not providing a shock to the seat occupant due to an unexpected change from the two-wheel drive mode to the four-wheel drive mode.

In the fourth to sixth embodiments, the present invention is applied to the four-wheel drive motor vehicle designed to cruise basically in the rear-wheel drive mode, alternatively, it is applicable to the four-wheel drive motor vehicle designed to cruise basically in the front-wheel drive mode.

Further, in the fourth to sixth embodiments, the revolution or rotating speed difference between the front and rear wheels serves to determine the front wheel transmission torque $\Delta T$, obtaining the four-wheel drive state. Alternatively, the longitudinal acceleration may be detected for switching from the two-wheel drive state to the four-wheel drive state upon quick start or acceleration.

Furthermore, in the fourth to sixth embodiments, the controller 418 comprises a microcomputer, alternatively, it may comprise a combination of electronic circuits such as a counter, comparator, etc.

Still further, in the fourth to sixth embodiments, a hydraulic oil is uses as a working fluid for basing the variable-torque clutch, alternatively, the other fluid is applicable.

Furthermore, in the fourth to sixth embodiments, the duty-control solenoid valve 528 serves to form the pilot control pressure of the clutch-pressure regulating valve 522, alternatively, an electromagnetic proportional-pressure control valve is applicable, which can regulate an output in accordance with a value of the exciting current supplied to the solenoid.

What is claimed is:

1. A system for controlling a four-wheel drive for a motor vehicle provided with main and secondary driving wheels, comprising:

means for detecting a drive mode of the motor vehicle, said drive mode being selectable between a two-wheel drive mode and a four-wheel drive mode, said four-wheel drive mode being selectable between a direct-coupled four-wheel drive mode with distribution of traction between the main and secondary driving wheels being in a ratio of 1:1, and an auto four-wheel drive mode where a state of the motor vehicle is automatically continuously changeable between said two-wheel drive mode and said direct-coupled four-wheel drive mode;

means, in response to said drive mode detecting means, for controlling distribution of traction between the main and secondary driving wheels, said distribution controlling means comprising a changeover switch, which serves to select said drive mode, having a contact of said auto four-wheel drive mode that is positioned between contacts of said two-wheel drive mode and said direct-coupled four-wheel drive mode so as to pass said auto four-wheel drive mode when switching from said two-wheel drive mode to said direct-coupled four-wheel drive mode; and means, in response to said distribution controlling means, for distributing traction between the main and secondary driving wheels, said traction distributing means including a friction clutch and a solenoid, wherein said distribution controlling means comprises:

means for determining a time elapsed during switching from said auto four-wheel drive mode to said two-wheel drive mode;

means, in response to said time determining means, for continuing said auto four-wheel drive mode during a predetermined period without shifting to said two-wheel drive mode;

means for detecting turning of the motor vehicle;

means, in response to said turning detecting means, for setting a time required for switching from said four-wheel drive mode to said two-wheel drive mode; and means, in response to said time setting means for gradually reducing engaging force of said friction clutch when carrying out switching from said four-wheel drive mode to said two-wheel drive mode.

2. A system as claimed in claim 1, wherein said turning detecting means comprises means for detecting a speed of the motor vehicle, and means for detecting a steering angle.

3. A system as claimed in claim 2, wherein said turning detecting means comprises means for detecting a lateral acceleration of the motor vehicle, and means for detecting a longitudinal acceleration of the motor vehicle.

4. A system as claimed in claim 3, wherein said time setting means sets said required time to be longer as said lateral acceleration detecting means provide a greater detection value.

5. A system as claimed in claim 4, wherein said time setting means sets said required time to be longer as said longitudinal acceleration detecting means provide a greater detection value even with the same detection value of said lateral acceleration.

6. A system as claimed in claim 3, wherein said lateral acceleration detecting means estimates said lateral acceleration in accordance with a speed difference between the secondary driving wheels, whereas said longitudinal acceleration detecting means estimates said longitudinal acceleration in accordance with a speed of the secondary driving wheels.

7. A system as claimed in claim 1, wherein said time setting means sets said required time to be longer as said steering angle detecting means provide a greater detection value.

8. A system as claimed in claim 7, wherein said time setting means sets said required time to be longer as said speed detecting means provide a smaller detection value even with the same detection value of said steering angle.

9. A system as claimed in claim 1, wherein said distribution controlling means further comprises:

current supply means for supplying a predetermined current to said solenoid, said current supply means being connected between one end of said solenoid and the ground; and control circuit means for controlling said current supply means to control said predetermined current supplied to said solenoid.

10. A system as claimed in claim 9, wherein said control circuit means stops to supply said predetermined current to said solenoid when said drive mode detecting means provide a signal indicative of said two-wheel drive mode, and to supply said predetermined current to said solenoid when said drive mode detecting means provides a signal indicative of said four-wheel drive mode.

11. A system as claimed in claim 9, wherein said distribution controlling means further comprises:

monitor circuit means for monitoring an electric state between said solenoid and said control circuit means.

12. A system as claimed in claim 1, wherein said changeover switch is connected between a power source and said solenoid.

13. A system as claimed in claim 12, wherein said changeover switch is connected between the other end of said solenoid and the ground, said changeover switch being set to said two-wheel drive mode when being in an open state, and to said four-wheel drive mode when being in a closed state.

14. A system as claimed in claim 13, wherein said changeover switch has at least a power source contact connected to said power source, a solenoid contact connected to the other end of said solenoid, a two-wheel drive contact connected to said two-wheel drive detection circuit means, and a four-wheel drive contact connected to said four-wheel drive detection circuit means, wherein said power source and said four-wheel drive contact and solenoid contact are connected to each other when setting said four-wheel drive mode, and said power source contact and said two-wheel drive contact are connected to each other when setting said two-wheel drive mode.

15. A system as claimed in claim 1, wherein said drive mode detecting means comprises two-wheel drive detection circuit means for detecting selection of said two-wheel drive mode, and four-wheel drive mode detection circuit means for detecting selection of said four-wheel drive mode.

16. A motor vehicle comprising:

main and secondary driving wheels;

means for detecting a drive mode of the motor vehicle, said drive mode being selectable between a two-wheel drive mode and a four-wheel drive mode, said four-wheel drive mode being selectable between a direct-coupled four-wheel drive mode with distribution of traction between said main and secondary driving wheels being in a ratio of 1:1, and an auto four-wheel drive mode where a state of the motor vehicle is automatically continuously changeable between said two-wheel drive mode and said direct-coupled four-wheel drive mode;

means, in response to said drive mode detecting means, for controlling distribution of traction between said main and secondary driving wheels, said distribution controlling means comprising a changeover switch, which serves to select said drive mode, having a contact of said auto four-wheel drive mode that is positioned between contacts of said two-wheel drive mode and said direct-coupled four-wheel drive mode so as to pass said auto four-wheel drive mode when switching from said two-wheel drive mode to said direct-coupled four-wheel drive mode; and means, in response to said distribution controlling means, for distributing traction between said main and secondary driving wheels, said traction distributing means including a friction clutch and a solenoid, wherein said distribution controlling means comprises:
means for determining a time elapsed during switching from said auto four-wheel drive mode to said two-wheel drive mode;
means, in response to said time determining means, for continuing said auto four-wheel drive mode during a predetermined period without shifting to said two-wheel drive mode;
means for detecting turning of the motor vehicle;
means, in response to said turning detecting means, for setting a time required for switching from said four-wheel drive mode to said two-wheel drive mode; and
means, in response to said time setting means, for gradually reducing engaging force of said friction clutch when carrying out switching from said four-wheel drive mode to said two-wheel drive mode.

17. A motor vehicle as claimed in claim 16, wherein said turning detecting means comprises means for detecting a speed of the motor vehicle, and means for detecting a steering angle.

18. A motor vehicle as claimed in claim 17, wherein said turning detecting means comprises means for detecting a lateral acceleration of the motor vehicle, and means for detecting a longitudinal acceleration of the motor vehicle.

19. A motor vehicle as claimed in claim 18, wherein said time setting means sets said required time to be longer as said lateral acceleration detecting means provide a greater detection value.

20. A motor vehicle as claimed in claim 19, wherein said time setting means sets said required time to be longer as said longitudinal acceleration detecting means provide a greater detection value even with the same detection value of said lateral acceleration.

21. A motor vehicle as claimed in claim 18, wherein said lateral acceleration detecting means estimates said lateral acceleration in accordance with a speed difference between the secondary driving wheels, whereas said longitudinal acceleration detecting means estimates said longitudinal acceleration in accordance with a speed of the secondary driving wheels.

22. A motor vehicle as claimed in claim 16, wherein said time setting means sets said required time to be longer as said steering angle detecting means provide a greater detection value.

23. A motor vehicle as claimed in claim 22, wherein said time setting means sets said required time to be longer as said speed detecting means provide a smaller detection value even with the same detection value of said steering angle.

24. A motor vehicle as claimed in claim 16, wherein said distribution controlling means further comprises:

current supply means for supplying a predetermined current to said solenoid, said current supply means being connected between one end of said solenoid and the ground; and control circuit means for controlling said current supply means to control said predetermined current supplied to said solenoid.

25. A motor vehicle as claimed in claim 24, wherein said control circuit means stop to supply said predetermined current to said solenoid when said drive mode detecting means provide a signal indicative of said two-wheel drive mode, and to supply said predetermined current to said solenoid when said drive mode detecting means provide a signal indicative of said four-wheel drive mode.

26. A motor vehicle claimed in claim 24, wherein said distribution controlling means further comprises:

monitor circuit means for monitoring an electric state between said solenoid and said control circuit means.

27. A motor vehicle as claimed in claim 16, wherein said changeover switch is connected between a power source and said solenoid.

28. A motor vehicle as claimed in claim 27, wherein said changeover switch is connected between the other end of said solenoid and the ground, said changeover switch being set to said two-wheel drive mode when being in an open state, and to said four-wheel drive mode when being in a closed state.

29. A motor vehicle as claimed in claim 28, wherein said changeover switch has at least a power source contact connected to said power source, a solenoid contact connected to the other end of said solenoid, a two-wheel drive contact connected to said two-wheel drive detection circuit means, and a four-wheel drive contact connected to said four-wheel drive detection circuit means, wherein said power source and said four-wheel drive contact and solenoid contact are connected to each other when setting said four-wheel drive mode, and said power source contact and said two-wheel drive contact are connected to each other when setting said two-wheel drive mode.

30. A motor vehicle as claimed in claim 16, wherein said drive mode detecting means comprises two-wheel drive detection circuit means for detecting selection of said two-wheel drive mode, and four-wheel drive mode detection circuit means for detecting selection of said four-wheel drive mode.

31. A system for controlling a four-wheel drive for a motor vehicle provided with main and secondary driving wheels, comprising:

means for detecting a drive mode of the motor vehicle, the drive mode being selectable between a two-wheel drive mode and a four-wheel drive mode, the four-wheel drive mode being selectable between a direct-coupled four-wheel drive mode with distribution of traction between the main and secondary driving wheels being in a ratio of 1:1, and an auto four-wheel drive mode where a state of the motor vehicle is automatically continuously changeable between the two-wheel drive mode and the direct-coupled four-wheel drive mode;

means, in response to the drive mode detecting means, for controlling distribution of traction between the main and secondary driving wheels, the distribution controlling means comprising a changeover switch, which serves to select the drive mode, having a contact of the auto four-wheel drive mode that is positioned between contacts of the two-wheel drive mode and the direct-coupled four-wheel drive mode, requiring to pass the auto four-wheel drive mode when switching from the two-wheel drive mode to the direct-coupled four-wheel drive mode; and means, in response to the distribution controlling means, for distributing traction between the main and secondary driving wheels, the traction distributing means including a friction clutch and a solenoid, wherein the distribution controlling means comprises:
means for determining a time elapsed during switching from the auto four-wheel drive mode to the two-wheel drive mode,
means in response to the time determining means for continuing the auto four-wheel drive mode during a predetermined period without shifting to the two-wheel drive mode,
means for detecting turning of the motor vehicle,
means, in response to the turning detecting means, for setting a time required for switching from the four-wheel drive mode to the two-wheel drive mode, and
means, in response to the time setting means, for gradually reducing engaging force of the friction clutch when carrying out switching from the four-wheel drive mode to the two-wheel drive mode.

32. A motor vehicle comprising:
main and secondary driving wheels;
means for detecting a drive mode of the motor vehicle, the drive mode being selectable between a two-wheel drive mode and a four-wheel drive mode, the four-wheel drive mode being selectable between a direct-coupled four-wheel drive mode with distribution of traction between the main and secondary driving wheels being in a ratio of 1:1, and an auto four-wheel drive mode where a state of the motor vehicle is automatically continuously changeable between the two-wheel drive mode and the direct-coupled four-wheel drive mode;

means, in response to the drive mode detecting means, for controlling distribution of traction between the main and secondary driving wheels, the distribution controlling means comprising a changeover switch, which serves to select the drive mode, having a contact of the auto four-wheel drive mode that is positioned between contacts of the two-wheel drive mode and the direct-coupled four-wheel drive mode, requiring to pass the auto four-wheel drive mode when switching from the two-wheel drive mode to the direct-coupled four-wheel drive mode; and means, in response to the distribution controlling means, for distributing traction between the main and secondary driving wheels, the traction distributing means including a friction clutch and a solenoid, wherein the distribution controlling means comprises:
means for determining a time elapsed during switching from the auto four-wheel drive mode to the two-wheel drive mode,
means in response to the time determining means for continuing the auto four-wheel drive mode during a predetermined period without shifting to the two-wheel drive mode,
means for detecting turning of the motor vehicle,
means, in response to the turning detecting means, for setting a time required for switching from the four-wheel drive mode to the two-wheel drive mode, and
means, in response to the time setting means, for gradually reducing engaging force of the friction clutch when carrying out switching from the four-wheel drive mode to the two-wheel drive mode.

33. A system for controlling a four-wheel drive for a motor vehicle provided with main and secondary driving wheels, comprising:

a drive mode switch arranged to detect a drive mode of the motor vehicle, the drive mode being selectable between a two-wheel drive mode and a four-wheel drive mode, the four-wheel drive mode being selectable between a direct-coupled four-wheel drive mode with distribution of traction between the main and secondary driving wheels being in a ratio of 1:1, and an auto four-wheel drive mode where a state of the motor vehicle is automatically continuously changeable between the two-wheel drive mode and the direct-coupled four-wheel drive mode;

a control device connected to the drive mode switch for controlling distribution of traction between the main and secondary driving wheels, the control device comprising a changeover switch, which serves to select the drive mode, having a contact of the auto four-wheel drive mode that is positioned between contacts of the two-wheel drive mode and the direct-coupled four-wheel drive mode so as to pass the auto four-wheel drive mode when switching from the two-wheel drive mode to the direct-coupled four-wheel drive mode; and a traction distributing device connected to the control device for distributing traction between the main and secondary driving wheels, the traction distributing device including a friction clutch and a solenoid, wherein the control device is arranged to:
determine a time elapsed during switching from the auto four-wheel drive mode to the two-wheel drive mode;
continue, in response to the time determined, the auto four-wheel drive mode during a predetermined period without shifting to the two-wheel drive mode;
detect turning of the motor vehicle;
set, in response to the turning detected, a time required for switching from the four-wheel drive mode to the two-wheel drive mode; and
gradually reduce, in response to the time set, engaging force of the friction clutch when carrying out switching from the four-wheel drive mode to the two-wheel drive mode.

34. A motor vehicle comprising:

main and secondary driving wheels;

a drive mode switch arranged to detect a drive mode of the motor vehicle, the drive mode being selectable between a two-wheel drive mode and a four-wheel drive mode, the four-wheel drive mode being selectable between a direct-coupled four-wheel drive mode with distribution of traction between the main and secondary driving wheels being in a ratio of 1:1, and an auto four-wheel drive mode where a state of the motor vehicle is automatically continuously changeable between the two-wheel drive mode and the direct-coupled four-wheel drive mode;

a control device connected to the drive mode switch for controlling distribution of traction between the main and secondary driving wheels, the control device comprising a changeover switch, which serves to select the drive mode, having a contact of the auto four-wheel drive mode that is positioned between contacts of the two-wheel drive mode and the direct-coupled four-wheel drive mode so as to pass the auto four-wheel drive mode when switching from the two-wheel drive mode to the direct-coupled four-wheel drive mode; and a traction distributing device connected to the control device for distributing traction between the main and secondary driving wheels, the traction distributing device including a friction clutch and a solenoid, wherein the control device is arranged to:
determine a time elapsed during switching from the auto four-wheel drive mode to the two-wheel drive mode;
continue, in response to the time determined, the auto four-wheel drive mode during a predetermined period without shifting to the two-wheel drive mode;
detect turning of the motor vehicle;
set, in response to the turning detected, a time required for switching from the four-wheel drive mode to the two-wheel drive mode; and
gradually reduce, in response to the time set, engaging force of the friction clutch when carrying out switching from the four-wheel drive mode to the two-wheel drive mode.

* * * * *